US012115796B2

(12) United States Patent
Inoue et al.

(10) Patent No.: US 12,115,796 B2
(45) **Date of Patent: *Oct. 15, 2024**

(54) MEMBER INCLUDING PAD ELECTRODE, INK CARTRIDGE, RECORDING APPARATUS

(71) Applicant: CANON KABUSHIKI KAISHA, Tokyo (JP)

(72) Inventors: Ryoji Inoue, Kawasaki (JP); Yasuo Kotaki, Yokohama (JP); Tetsuya Ohashi, Matsudo (JP); Takashi Fukushima, Yokohama (JP); Hironori Murakami, Tokyo (JP); Takeho Miyashita, Yokohama (JP); Kyosuke Nagaoka, Kodaira (JP); Toshiaki Tokisawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,873

(22) Filed: Aug. 22, 2023

(65) Prior Publication Data

US 2023/0391095 A1 Dec. 7, 2023

Related U.S. Application Data

(62) Division of application No. 18/184,603, filed on Mar. 15, 2023, now Pat. No. 11,833,834, which is a (Continued)

(30) Foreign Application Priority Data

Oct. 13, 2017 (JP) ................................. 2017-199622
Oct. 5, 2018 (JP) ................................. 2018-190401

(51) Int. Cl.
*B41J 2/175* (2006.01)

(52) U.S. Cl.
CPC ................................. *B41J 2/1753* (2013.01)

(58) Field of Classification Search
CPC .......................... B41J 2/17553; B41J 2/16588; B41J 2/16517; B41J 2/1753; B41J 2/175; B41J 2/1752; B41J 2/17546; B41J 2/17513
See application file for complete search history.

(56) References Cited

U.S. PATENT DOCUMENTS 5,425,478 A 6/1995 Kotaki et al. ................. 222/501
5,430,471 A 7/1995 Nakajima et al. .............. 347/87
(Continued)

FOREIGN PATENT DOCUMENTS

CN 1623789 6/2005
CN 101125492 B 9/2010
(Continued)

OTHER PUBLICATIONS

Office Action dated Aug. 22, 2023 in counterpart Japanese Application No. 2022-202777, together with English translation thereof.
(Continued)

*Primary Examiner* — An H Do
(74) *Attorney, Agent, or Firm* — Venable LLP

(57) ABSTRACT

A member mountable to a mounting portion provided with an ink receiving tube and a plurality of electrical connecting portions, the member includes a first portion including an outwardly facing surface and provided with an inserting portion into which the ink receiving tube is capable of being inserted; a second portion opposite from the first portion; and a third portion connecting the first portion and the second portion with each other and provided with a plurality of pad electrodes electrically connectable with the electrical connecting portions. The member is mountable to the mounting portion by being inserted into the mounting portion in an inserting direction with the first portion at a
(Continued)

leading side. The pad electrodes are electrically connectable with the electrical connecting portions by being moved in a direction different from the inserting direction.

5 Claims, 39 Drawing Sheets

Related U.S. Application Data division of application No. 17/669,086, filed on Feb. 10, 2022, now Pat. No. 11,642,892, which is a division of application No. 16/645,445, filed as application No. PCT/JP2018/038753 on Oct. 11, 2018, now Pat. No. 11,376,859.

(56) References Cited

U.S. PATENT DOCUMENTS

| | | | | |
|---|---|---|---|---|
| 5,567,373 | A | 10/1996 | Sato et al. | 264/112 |
| 5,583,549 | A | 12/1996 | Ujita et al. | 347/86 |
| 5,589,862 | A | 12/1996 | Ujita et al. | 347/87 |
| 5,608,437 | A | 3/1997 | Iwata et al. | 347/86 |
| 5,619,237 | A | 4/1997 | Inoue et al. | 347/86 |
| 5,619,239 | A | 4/1997 | Kotaki et al. | 347/86 |
| 5,742,310 | A | 4/1998 | Kotaki | 347/86 |
| 5,781,213 | A | 7/1998 | Ujita et al. | 347/86 |
| 5,805,188 | A | 9/1998 | Nakajima et al. | 347/87 |
| 5,815,184 | A | 9/1998 | Ujita et al. | 347/87 |
| 5,852,457 | A | 12/1998 | Kotaki et al. | 347/86 |
| 5,929,885 | A | 7/1999 | Nakajima et al. | 347/87 |
| 5,988,804 | A | 11/1999 | Kotaki et al. | 347/87 |
| 6,070,974 | A | 6/2000 | Kotaki et al. | 347/86 |
| 6,116,722 | A | 9/2000 | Sato et al. | 347/85 |
| 6,145,975 | A | 11/2000 | Kotaki et al. | 347/87 |
| 6,170,939 | B1 | 1/2001 | Ujita et al. | 347/86 |
| 6,243,116 | B1 | 6/2001 | Kotaki et al. | 347/86 |
| 6,336,709 | B1 | 1/2002 | Inoue et al. | 347/49 |
| 6,338,546 | B1 | 1/2002 | Kotaki et al. | 347/49 |
| 6,361,158 | B1 | 3/2002 | Inoue et al. | 347/86 |
| 6,390,612 | B1 | 5/2002 | Kotaki et al. | 347/85 |
| 6,419,350 | B1 | 7/2002 | Abe et al. | 347/86 |
| 6,421,623 | B1 | 7/2002 | Furukawa et al. | 702/100 |
| 6,623,104 | B1 | 9/2003 | Kotaki et al. | 347/49 |
| 6,685,296 | B2 | 2/2004 | Mochizuki et al. | 347/19 |
| 6,719,394 | B2 | 4/2004 | Kubota et al. | 347/19 |
| 6,719,416 | B2 | 4/2004 | Anma et al. | 347/86 |
| 6,742,881 | B2 | 6/2004 | Kotaki et al. | 347/86 |
| 6,773,099 | B2 | 8/2004 | Inoue et al. | 347/86 |
| 6,827,411 | B2 | 12/2004 | Kubota et al. | 347/7 |
| 6,827,431 | B2 | 12/2004 | Kitabatake et al. | 347/86 |
| 6,830,324 | B2 | 12/2004 | Ogura et al. | 347/86 |
| 6,854,836 | B2 | 2/2005 | Ishinaga et al. | 347/85 |
| 6,869,158 | B2 | 3/2005 | Kojima et al. | 347/19 |
| 6,877,847 | B2 | 4/2005 | Hayashi et al. | 347/86 |
| 6,916,085 | B2 | 7/2005 | Kotaki et al. | 347/49 |
| 6,935,739 | B2 | 8/2005 | Inoue et al. | 347/104 |
| 6,942,326 | B2 | 9/2005 | Hayashi et al. | 347/86 |
| 6,959,984 | B2 | 11/2005 | Ogura et al. | 347/86 |
| 6,966,631 | B2 | 11/2005 | Matsuo et al. | 347/49 |
| 6,969,161 | B2 | 11/2005 | Kuwabara et al. | 347/85 |
| 6,976,753 | B2 | 12/2005 | Kuwabara et al. | 347/86 |
| 6,997,535 | B2 | 2/2006 | Mochizuki et al. | 347/19 |
| 6,997,548 | B2 | 2/2006 | Matsuo et al. | 347/86 |
| 7,004,575 | B2 | 2/2006 | Inoue et al. | 347/86 |
| 7,014,287 | B2 | 3/2006 | Kubota et al. | 347/7 |
| 7,077,514 | B2 | 7/2006 | Inoue et al. | 347/86 |
| 7,086,725 | B2 | 8/2006 | Ogura et al. | 347/86 |
| 7,104,640 | B2 | 9/2006 | Ogura et al. | 347/86 |
| 7,111,931 | B2 | 9/2006 | Amma et al. | 347/86 |
| 7,118,194 | B2 | 10/2006 | Matsuo et al. | 347/49 |
| 7,125,109 | B2 | 10/2006 | Watanabe et al. | 347/86 |
| 7,128,407 | B2 | 10/2006 | Inoue et al. | 347/85 |
| 7,134,747 | B2 | 11/2006 | Hayashi et al. | 347/86 |
| 7,165,829 | B2 | 1/2007 | Hayashi et al. | 347/49 |
| 7,192,111 | B2 | 3/2007 | Matsumoto et al. | 347/7 |
| 7,210,755 | B2 | 5/2007 | Kubota et al. | 347/7 |
| 7,290,861 | B2 | 11/2007 | Inoue et al. | 347/49 |
| 7,311,388 | B2 | 12/2007 | Ogura et al. | 347/87 |
| 7,350,910 | B2 | 4/2008 | Amma et al. | 347/86 |
| 7,360,876 | B2 | 4/2008 | Inoue et al. | 347/85 |
| 7,384,116 | B2 | 6/2008 | Kotaki et al. | 347/19 |
| 7,387,378 | B2 | 6/2008 | Kimura | 347/86 |
| 7,396,118 | B2 | 7/2008 | Ogawa et al. | 347/87 |
| 7,401,909 | B2 | 7/2008 | Inoue et al. | 347/86 |
| 7,407,274 | B2 | 8/2008 | Inoue et al. | 347/86 |
| 7,407,275 | B2 | 8/2008 | Inoue et al. | 347/86 |
| 7,407,394 | B1 | 8/2008 | Parish et al. | 439/131 |
| 7,517,067 | B2 | 4/2009 | Inoue et al. | 347/85 |
| 7,607,770 | B2 | 10/2009 | Inoue et al. | 347/85 |
| 7,726,792 | B2 | 6/2010 | Fukushima et al. | 347/86 |
| 7,735,984 | B2 | 6/2010 | Lijima et al. | 347/86 |
| 7,784,927 | B2 | 8/2010 | Inoue et al. | 347/86 |
| 7,914,137 | B2 | 3/2011 | Inoue et al. | 347/86 |
| 7,922,274 | B2 | 4/2011 | Kubota et al. | 347/7 |
| 7,926,927 | B2 | 4/2011 | Kotaki et al. | 347/86 |
| 7,950,790 | B2 | 5/2011 | Kubo et al. | 347/86 |
| 8,020,978 | B2 | 9/2011 | Ogawa et al. | 347/86 |
| 8,047,641 | B2 | 11/2011 | Nanjo et al. | 347/86 |
| 8,109,617 | B2 | 2/2012 | Kotaki et al. | 347/86 |
| 8,123,342 | B2 | 2/2012 | Ujita et al. | 347/86 |
| 8,136,930 | B2 | 3/2012 | Anma et al. | 347/86 |
| 8,205,974 | B2 | 6/2012 | Ogura et al. | 347/86 |
| 8,240,826 | B2 | 8/2012 | Fukushima et al. | 347/86 |
| 8,313,185 | B2 | 11/2012 | Hatasa et al. | 347/92 |
| 8,322,807 | B2 | 12/2012 | Seki et al. | 347/6 |
| 8,425,022 | B2 | 4/2013 | Inoue et al. | 347/86 |
| 8,469,498 | B2 | 6/2013 | Ohashi et al. | 347/86 |
| 8,529,037 | B2 | 9/2013 | Miyashita et al. | 347/86 |
| 8,550,607 | B2 | 10/2013 | Inoue et al. | 347/86 |
| 8,770,730 | B2 | 7/2014 | Nanjo et al. | 347/86 |
| 8,770,731 | B2 | 7/2014 | Miyashita et al. | 347/86 |
| 8,864,292 | B2 | 10/2014 | Kanbe et al. | B41J 2/17526 |
| 8,960,869 | B2 | 2/2015 | Takada et al. | 347/86 |
| 8,985,743 | B2 | 3/2015 | Sasaki | B41J 2/17523 |
| 9,016,842 | B2 | 4/2015 | Miyashita et al. | 347/86 |
| 9,333,758 | B2 | 5/2016 | Koshikawa et al. | |
| 9,375,938 | B2 | 6/2016 | Kondo et al. | |
| 9,597,884 | B2 | 3/2017 | Nanjo et al. | |
| 9,821,562 | B2 | 11/2017 | Nanjo et al. | |
| 9,840,082 | B2 | 12/2017 | Nanjo et al. | |
| 9,908,338 | B2 | 3/2018 | Koshikawa et al. | |
| 9,914,305 | B2 | 3/2018 | Orihara et al. | |
| 9,919,536 | B2 | 3/2018 | Miyashita et al. | |
| 9,962,945 | B2 | 5/2018 | Takaoka et al. | |
| 9,981,477 | B2 | 5/2018 | Fukuchi et al. | |
| 9,981,478 | B2 | 5/2018 | Ikebe et al. | |
| 10,029,474 | B2 | 7/2018 | Takada et al. | |
| 10,093,105 | B2 | 10/2018 | Shimamura et al. | |
| 10,112,403 | B2 | 10/2018 | Ikebe et al. | |
| 10,207,511 | B2 | 2/2019 | Nanjo et al. | |
| 10,336,087 | B2 | 7/2019 | Miyashita et al. | |
| 10,399,346 | B2 | 9/2019 | Arai et al. | B41J 29/13 |
| 10,399,347 | B2 | 9/2019 | Miyashita et al. | B41J 2/17506 |
| 10,427,412 | B2 | 10/2019 | Okude et al. | B41J 2/17506 |
| 10,538,092 | B2 | 1/2020 | Miyashita et al. | B41J 2/17523 |
| 10,538,096 | B2 | 1/2020 | Abe et al. | B41J 2/17596 |
| 10,661,570 | B2 | 5/2020 | Miyashita et al. | B41J 2/185 |
| 10,675,877 | B2 | 6/2020 | Murakami et al. | B41J 2/1752 |
| 11,179,944 | B2 | 11/2021 | Mizutani et al. | B41J 2/17553 |
| 11,318,749 | B2 | 5/2022 | Koizumi et al. | B41J 2/17523 |
| 11,833,834 | B2 * | 12/2023 | Inoue | B41J 2/1752 |
| 2004/0135857 | A1 | 7/2004 | Hashii et al. | B41J 2/175 |
| 2004/0246304 | A1 | 12/2004 | Takahashi et al. | 347/49 |
| 2005/0007420 | A1 | 1/2005 | Ogawa et al. | 347/50 |
| 2005/0068382 | A1 | 3/2005 | Kimura et al. | 347/85 |
| 2005/0179750 | A1 | 8/2005 | Hayasaki et al. | 347/86 |
| 2008/0018720 | A1 | 1/2008 | Fukushima et al. | 347/86 |
| 2008/0021170 | A1 | 1/2008 | Fukushima et al. | 525/340 |
| 2008/0122904 | A1 | 5/2008 | Tsai et al. | 347/86 |
| 2008/0284810 | A1 | 11/2008 | Shimizu et al. | 347/20 |
| 2009/0003850 | A1 | 1/2009 | Yamamoto et al. | 399/27 |
| 2011/0205284 | A1 | 8/2011 | Yoshino et al. | 347/20 |
| 2013/0050310 | A1 | 2/2013 | Seki et al. | 347/6 |

(56) References Cited

U.S. PATENT DOCUMENTS

| | | | | |
|---|---|---|---|---|
| 2014/0168324 | A1 | 6/2014 | Sasaki | B41J 2/17523 |
| 2016/0200113 | A1 | 7/2016 | Nanjo et al. | B41J 2/175 |
| 2016/0291521 | A1 | 10/2016 | Nagata | G03G 21/1878 |
| 2017/0120606 | A1 | 5/2017 | Koshikawa et al. | B41J 2/1754 |
| 2018/0370243 | A1 | 12/2018 | Shimamura et al. | B41J 2/17553 |
| 2019/0009563 | A1 | 1/2019 | Tokisawa et al. | B41J 2/16505 |
| 2019/0023019 | A1 | 1/2019 | Ikebe et al. | B41J 2/1752 |
| 2019/0263132 | A1 | 8/2019 | Miyashita et al. | B41J 2/17523 |
| 2019/0299648 | A1 | 10/2019 | Tokisawa et al. | B41J 2202/12 |
| 2019/0299650 | A1 | 10/2019 | Saeki et al. | B41J 2/17596 |
| 2019/0337296 | A1 | 11/2019 | Arai et al. | B41J 2/17509 |
| 2020/0101750 | A1 | 4/2020 | Nagaoka et al. | B41J 2/17553 |
| 2020/0108624 | A1 | 4/2020 | Takahashi et al. | B41J 2/17566 |
| 2022/0161565 | A1 | 5/2022 | Inoue et al. | B41J 2/175 |

FOREIGN PATENT DOCUMENTS

| | | |
|---|---|---|
| CN | 101825858 | 9/2010 |
| CN | 103862876 | 6/2014 |
| CN | 105829109 | 8/2016 |
| CN | 111194266 | 5/2020 |
| EP | 0 847 866 | 6/1998 |
| EP | 1 114 726 | 7/2001 |
| EP | 1 541 361 | 6/2005 |
| EP | 1 547 784 | 6/2005 |
| EP | 1 731 310 | 12/2006 |
| EP | 2 743 086 | 6/2014 |
| GB | 2473063 | 3/2011 |
| JP | H09-20014 | 1/1997 |
| JP | 2005-205886 | 8/2005 |
| JP | 2008-273173 | 11/2008 |
| JP | 2009-269209 | 11/2009 |
| JP | 2011-167966 | 9/2011 |
| JP | 2013-199112 | 10/2013 |
| JP | 2013-220649 | 10/2013 |
| JP | 2014-117836 | 6/2014 |
| JP | 2016-185651 | 10/2016 |
| JP | 2016-197162 | 11/2016 |

OTHER PUBLICATIONS

Office Action dated Aug. 29, 2023 in counterpart Chinese Application No. 202111632529.1, together with English translation thereof.

Notice of Acceptance dated Jan. 13, 2022 in counterpart Australia Application No. 2018350131.

Office Action dated Jun. 24, 2021 in counterpart Indonesian Application No. P00202003362, together with English translation thereof.

Office Action dated Sep. 24, 2021 in counterpart Korean Application No. 10-2020-7012545, together with English translation thereof.

Notice of Acceptance dated Sep. 10, 2021 in counterpart Russian Application No. 2020115637/28, together with English translation thereof.

Office Action dated Jun. 29, 2021 in counterpart India Application No. 202047019243, together with English translation thereof.

Office Action dated Dec. 24, 2020 in counterpart Chinese Application No. 201880065449.2, together with English translation thereof.

Office Action dated Feb. 8, 2021 in counterpart Russian Application No. 2020115637/28, together with English translation thereof.

Office Action dated Jan. 15, 2021 in counterpart Australian Application No. 2018350131 (in English).

Office Action dated Jan. 14, 2020 in counterpart Taiwan Application No. 107135967, together with an English translation thereof.

International Search Report and Written Opinion in counterpart PCT/JP2018/038753.

Office Action dated Jun. 30, 2021 in counterpart Taiwan Application No. 109144647, together with English translation thereof.

Office Action dated Jun. 10, 2021 in counterpart Taiwan Application No. 107135967, together with English translation thereof.

Office Action dated Jul. 26, 2022 in counterpart Japanese Application No. 2018-190401, together with English translation thereof.

Office Action dated Sep. 1, 2022 in counterpart Korean Application No. 10-2020-7012545, together with English translation thereof.

Office Action dated Oct. 4, 2022 in counterpart Japanese Application No. 2018-190401, together with English translation thereof.

Extended European Search Report dated Jan. 30, 2023 in counterpart EP Application No. 22199546.7.

Office Action dated Jan. 19, 2023 in counterpart Chinese Application No. 202111632529.1, together with English translation thereof.

Office Action dated Jan. 10, 2023 in counterpart Brazil Application No. BR112020006498-0, together with English translation thereof.

Office Action dated Jul. 14, 2023 in counterpart Malaysia Application No. PI2020001802.

Office Action dated Aug. 25, 2023 in counterpart Vietnam Application No. 1-2020-02701, together with English translation thereof.

* cited by examiner (a)

(b)

(a)

(b)

(c)

(d)

MEMBER INCLUDING PAD ELECTRODE, INK CARTRIDGE, RECORDING APPARATUS

This application is a division of application Ser. No. 18/184,603 filed Mar. 15, 2023, currently pending, which was a division of application Ser. No. 17/669,086 filed Feb. 10, 2022, issued as U.S. Pat. No. 11,642,892 on May 9, 2023, which was a division of application Ser. No. 16/645,445 filed Mar. 6, 2020, issued as U.S. Pat. No. 11,376,859 on Jul. 5, 2022, which was a national stage filing under 35 U.S.C. § 371 of international application No. PCT/JP2018/038753 filed Oct. 11, 2018, and claims priority under 35 U.S.C. § 119 from Japan application No. 2017-199622 filed in Japan on Oct. 13, 2017 and from Japan application No. 2018-190401 filed in Japan on Oct. 5, 2018; the content of all of which are incorporated herein by reference as if set forth in full.

TECHNICAL FIELD

The present invention relates to a member including a pad electrode, an ink cartridge, and a recording apparatus capable of mounting the ink cartridge.

BACKGROUND ART

As a recording apparatus such as an inkjet printer and a laser beam printer, there is a recording apparatus to which a member (for example, an ink cartridge) including an electrode portion provided with a pad electrode can be mounted. When such a member is mounted on the recording apparatus, the pad electrode of the member is in a state in which it is electrically connected to the electric connection portion on the recording apparatus side.

Japanese Laid-open Patent Application No. 2008-273173 describes an ink cartridge provided with a circuit board (pad electrode) including a memory element. When this ink cartridge is mounted to the recording apparatus, the connection terminal of the recording apparatus and the pad electrode of the ink cartridge are brought into the electrical connection with each other.

SUMMARY OF THE INVENTION

Representative structures are as follows.

A member mountable to a mounting portion provided with an ink receiving tube and a plurality of electrical connecting portions, said member comprising a first portion including an outwardly facing surface and provided with an inserting portion into which the ink receiving tube is capable of being inserted; a second portion opposite from said first portion; and a third portion connecting said first portion and said second portion with each other and provided with a plurality of pad electrodes electrically connectable with said electrical connecting portions, wherein said member is mountable to the mounting portion by being inserted into said mounting portion in an inserting direction with said first portion at a leading side, and wherein said pad electrodes are electrically connectable with said electrical connecting portions by being moved in a direction different from the inserting direction.

Further features of the present description will be apparent from the following description of the example with reference to the attached drawings.

Figure 2:
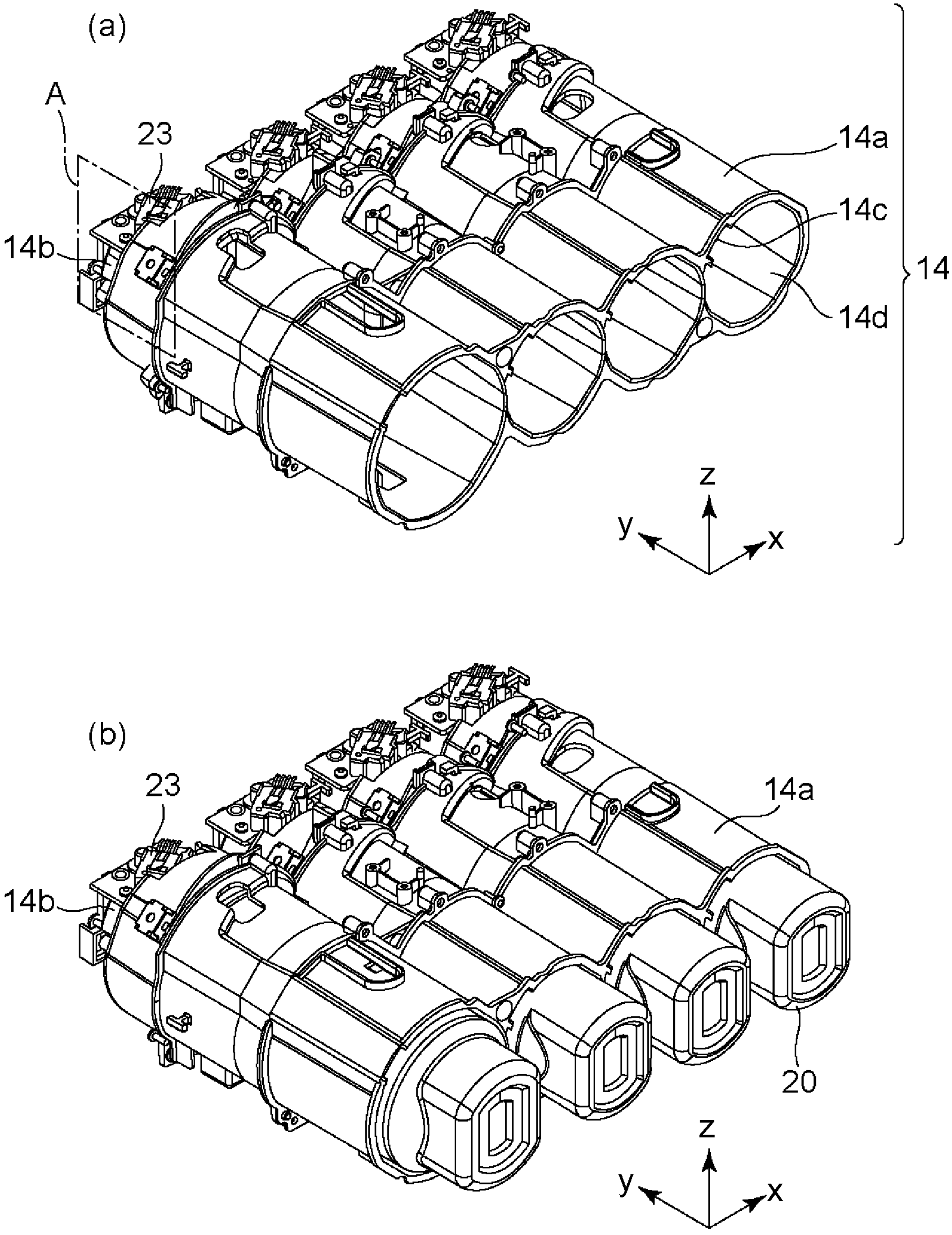

Parts (a) and (b) of FIG. 2 are perspective views illustrating a structure of a mounting portion.

Figure 3:
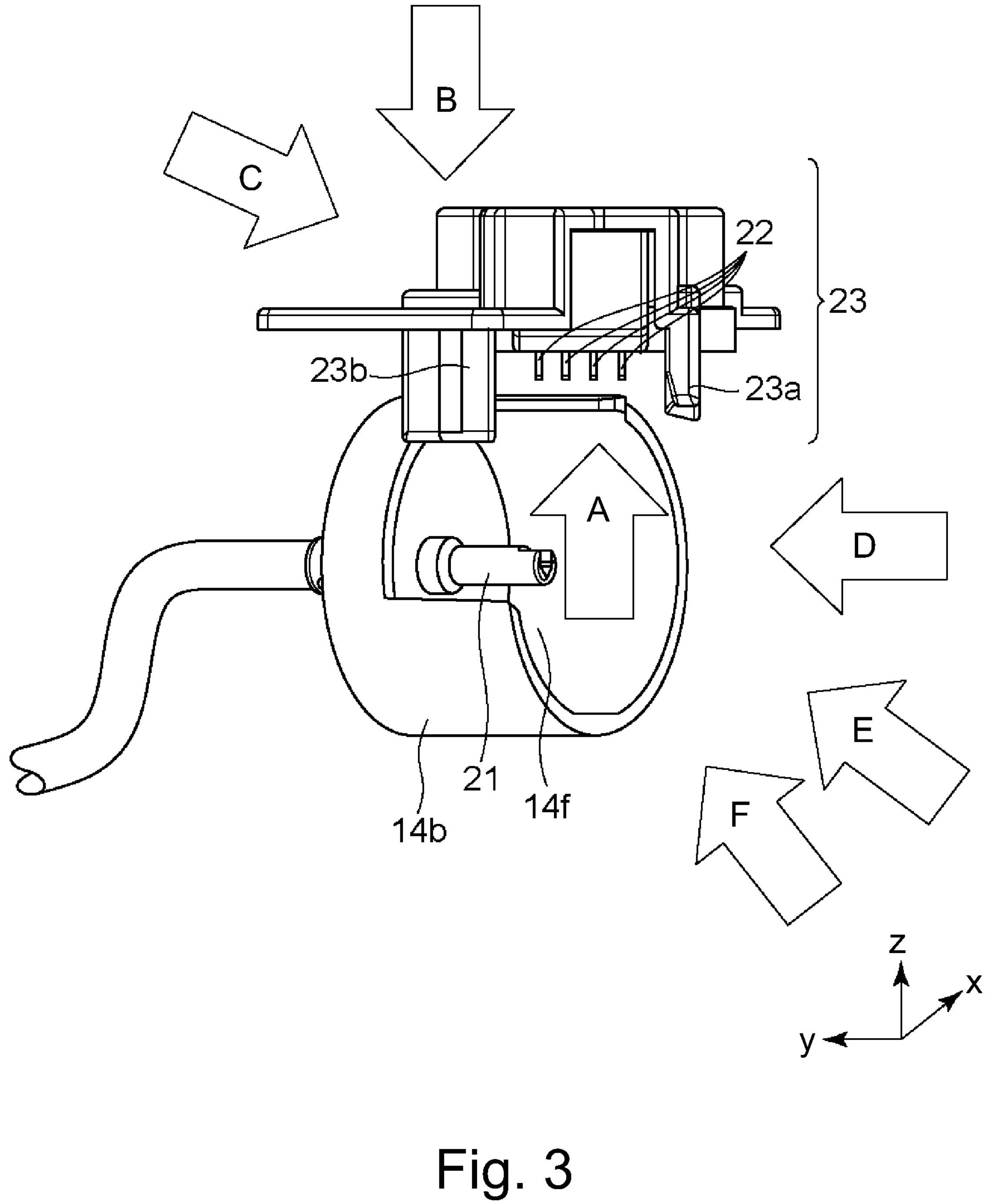

FIG. 3 is a perspective view illustrating the structure around the electrical connecting portion of the mounting portion.

Figure 4:
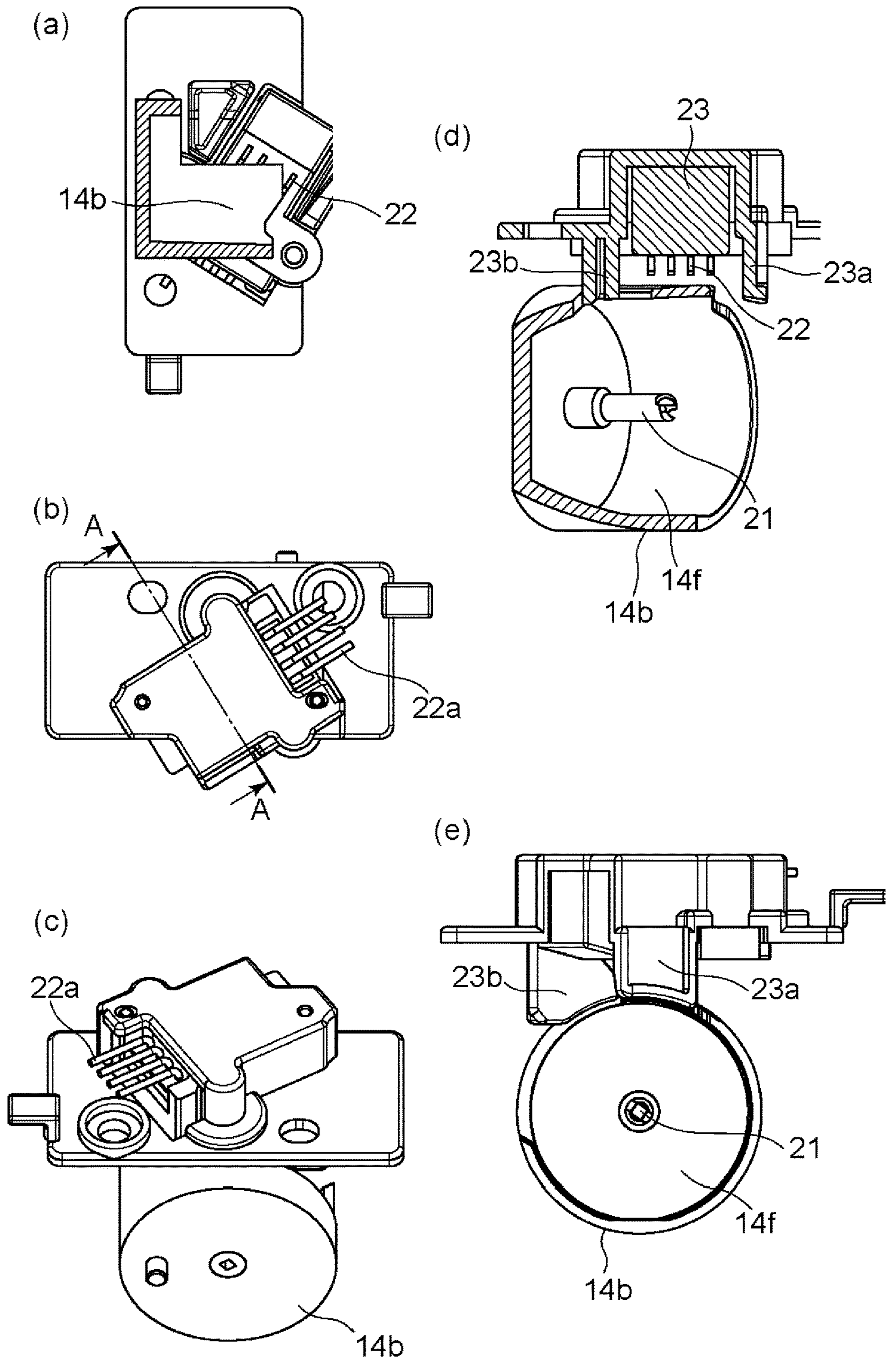

Parts (a), (b), (c), (d) and (e) of FIG. 4 are views illustrating a structure around the electrical connecting portion of the mounting portion.

Figure 5:
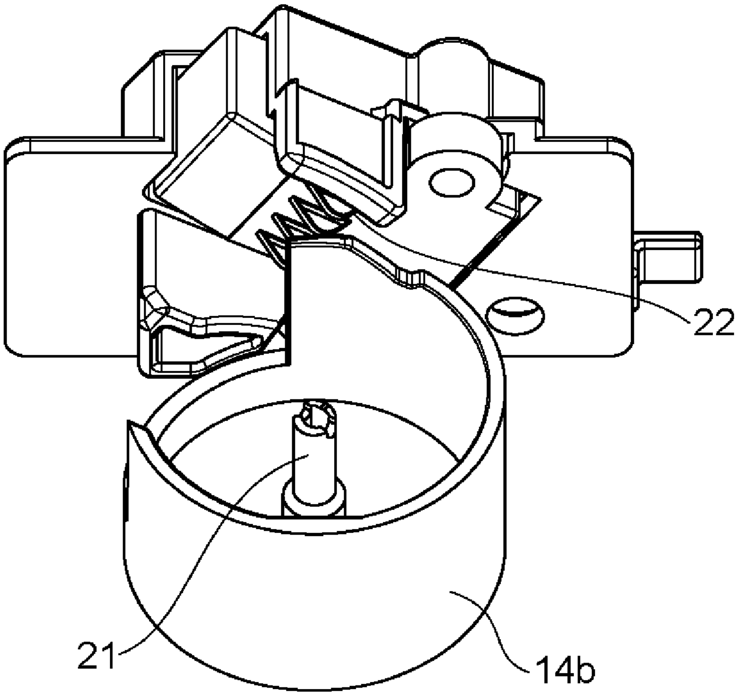
Figure 5:
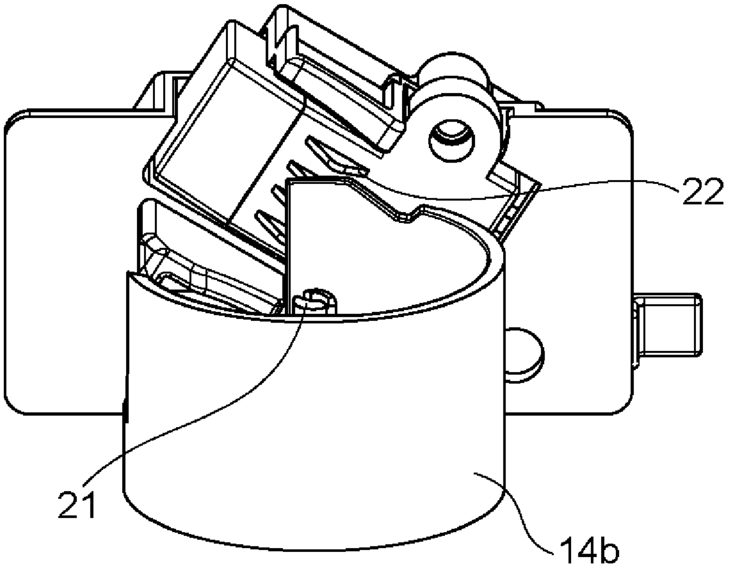

Parts (a) and (b) of FIG. 5 are perspective views illustrating the structure around the electrical connecting portion of the mounting portion.

Figure 6:
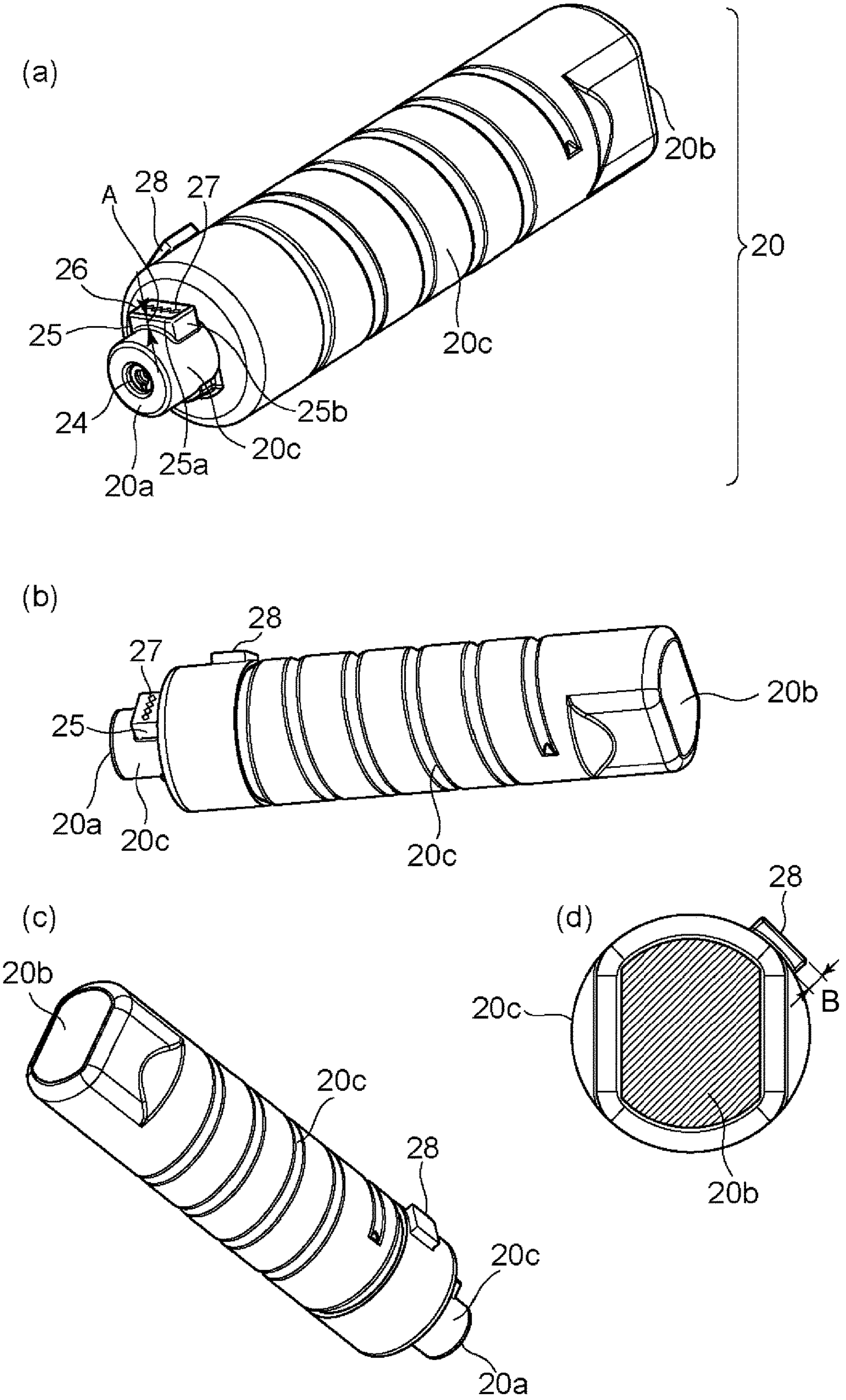

Parts (a), (b), (c) and (d) of FIG. 6 are views illustrating a structure of an ink cartridge.

Figure 7:
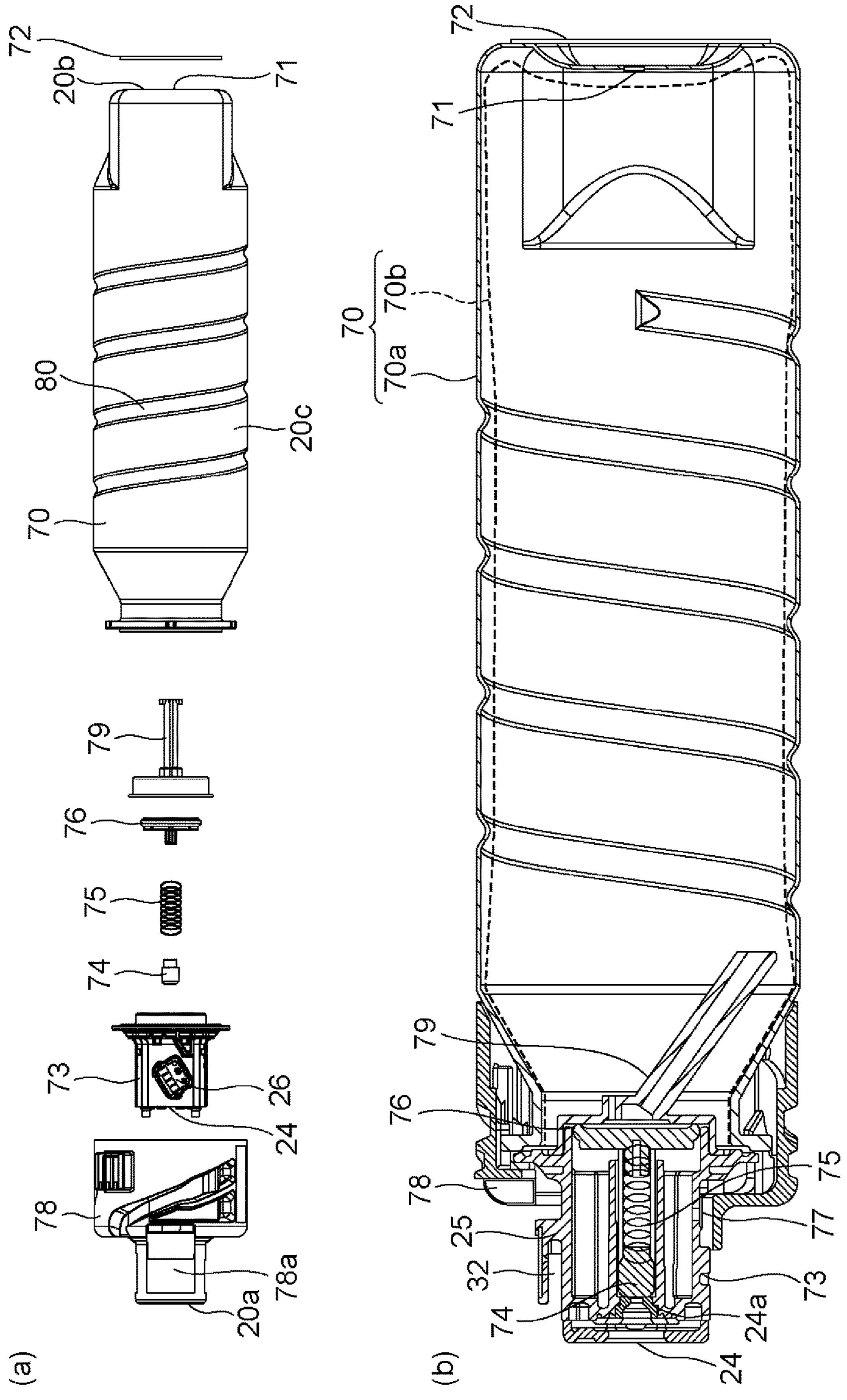

Parts (a) and (b) of FIG. 7 are views illustrating a structure of the ink cartridge.

Figure 8:
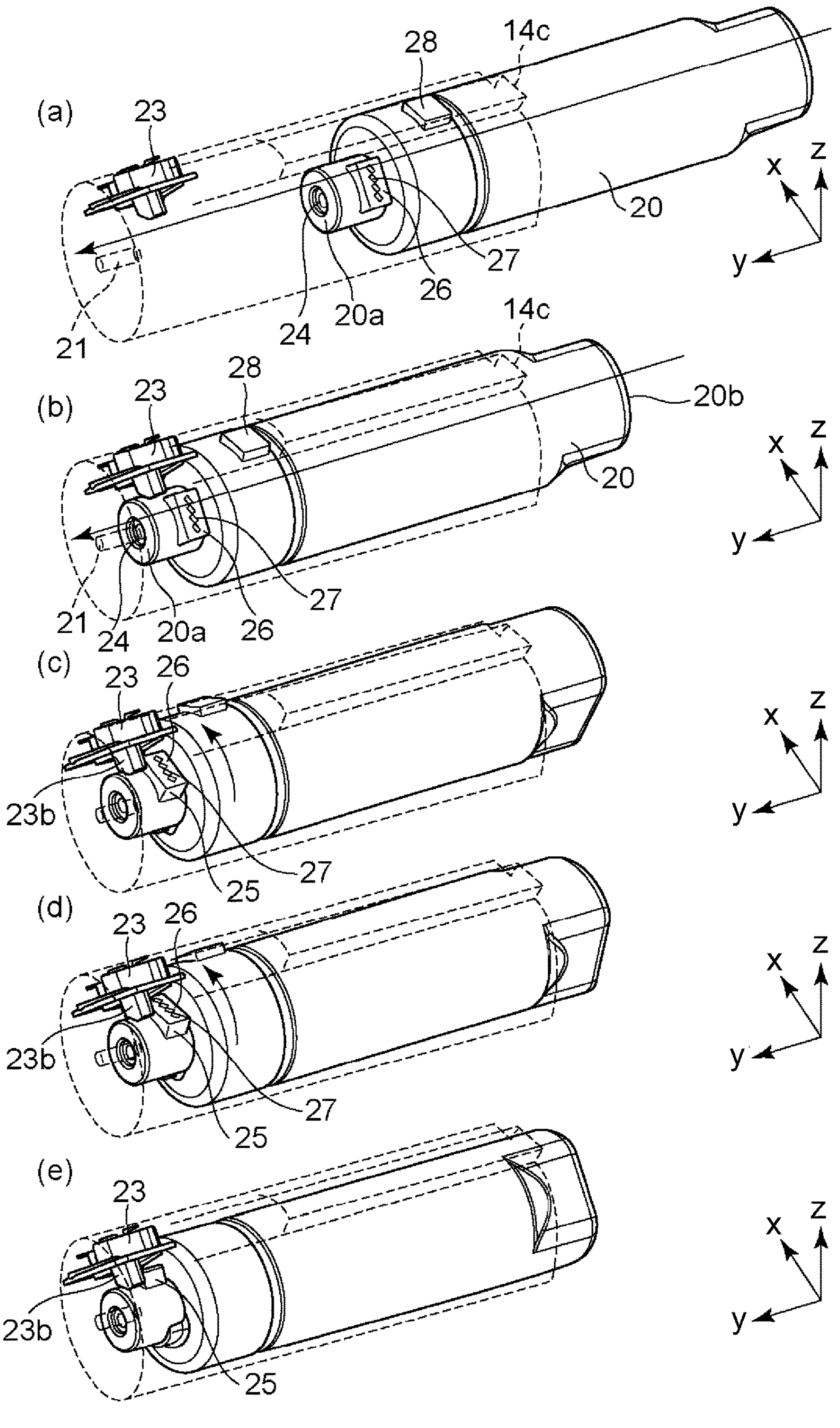

Parts (a), (b), (c), (d) and (e) of FIG. 8 are perspective views illustrating how the ink cartridge is mounted.

Figure 9:
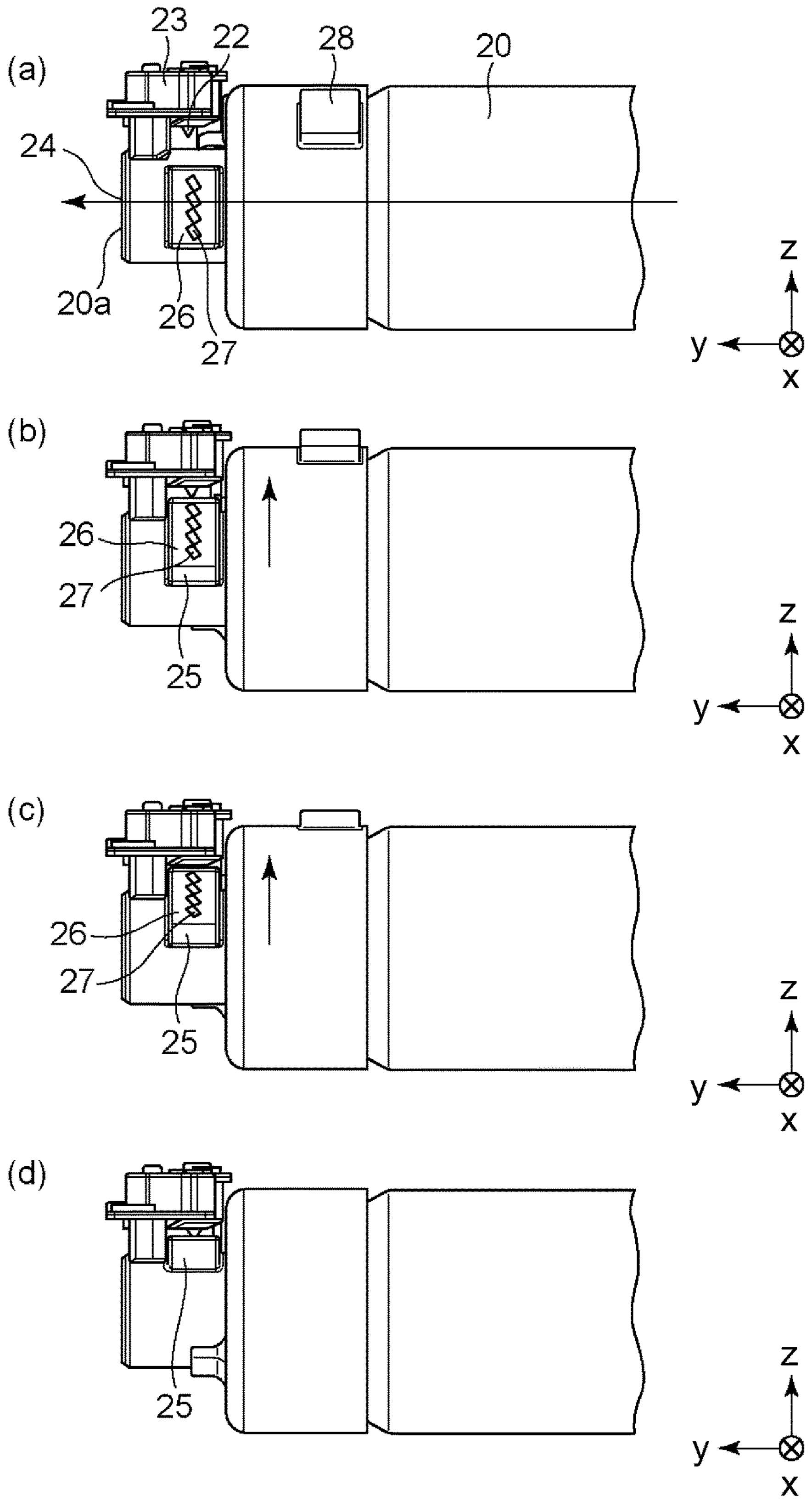

Parts (a), (b), (c) and (d) of FIG. 9 are views illustrating how the ink cartridge is mounted.

Figure 10:
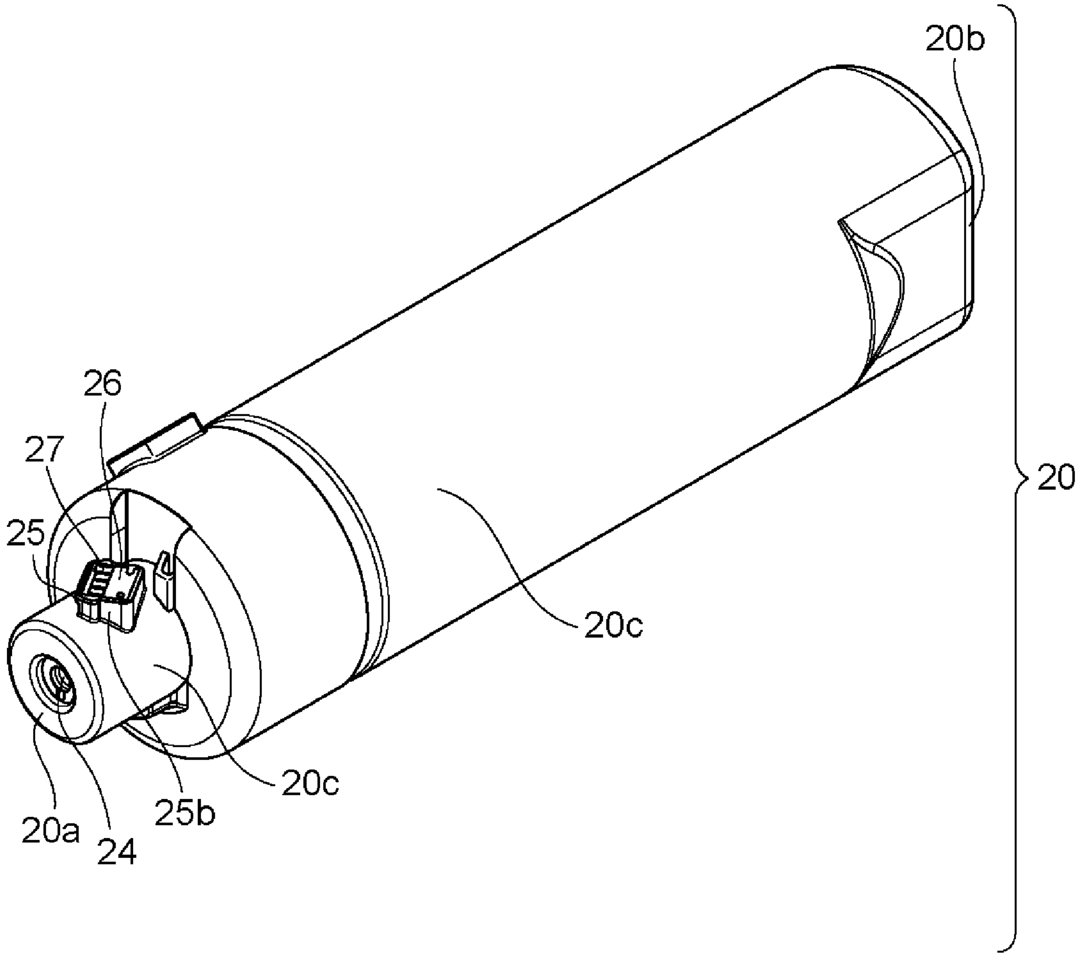

FIG. 10 is a perspective view illustrating a structure of an ink cartridge.

Figure 11:
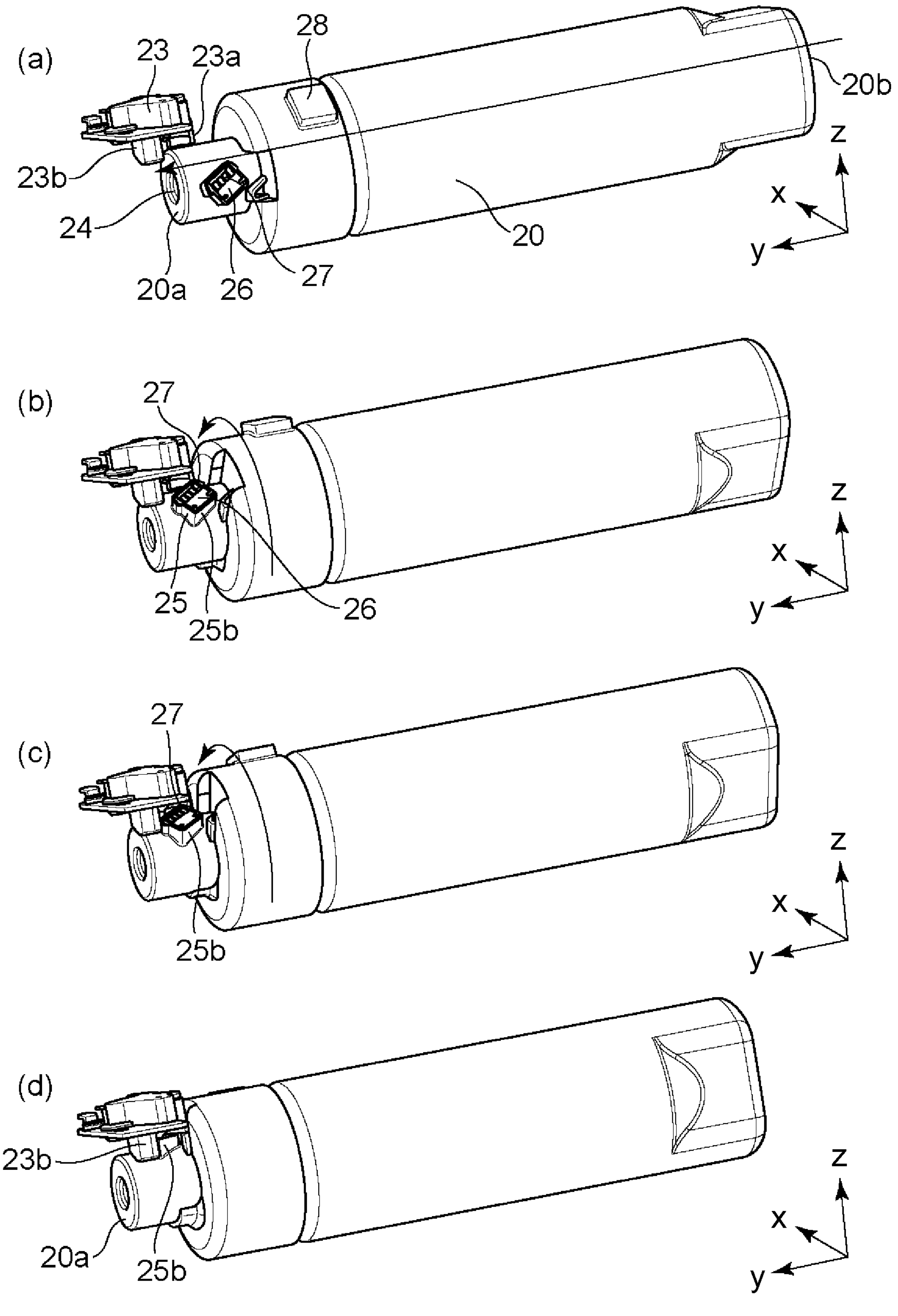

Parts (a), (b), (c) and (d) of FIG. 11 are perspective views illustrating how the ink cartridge is mounted.

Figure 12:
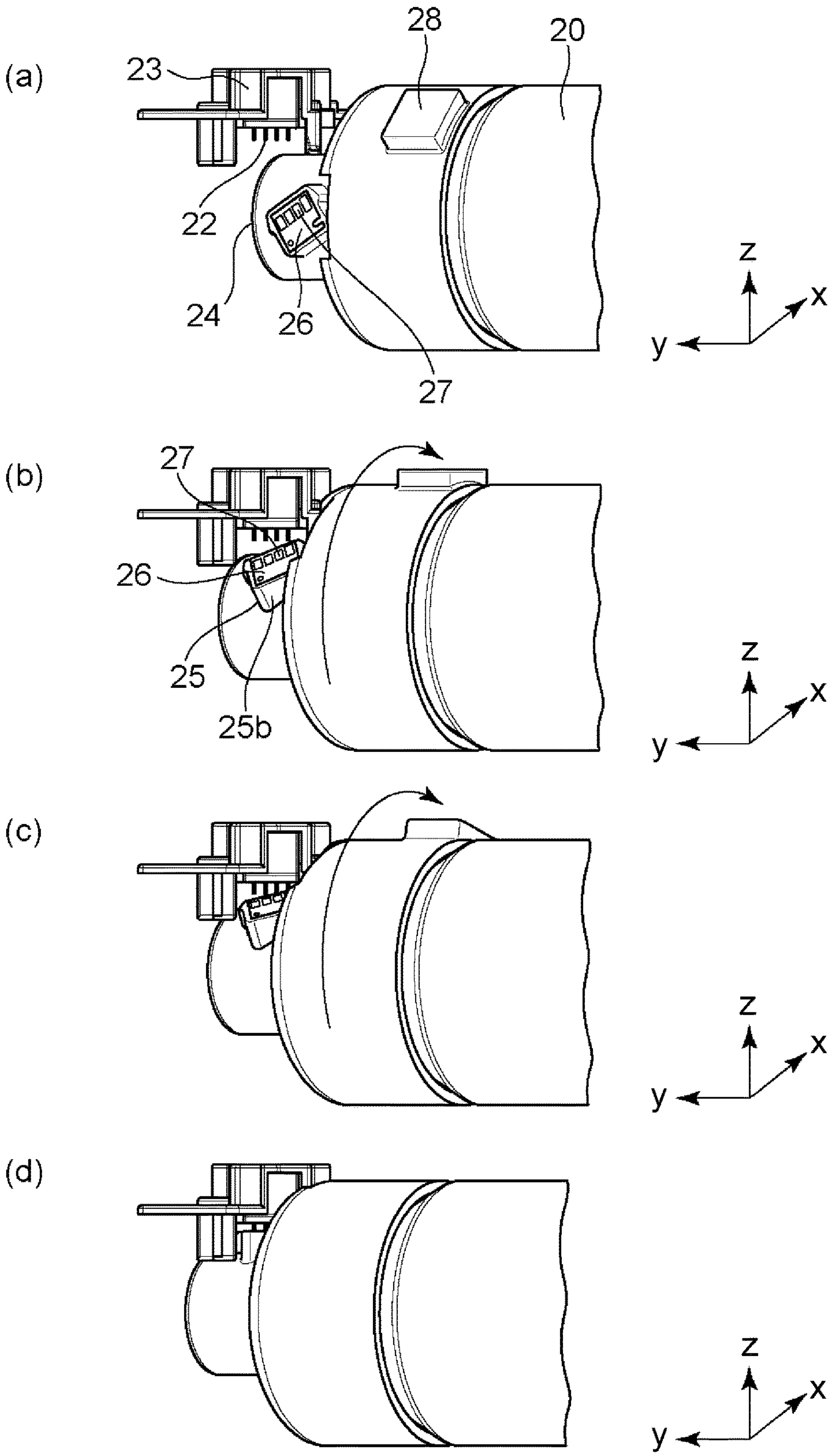

Parts (a), (b), (c) and (d) of FIG. 12 are perspective views illustrating how the ink cartridge is mounted.

Figure 13:
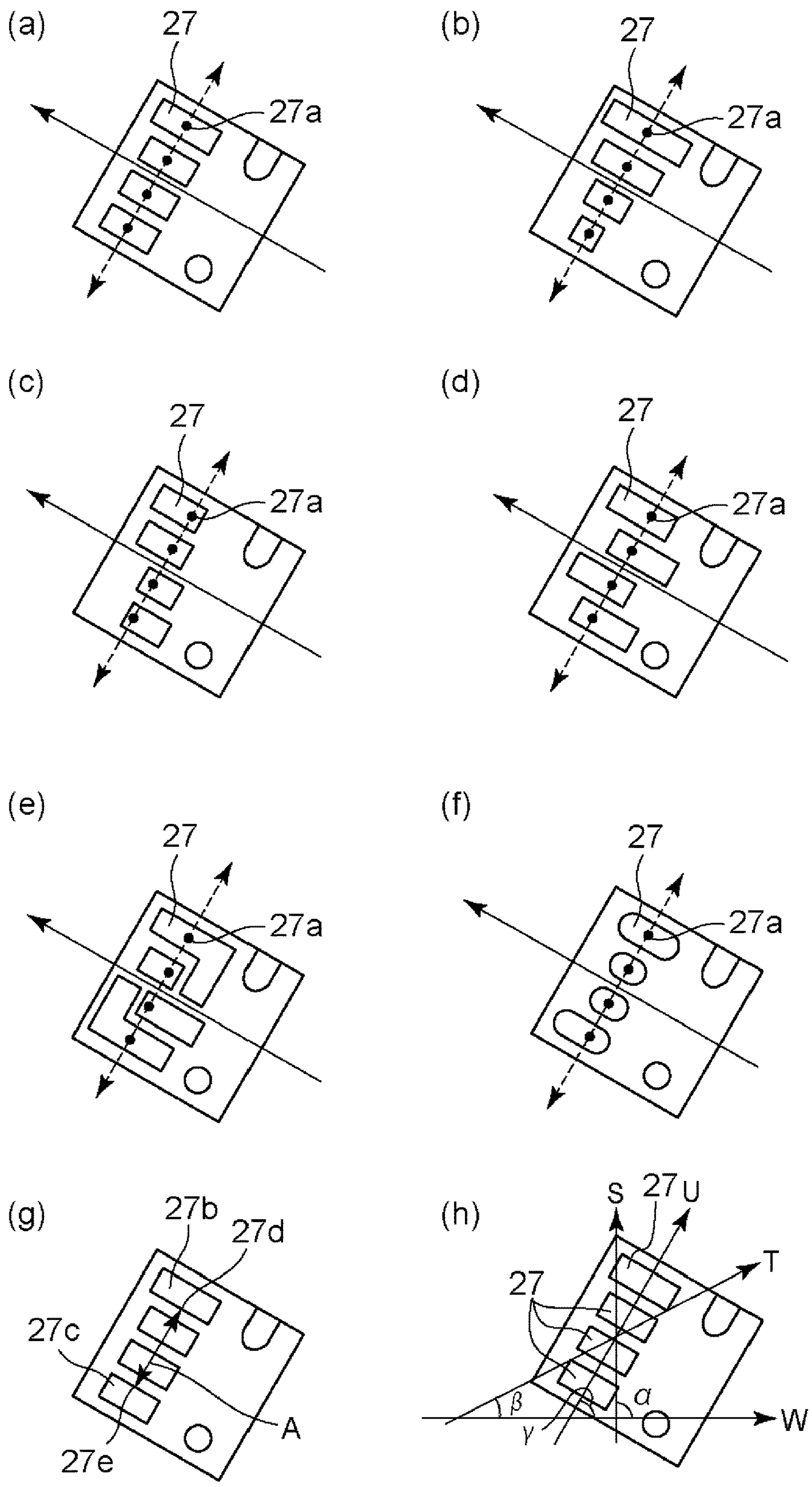

Parts (a), (b), (c), (d), (e), (f), (g) and (h) of FIG. 13 are illustrations showing an arrangement of pad electrodes.

Figure 14:
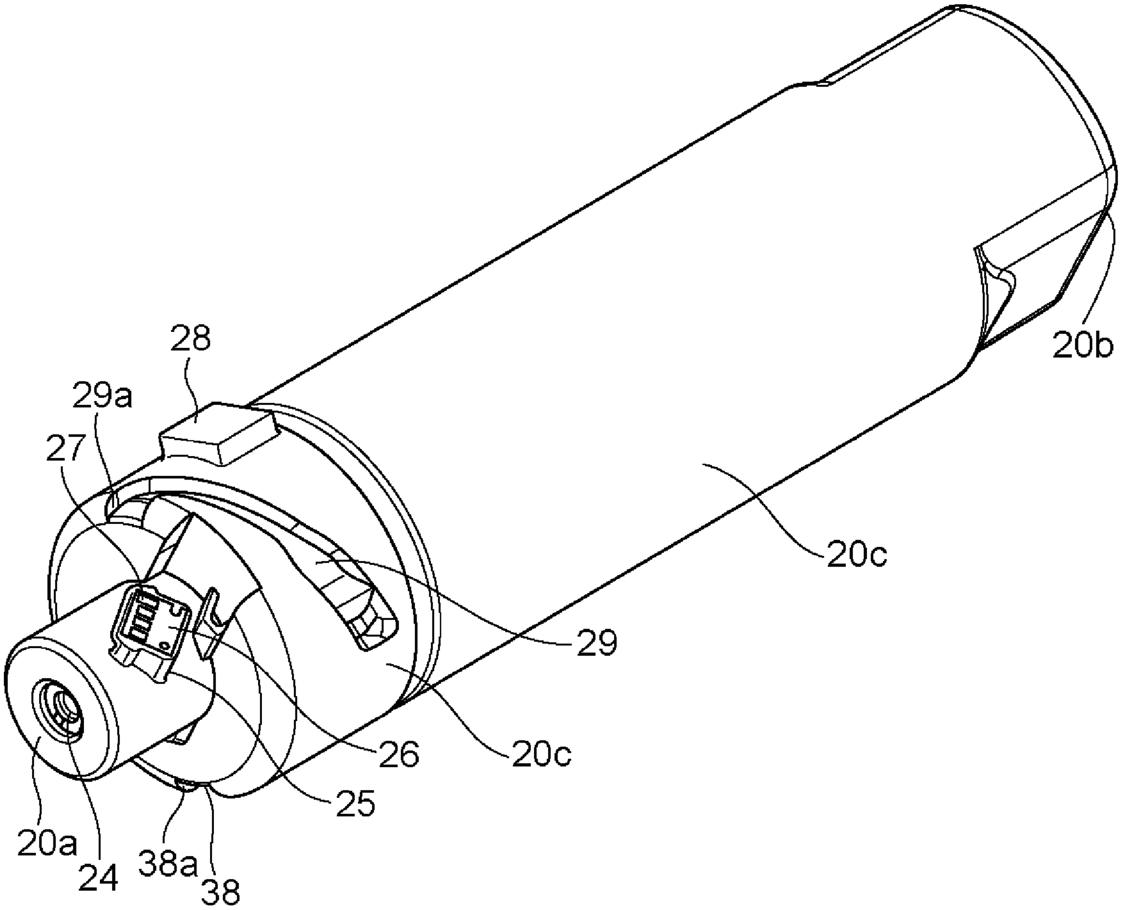

FIG. 14 is a perspective view illustrating a structure of an ink cartridge.

Figure 15:
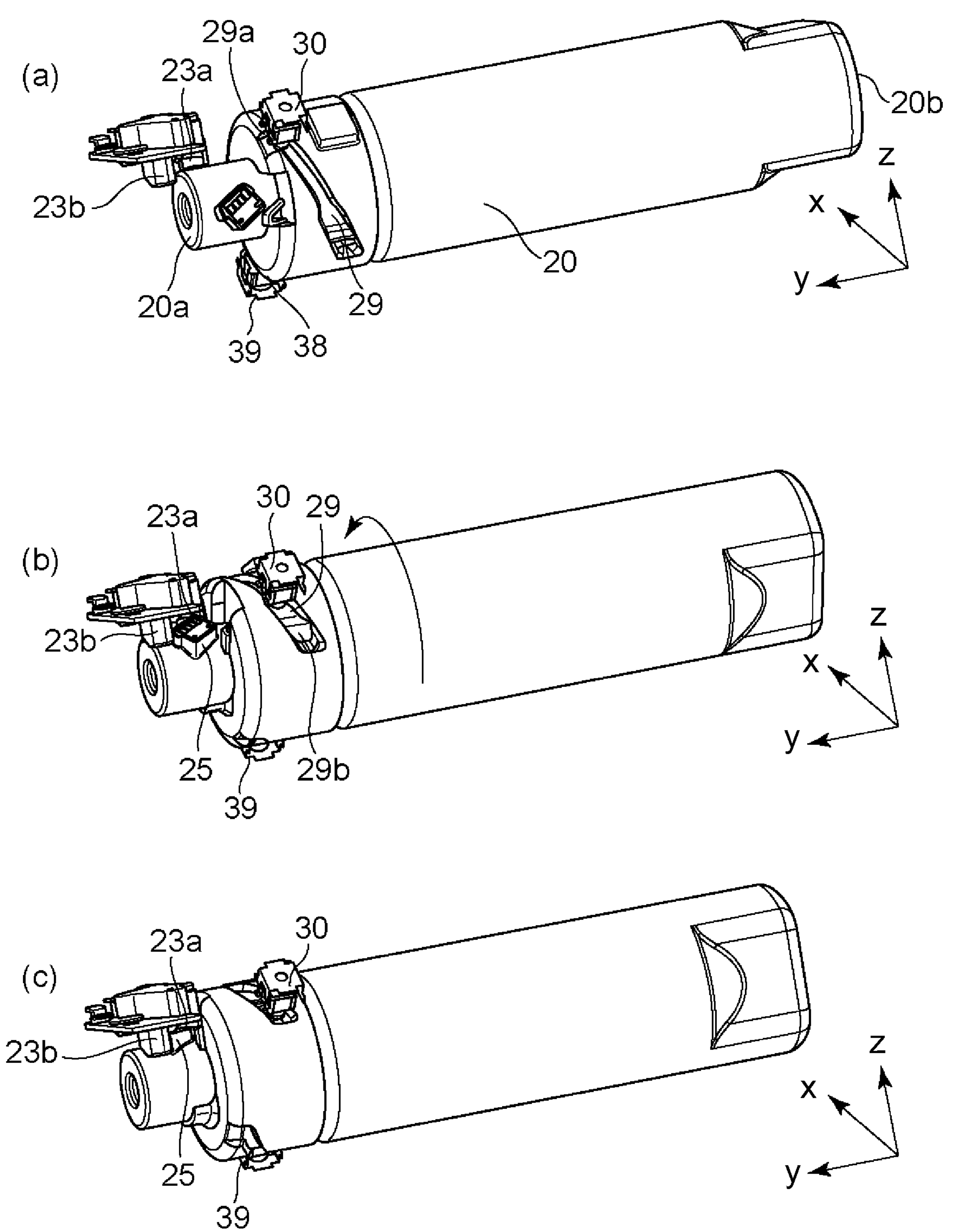

Parts (a), (b) and (c) of FIG. 15 are perspective views illustrating how the ink cartridge is mounted.

Figure 16:
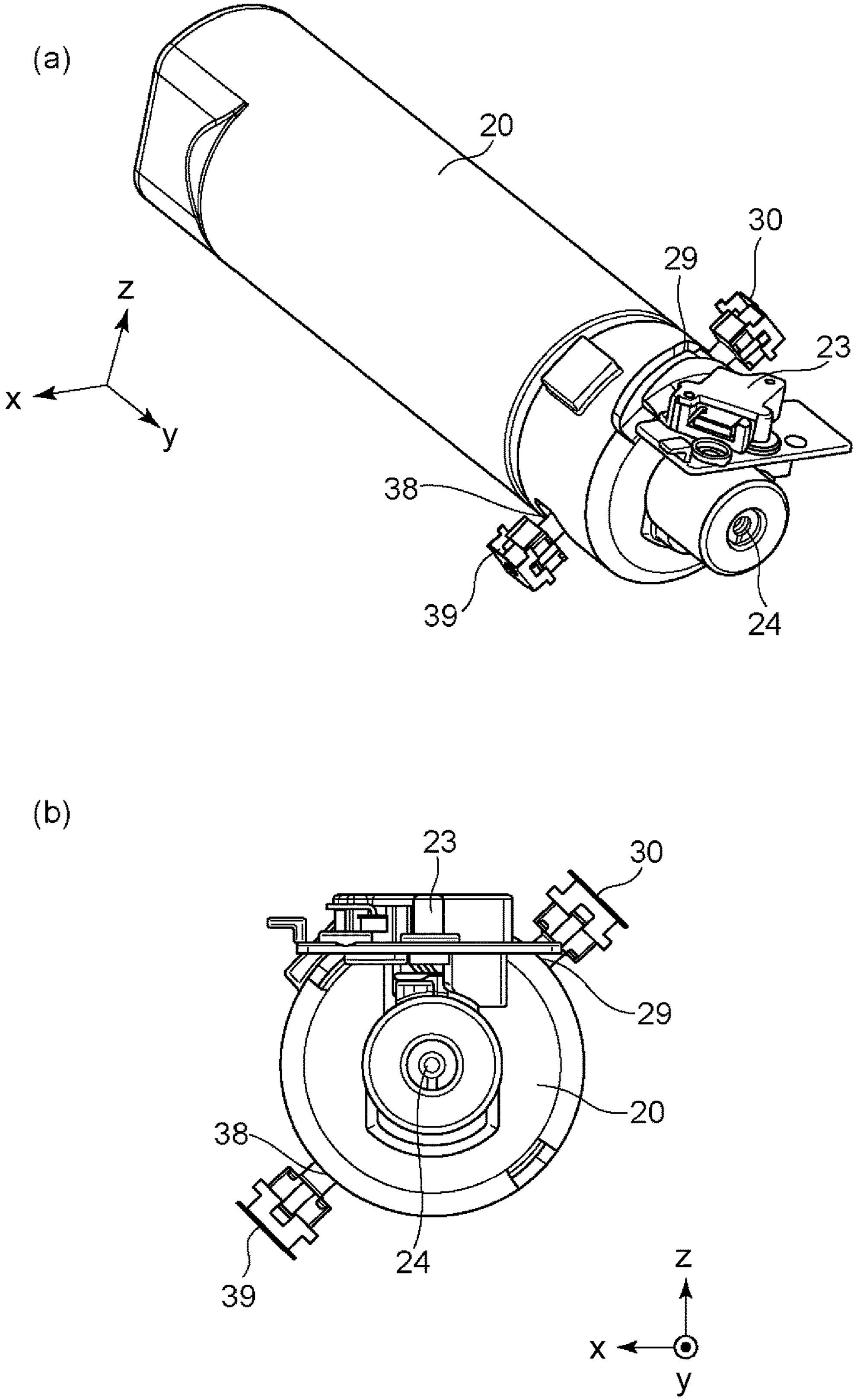

Parts (a) and (b) FIG. 16 are views illustrating a state of engagement of a guide portion of an ink cartridge.

Figure 17:
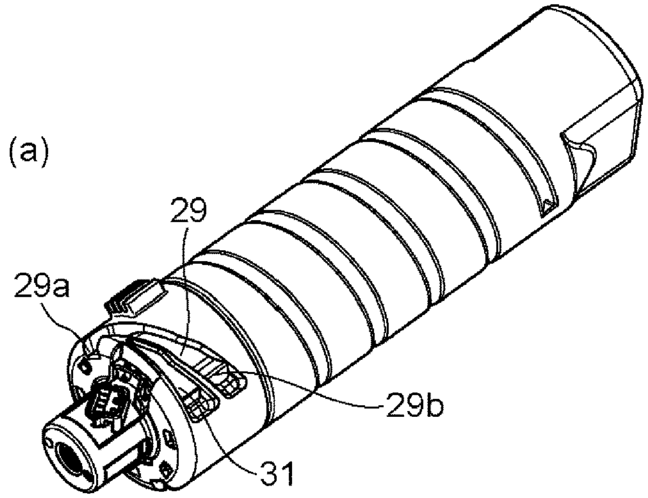
Figure 17:
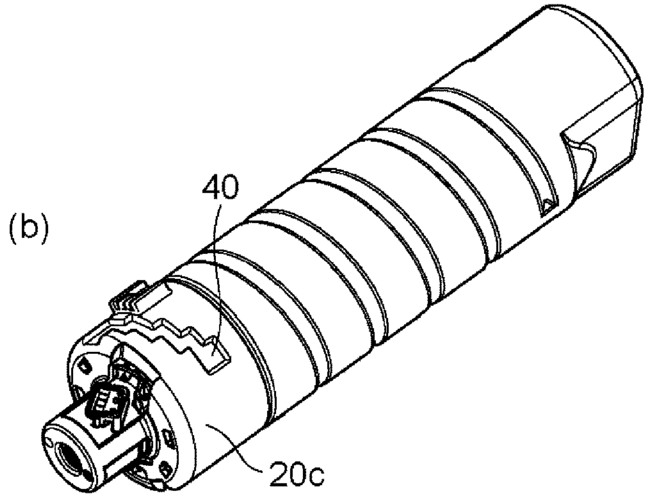
Figure 17:
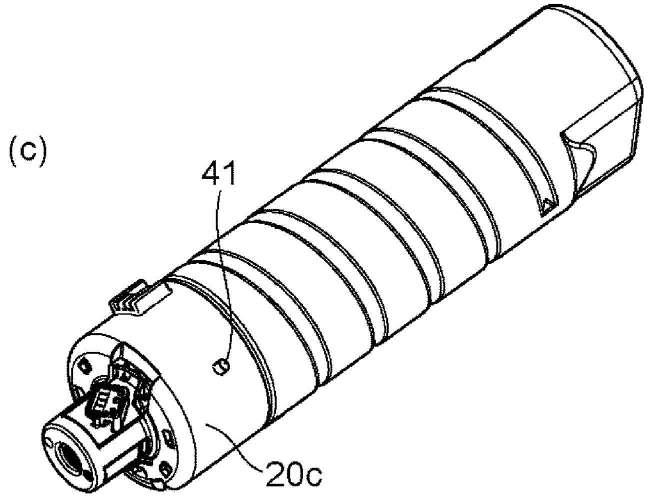

Parts (a), (b) and (c) of FIG. 17 are perspective views illustrating a structure of the ink cartridge.

Figure 18:
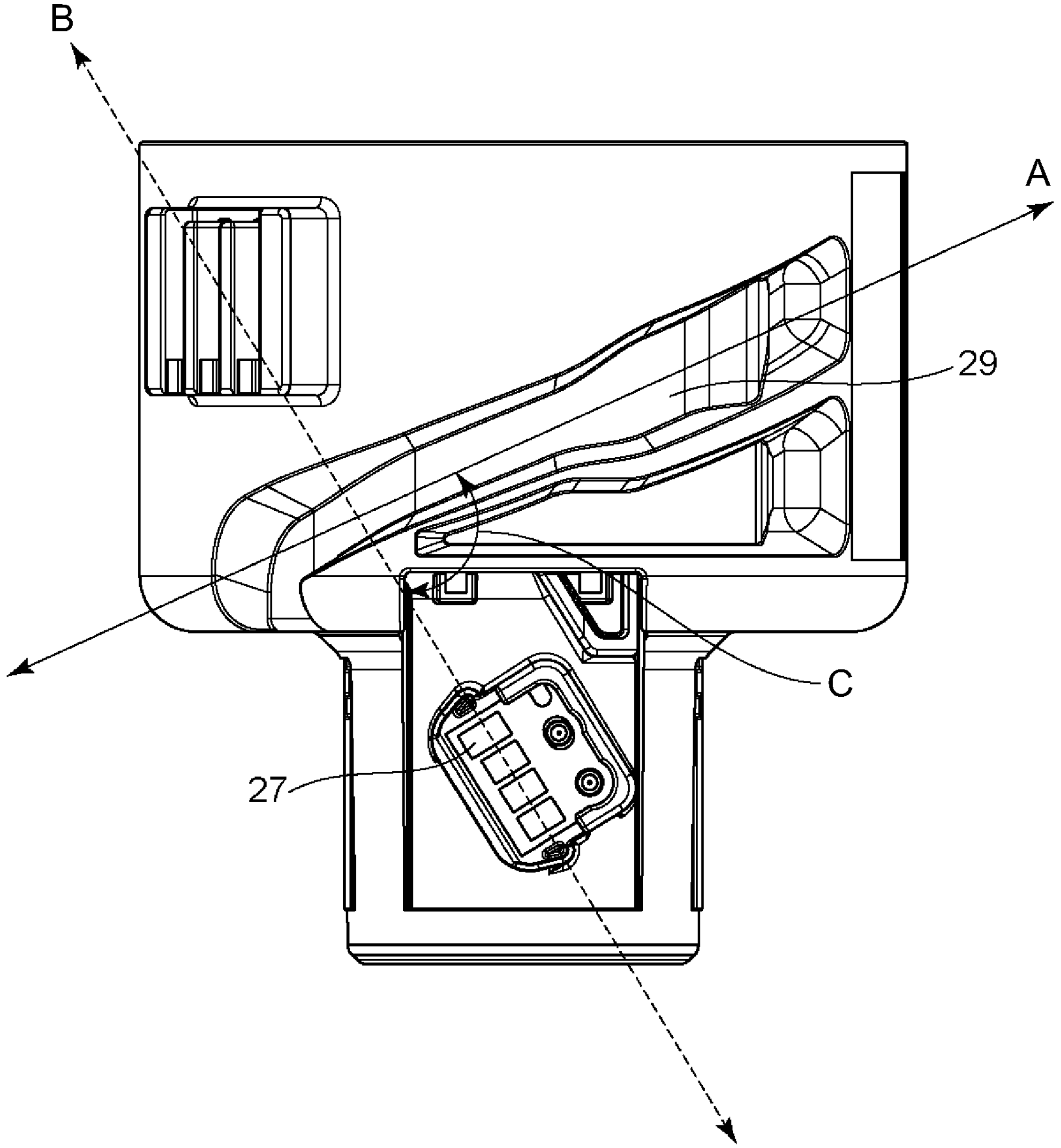

FIG. 18 is a view illustrating a structure of pad electrodes of the ink cartridge and the periphery of the guide portion.

Figure 19:
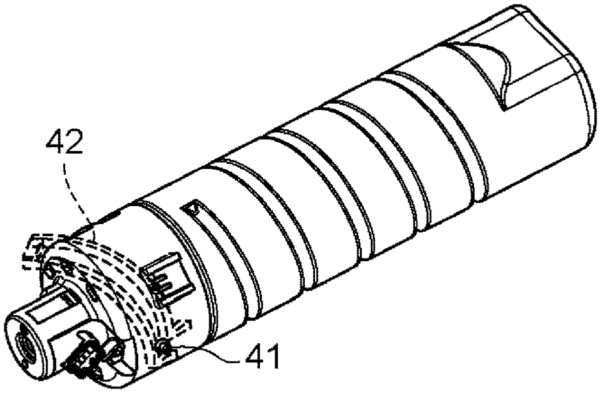
Figure 19:
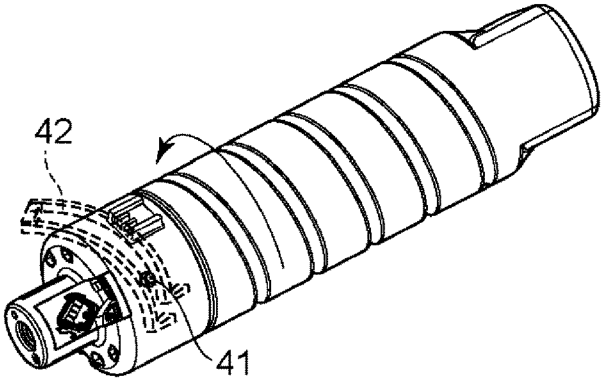
Figure 19:
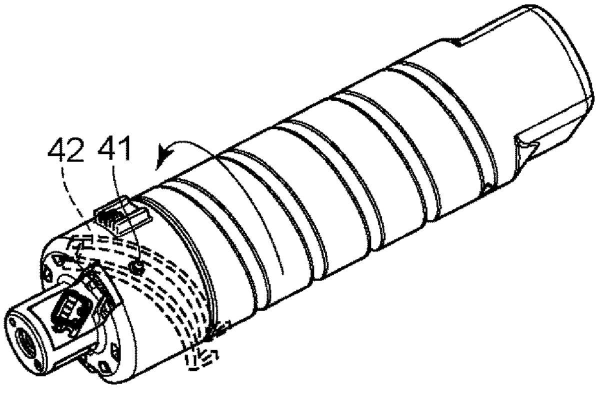
Figure 19:
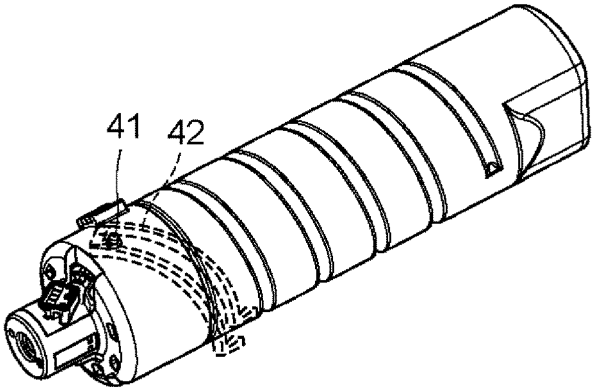

Parts (a), (b), (c) and (d) of FIG. 19 are perspective views illustrating how the ink cartridge is mounted.

Figure 20:
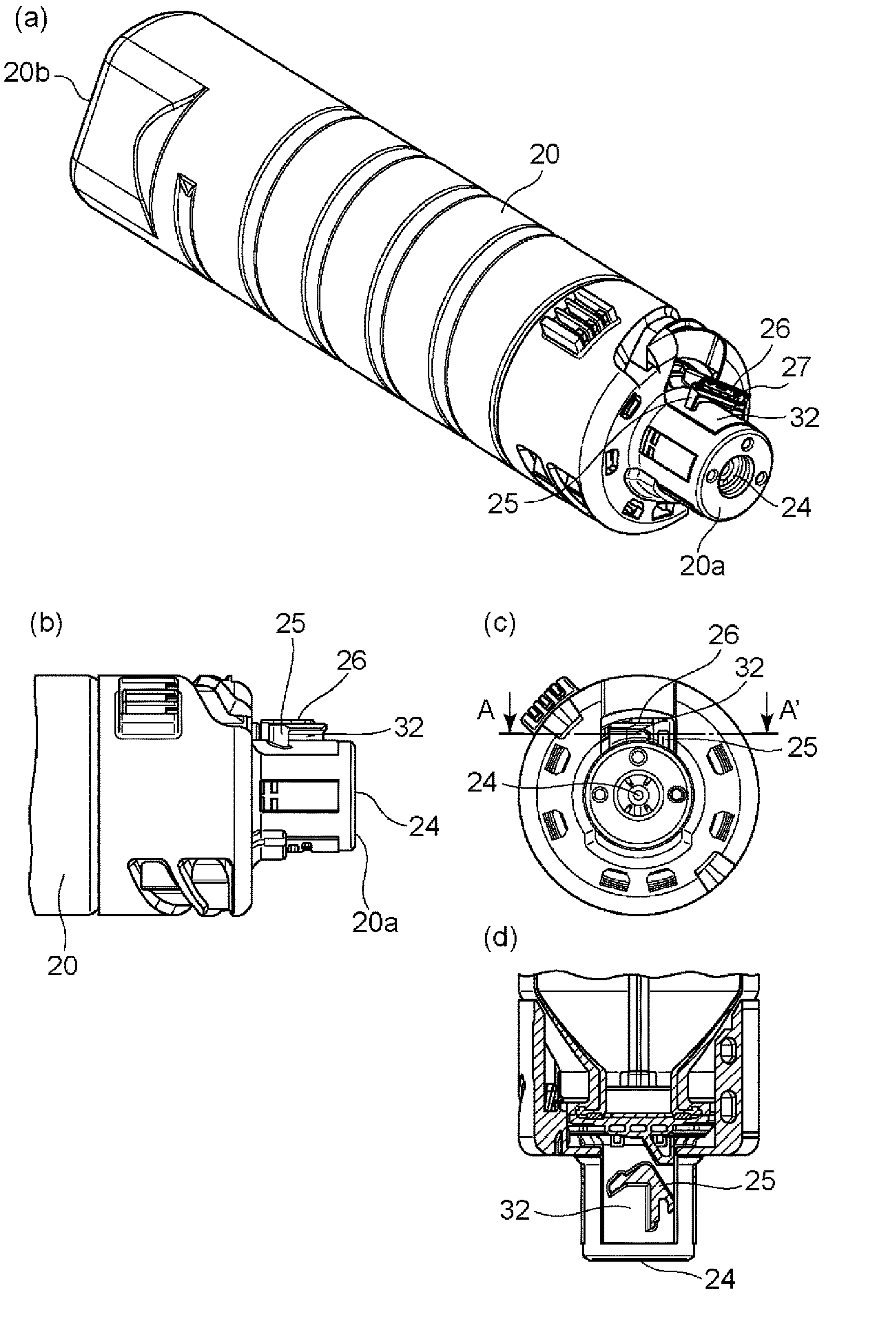

Parts (a), (b), (c) and (d) of FIG. 20 are views illustrating a structure of the ink cartridge.

Figure 21:
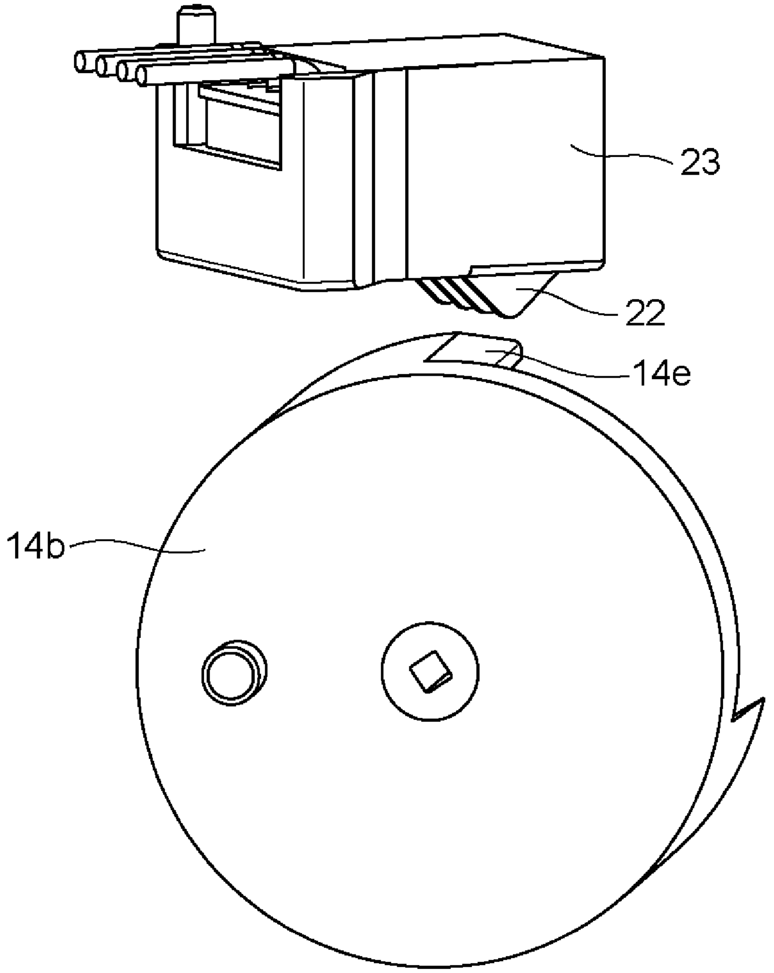

FIG. 21 is a view illustrating a structure around the electrical connecting portion of the mounting portion.

Figure 22:
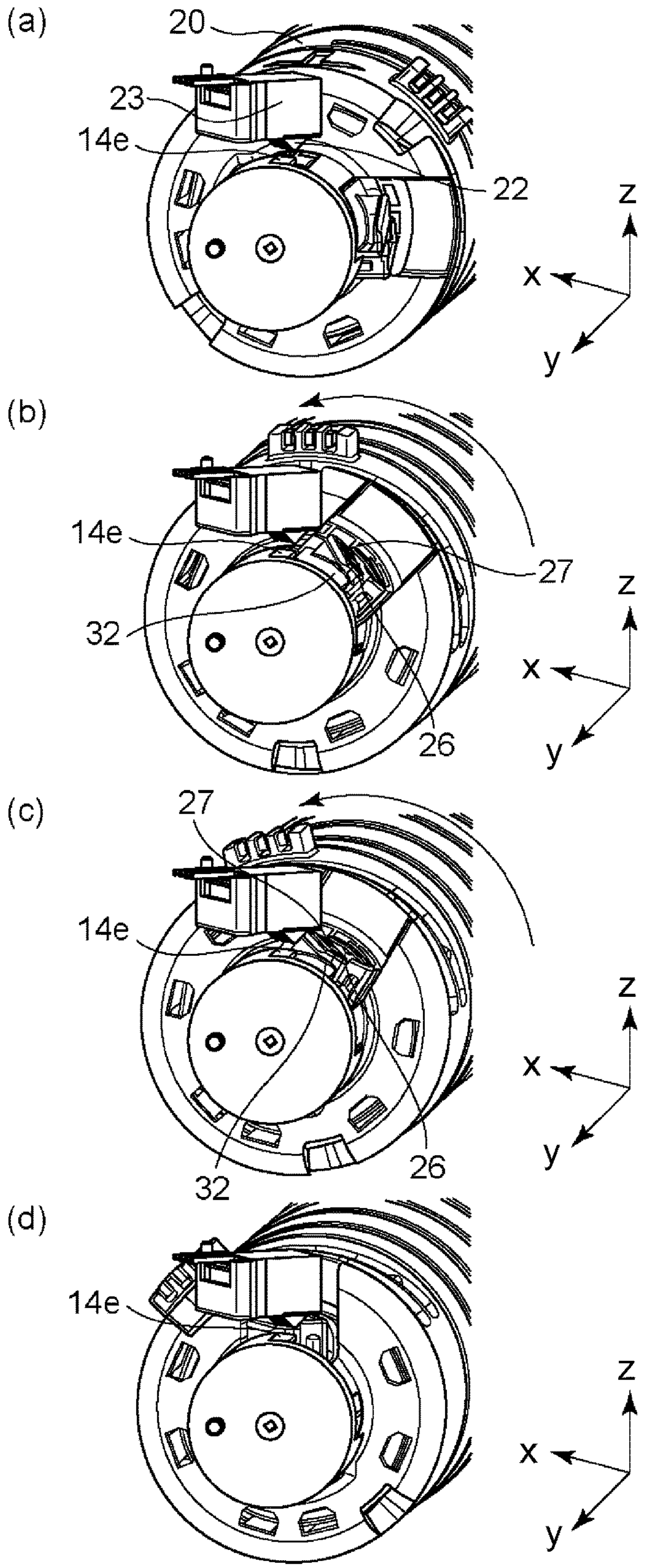

Parts (a), (b), (c) and (d) of FIG. 22 are perspective views illustrating how the ink cartridge is mounted.

Figure 23:
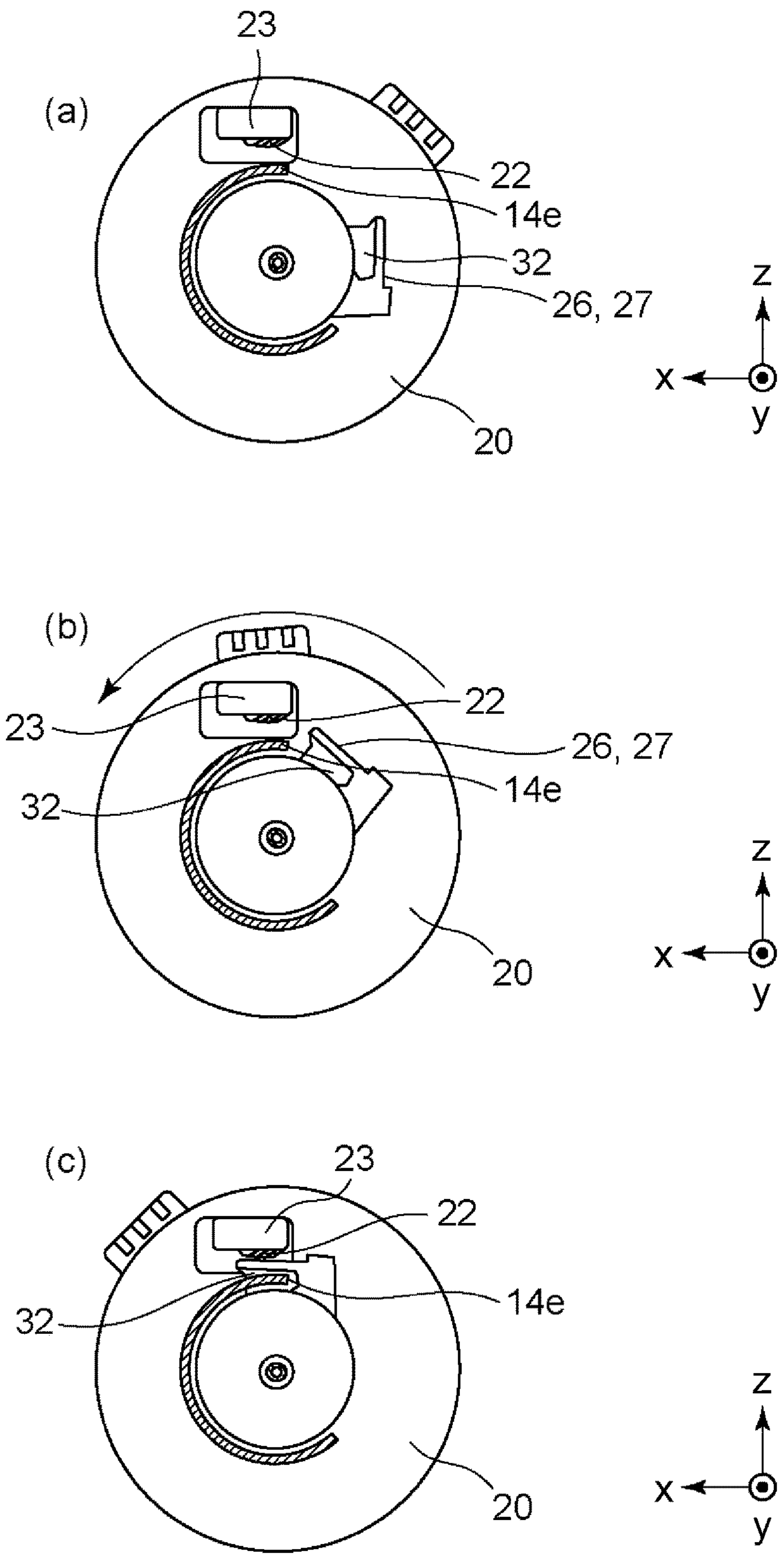

Parts (a), (b) and (c) of FIG. 23 are views illustrating how the ink cartridge is mounted.

Figure 24:
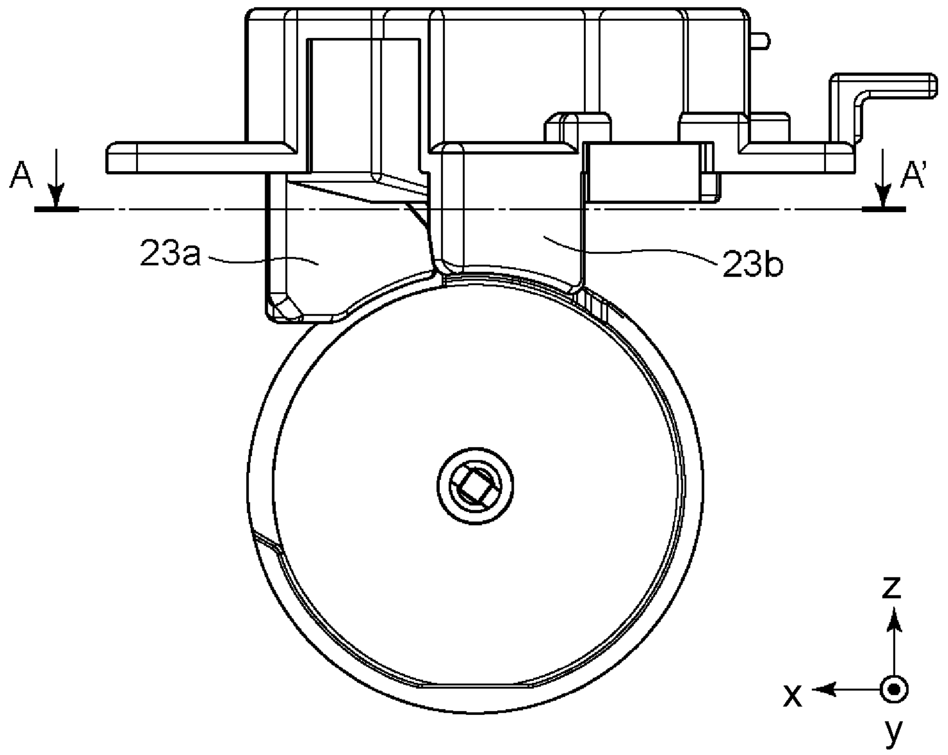

FIG. 24 is a view illustrating the structure around the electrical connecting portion of the mounting portion.

Figure 25:
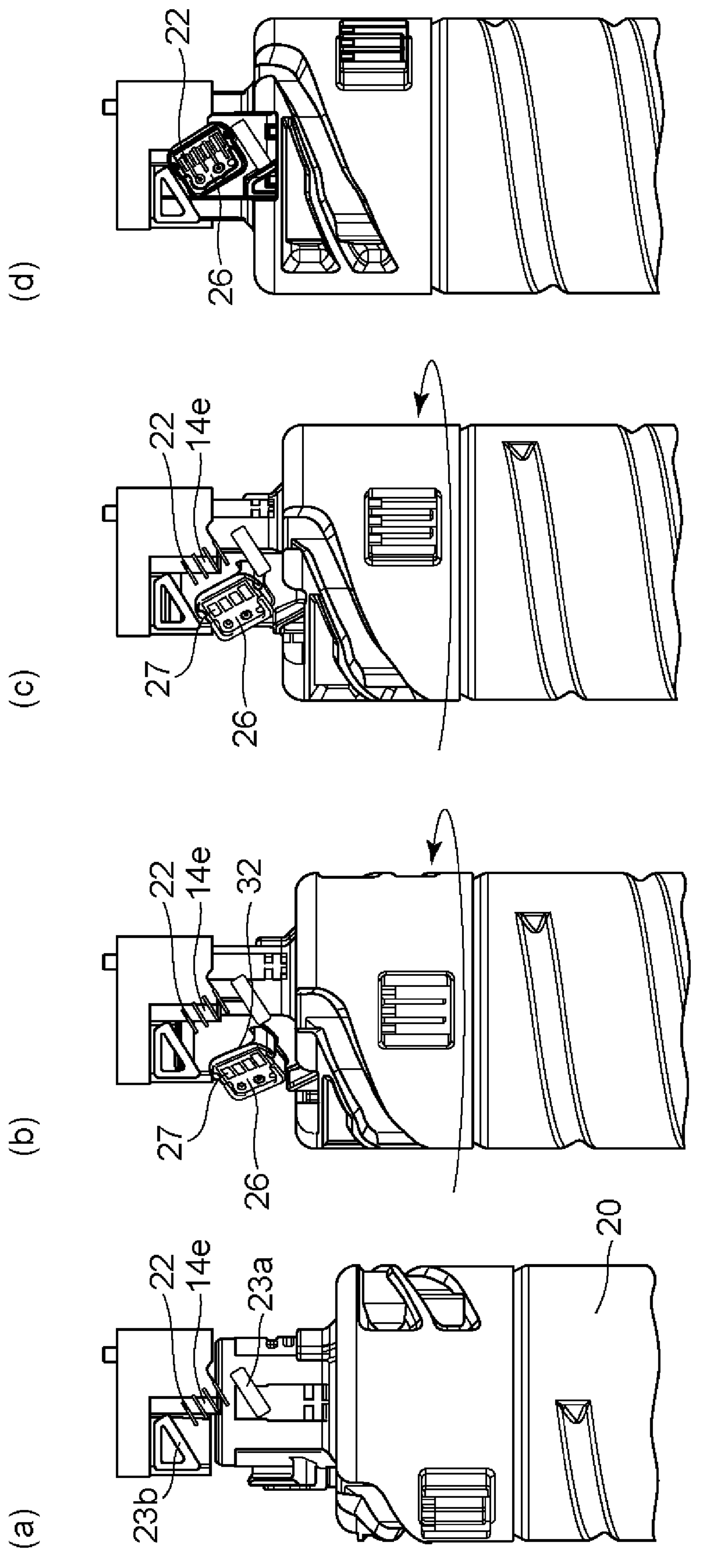

Parts (a), (b), (c) and (d) of FIG. 25 are views illustrating how the ink cartridge is mounted.

Figure 26:
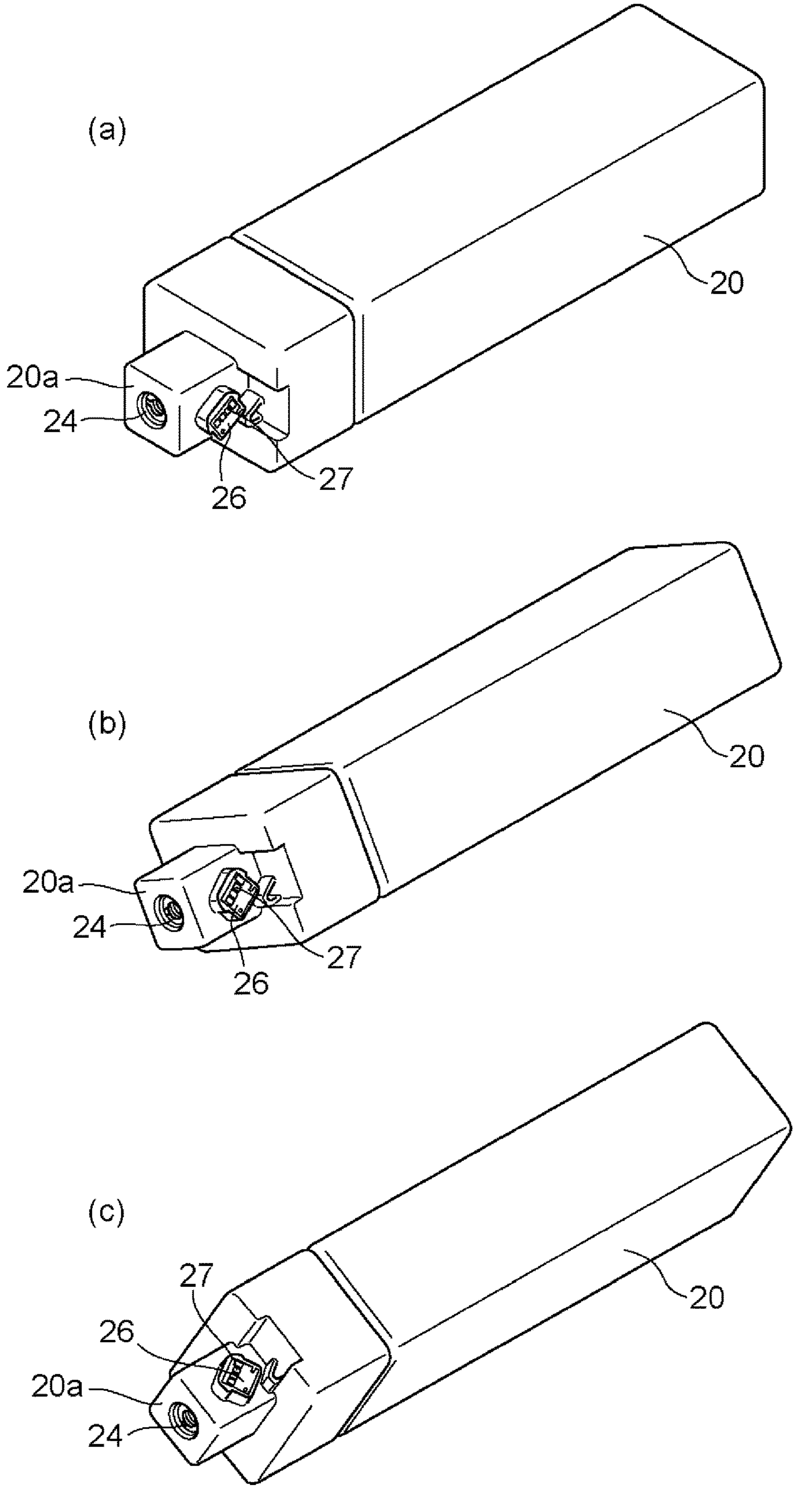

Parts (a), (b) and (c) of FIG. 26 are perspective views illustrating how the ink cartridge is mounted.

Figure 27:
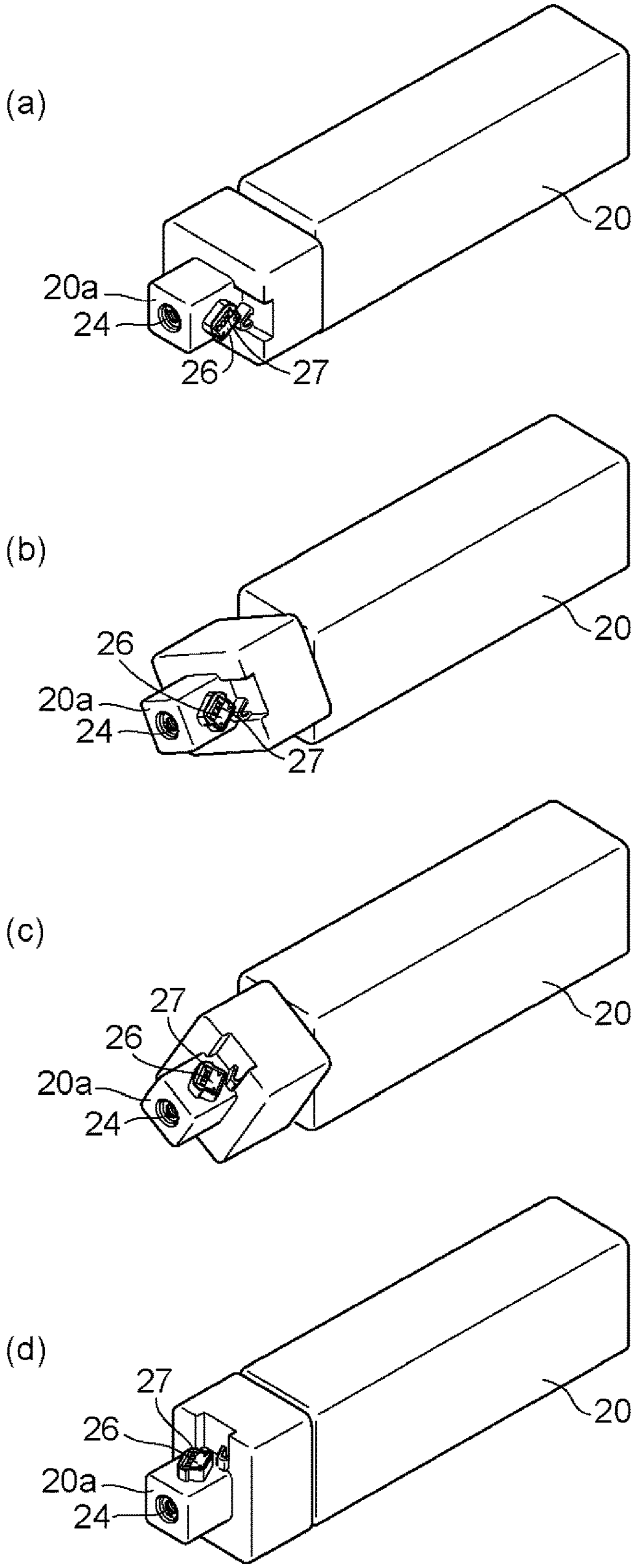

Parts (a), (b), (c) and (d) of FIG. 27 are perspective views illustrating how the ink cartridge is mounted.

Figure 28:
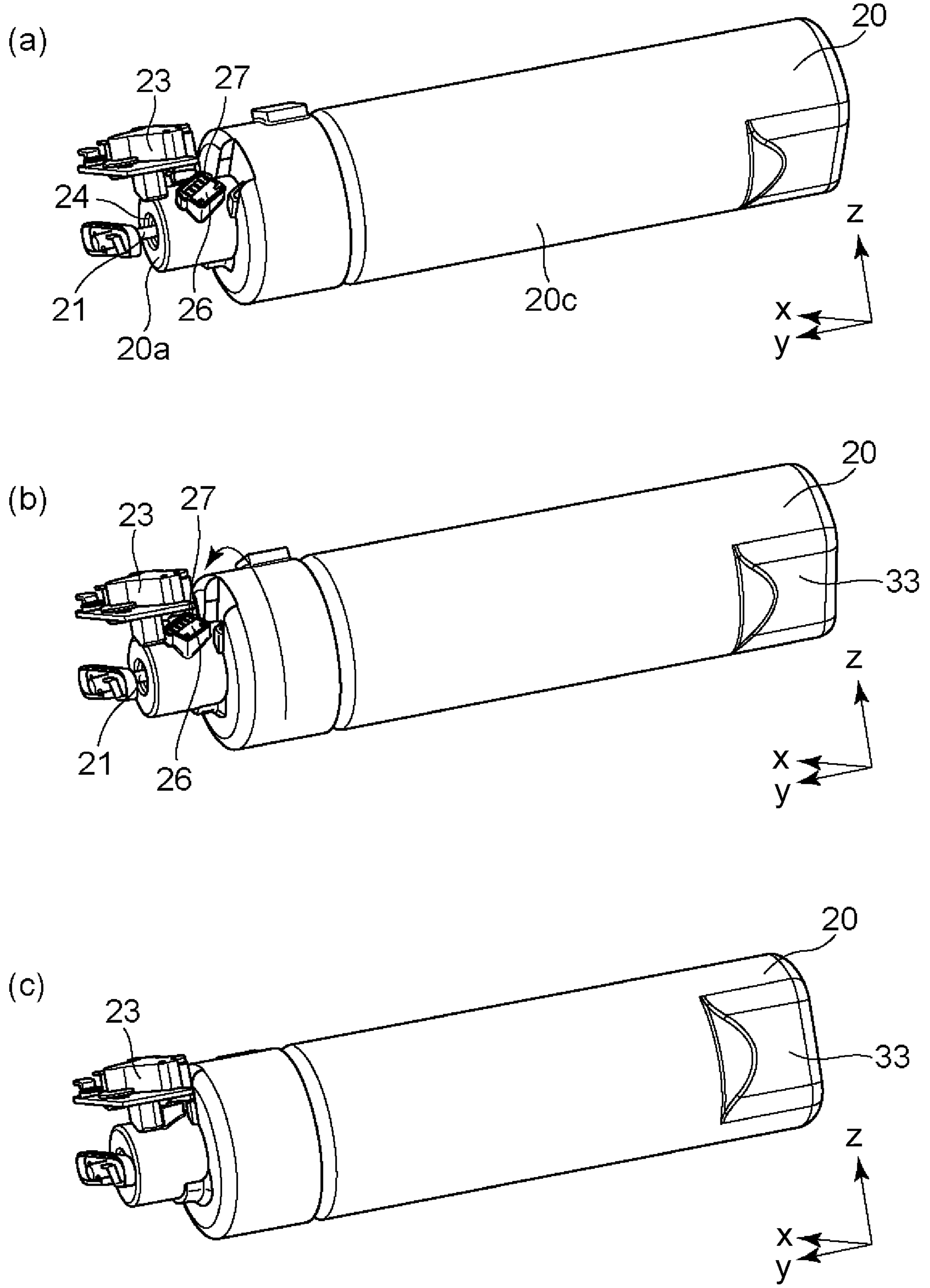

Parts (a), (b) and (c) of FIG. 28 are perspective views illustrating how the ink cartridge is mounted.

Figure 29:
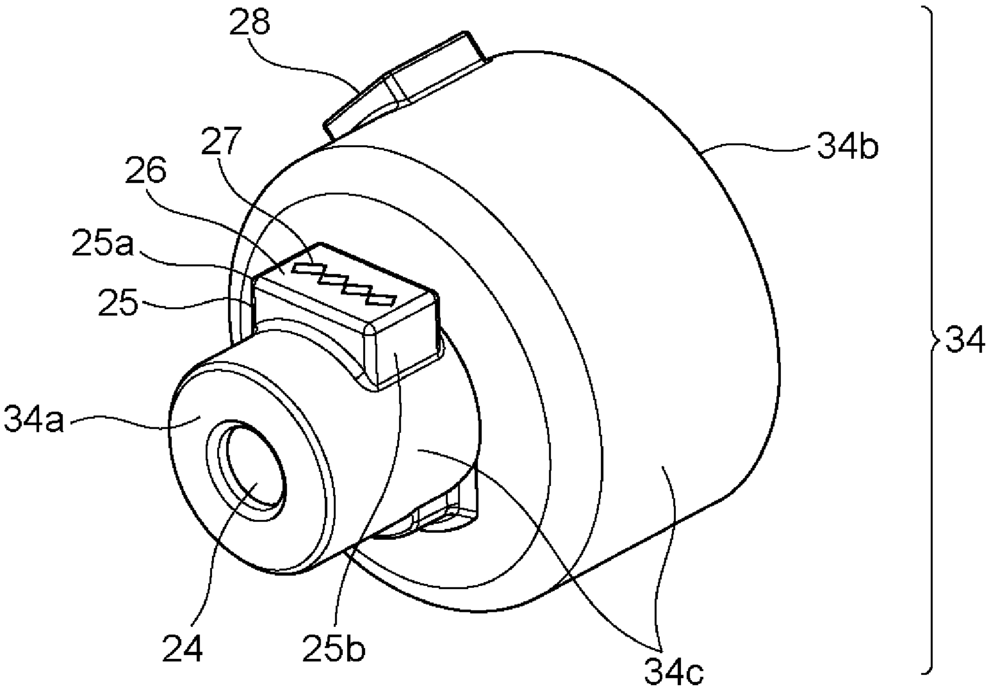

FIG. 29 is a view illustrating a structure of a member.

Figure 30:
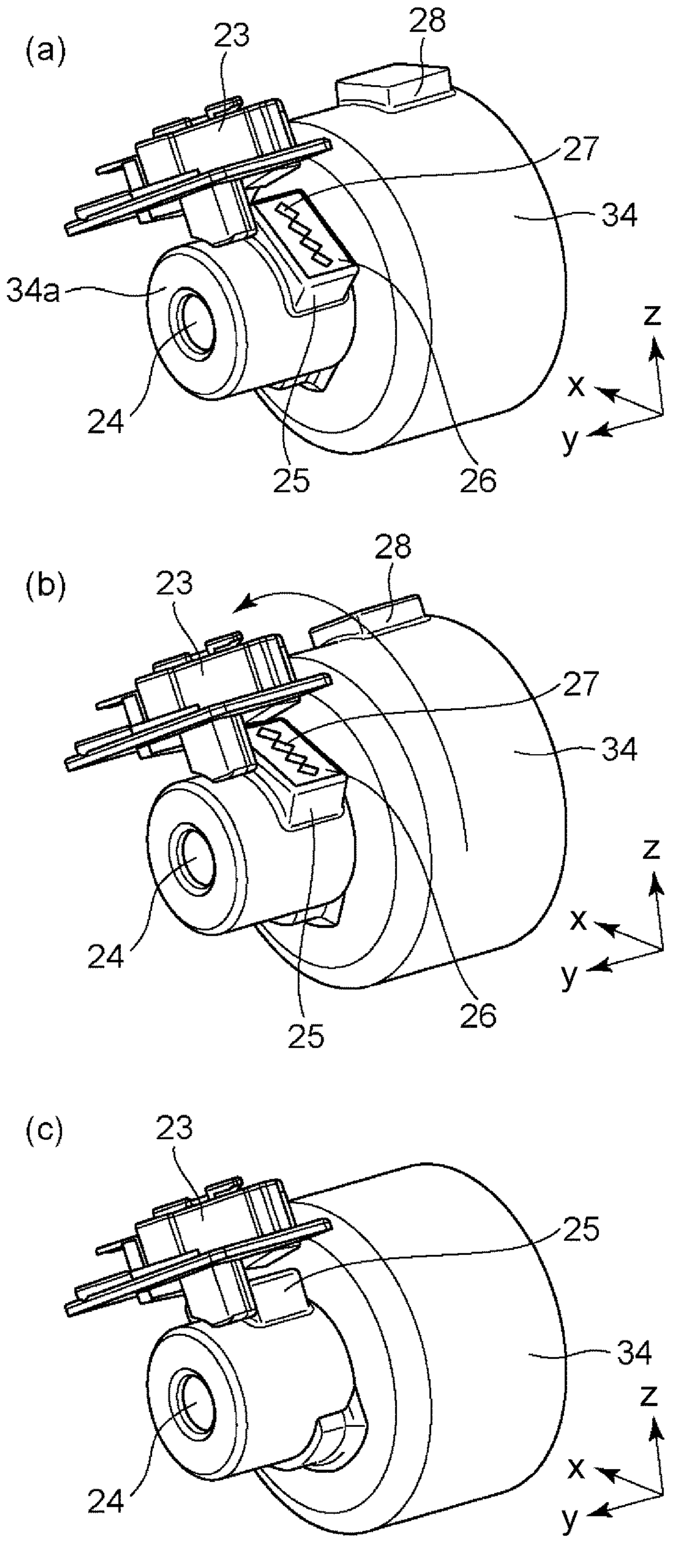

Parts (a), (b) and (c) of FIG. 30 are perspective views illustrating how the member is mounted.

Figure 31:
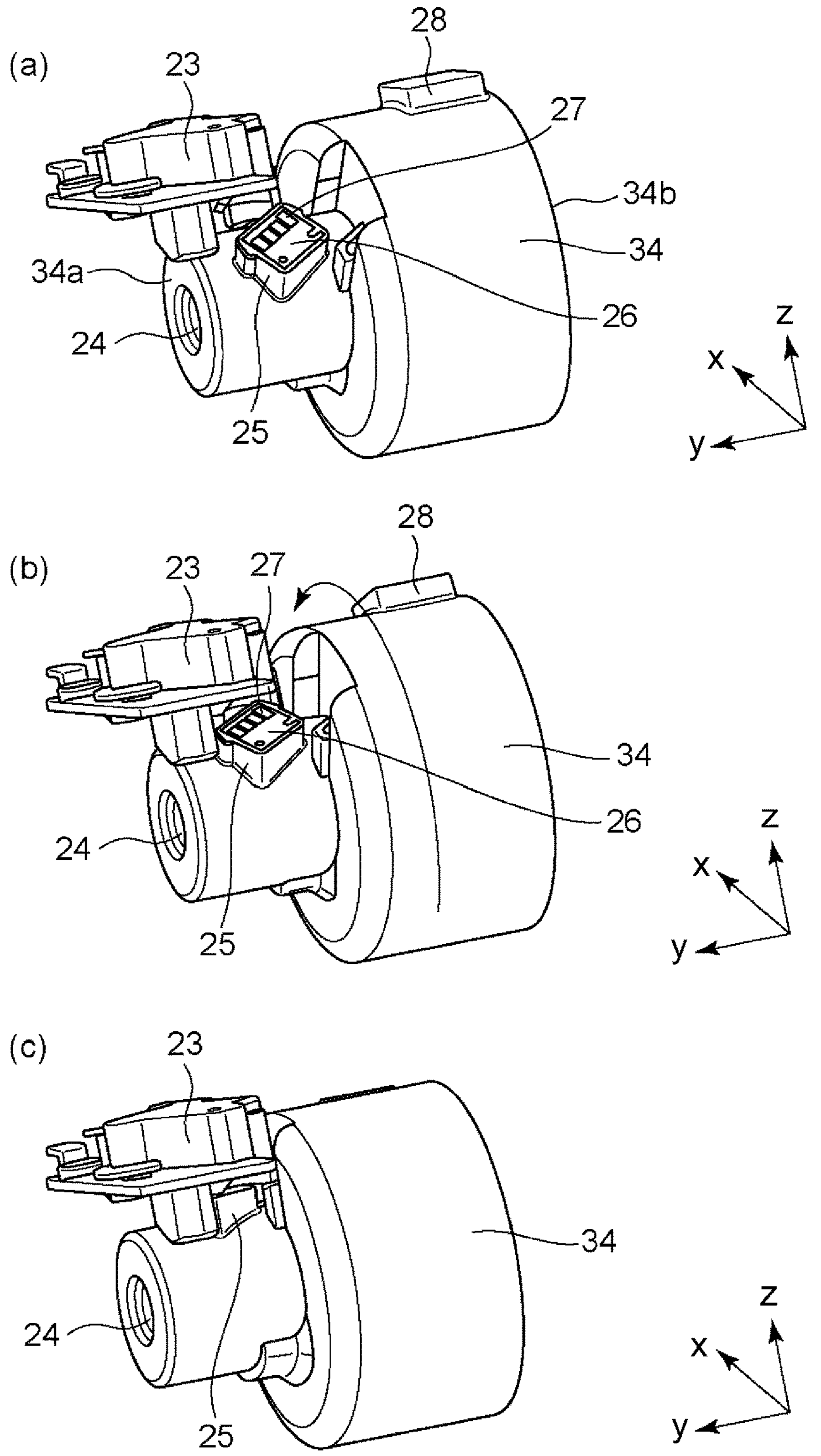

Parts (a), (b) and (c) of FIG. 31 are perspective views illustrating how the member is mounted.

Figure 32:
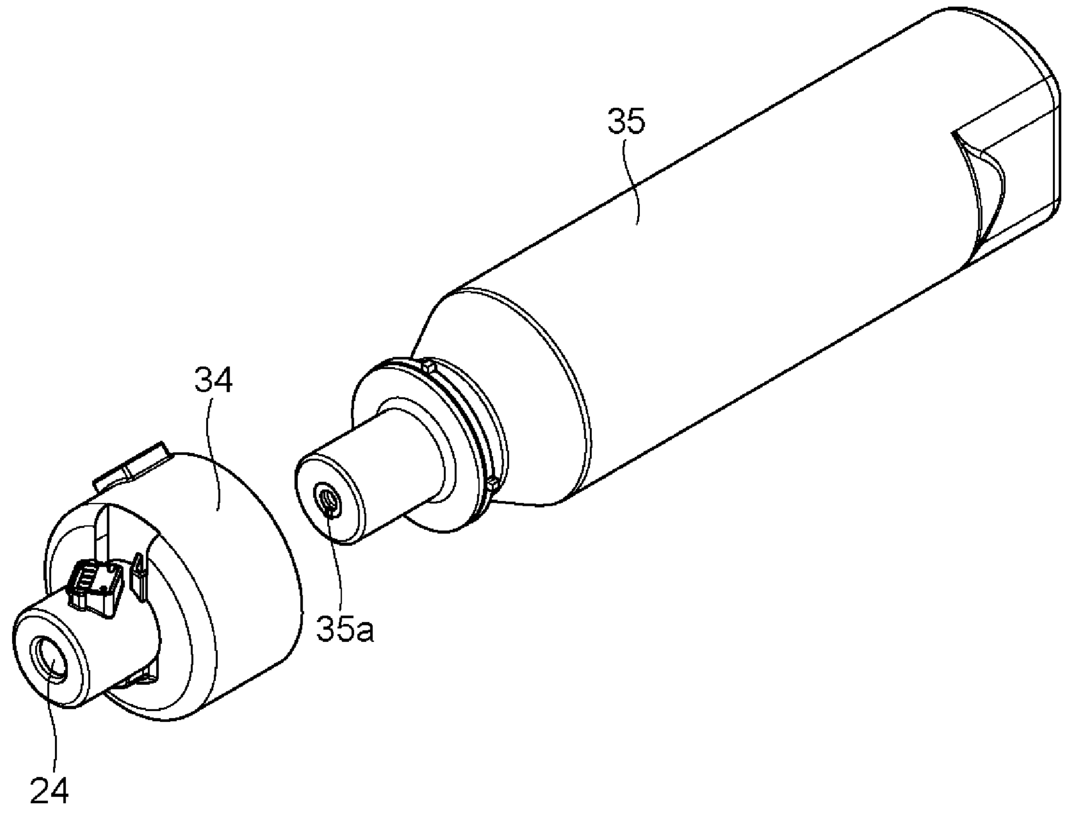

FIG. 32 is a perspective view illustrating a structure in which an ink cartridge member is mounted on the member.

Figure 33:
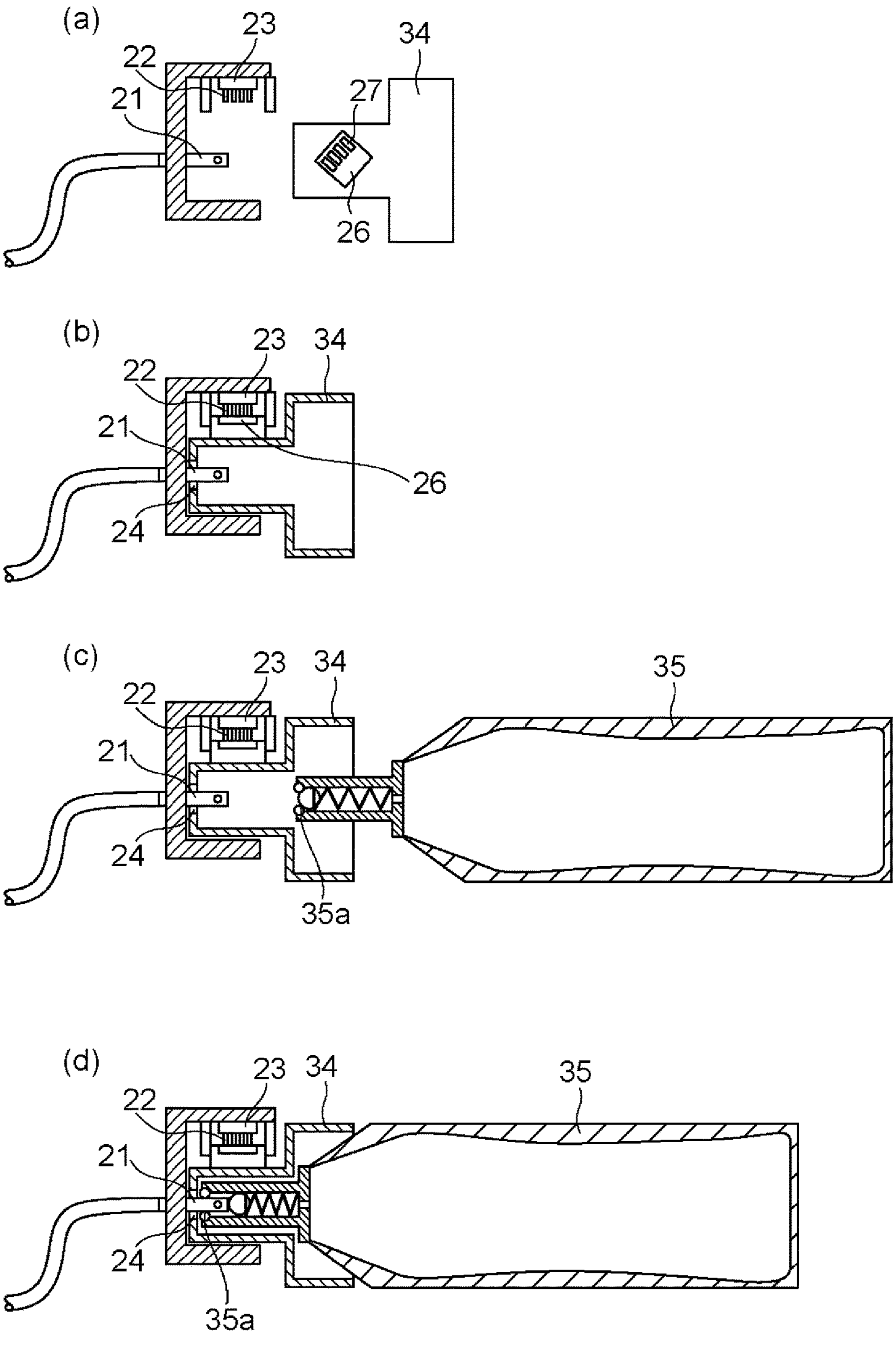

Parts (a), (b), (c) and (d) of FIG. 33 are sectional views illustrating how the member and the ink cartridge member is mounted.

Figure 34:
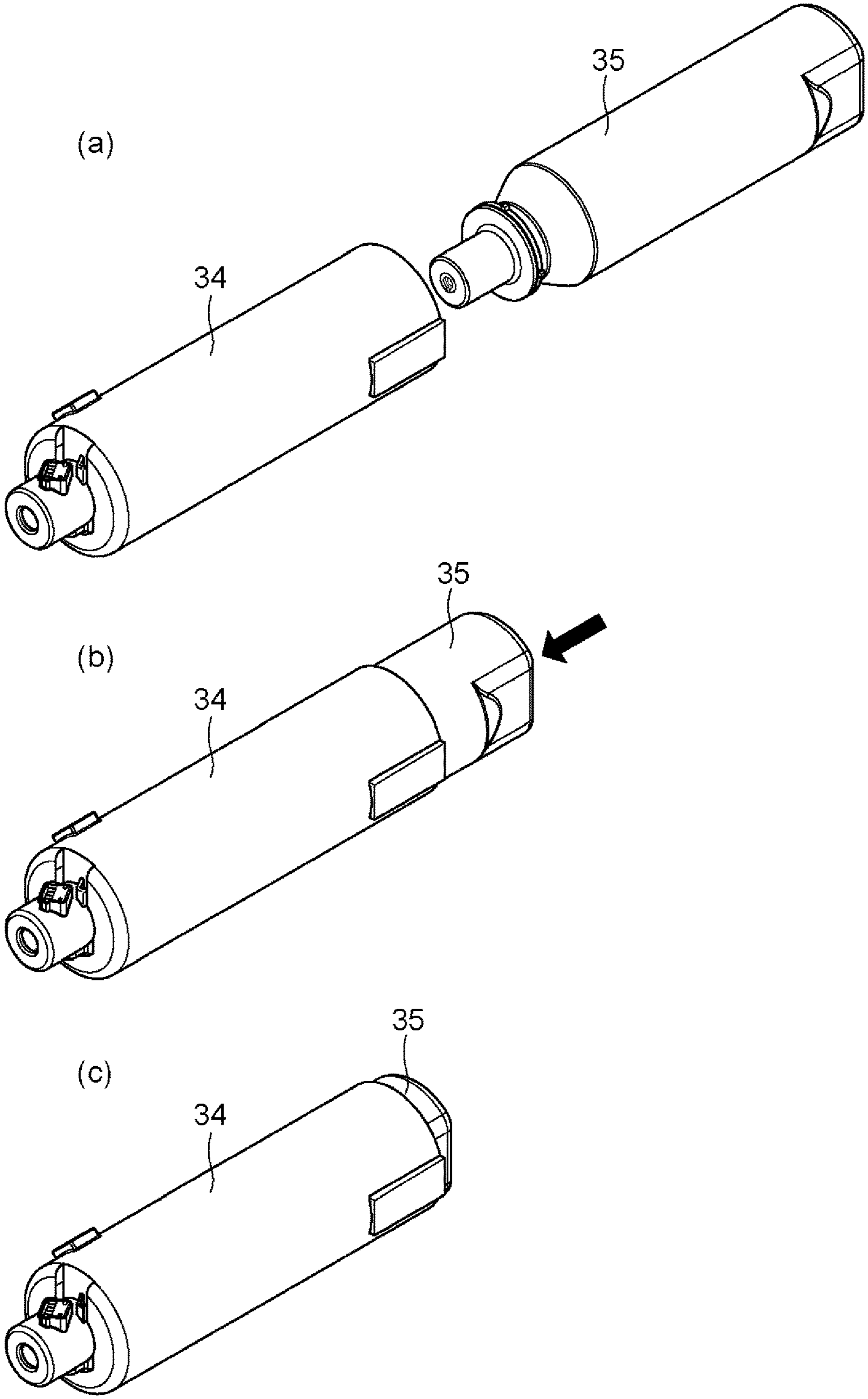

Parts (a), (b) and (c) of FIG. 34 are perspective views illustrating a state of mounting the ink cartridge member on the member.

Figure 35:
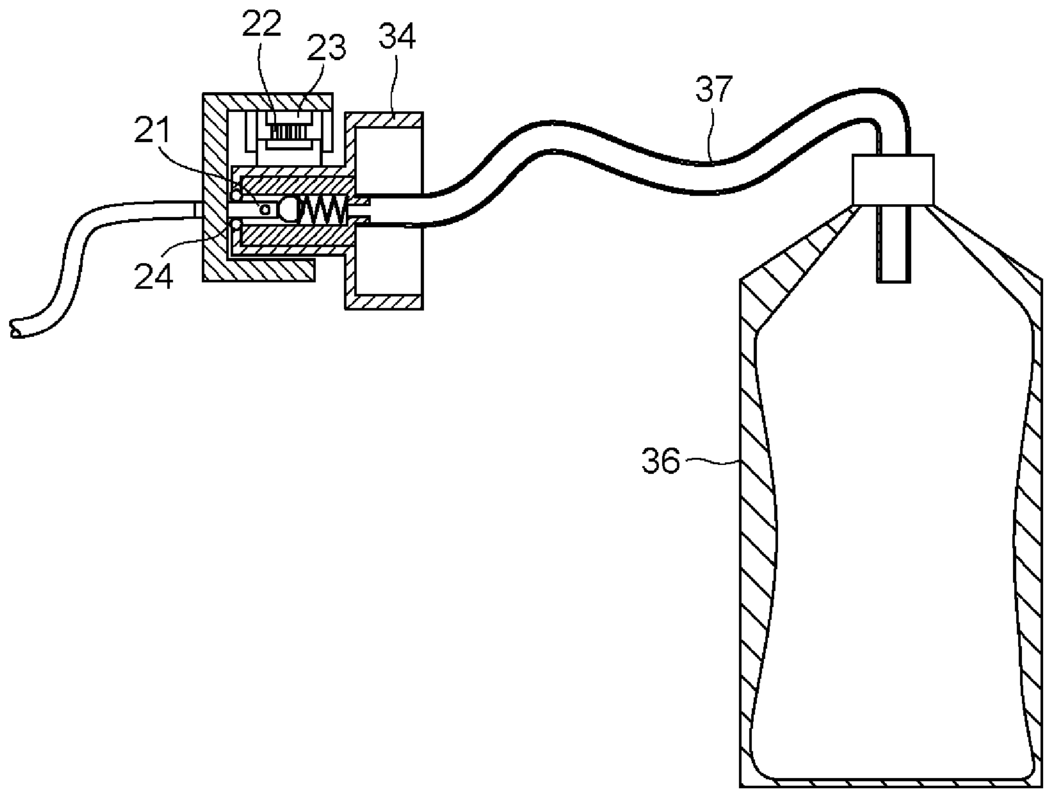

FIG. 35 is a sectional view illustrating a structure in which an ink storage bottle is mounted by way of a tube.

Figure 36:
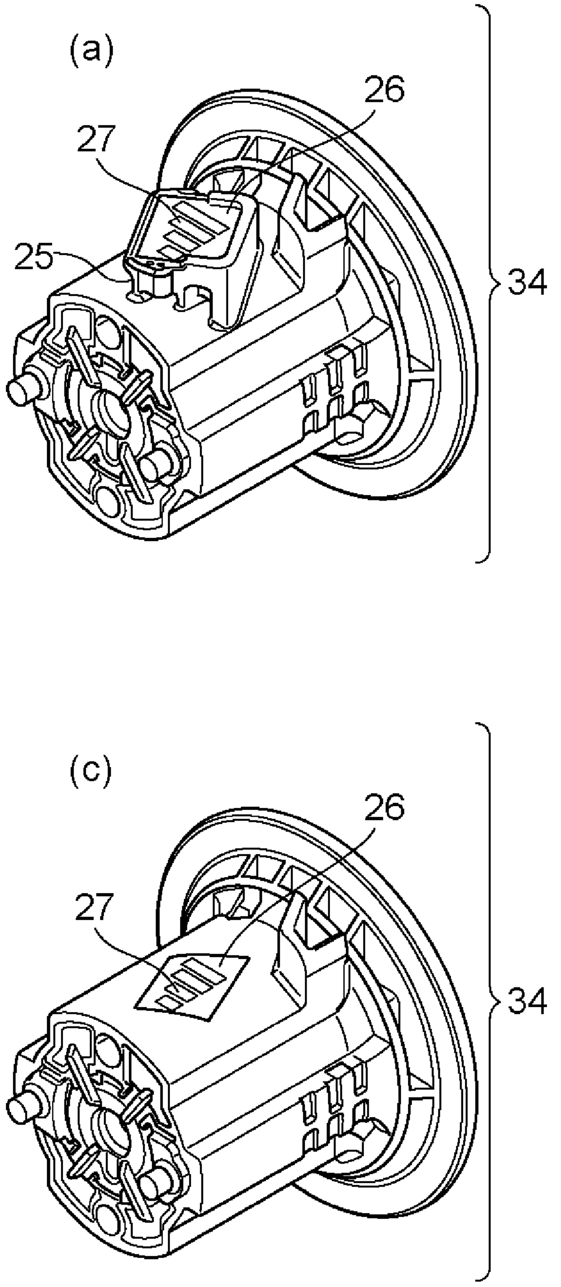
Figure 37:
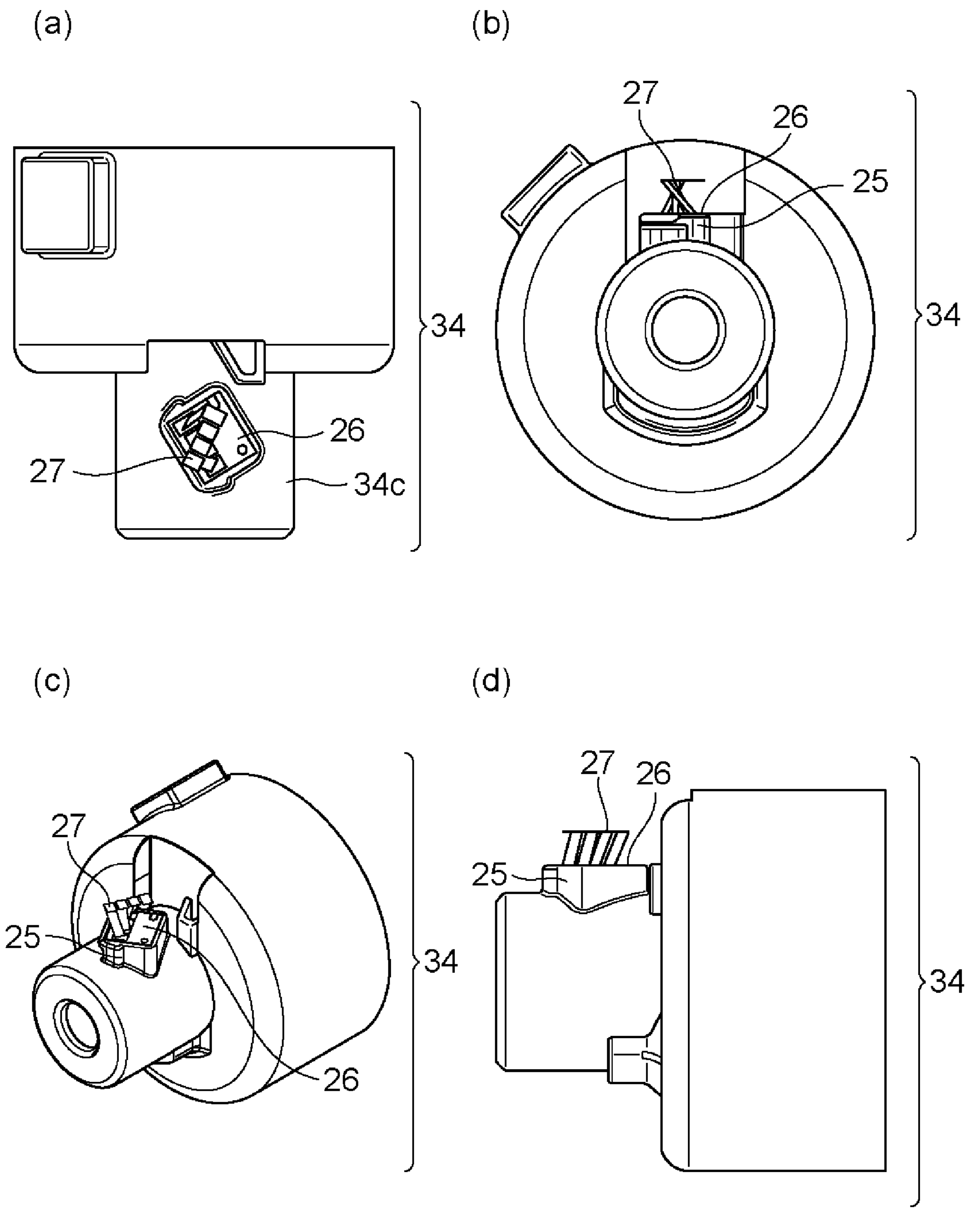

Parts (a), (b), (c) and (d) of FIG. 36 are perspective views illustrating a structure of an electrode portion and pad electrodes;

Parts (a), (b), (c) and (d) of FIG. 37 are views illustrating a structure of the electrode portion and the pad electrodes.

Figure 38:
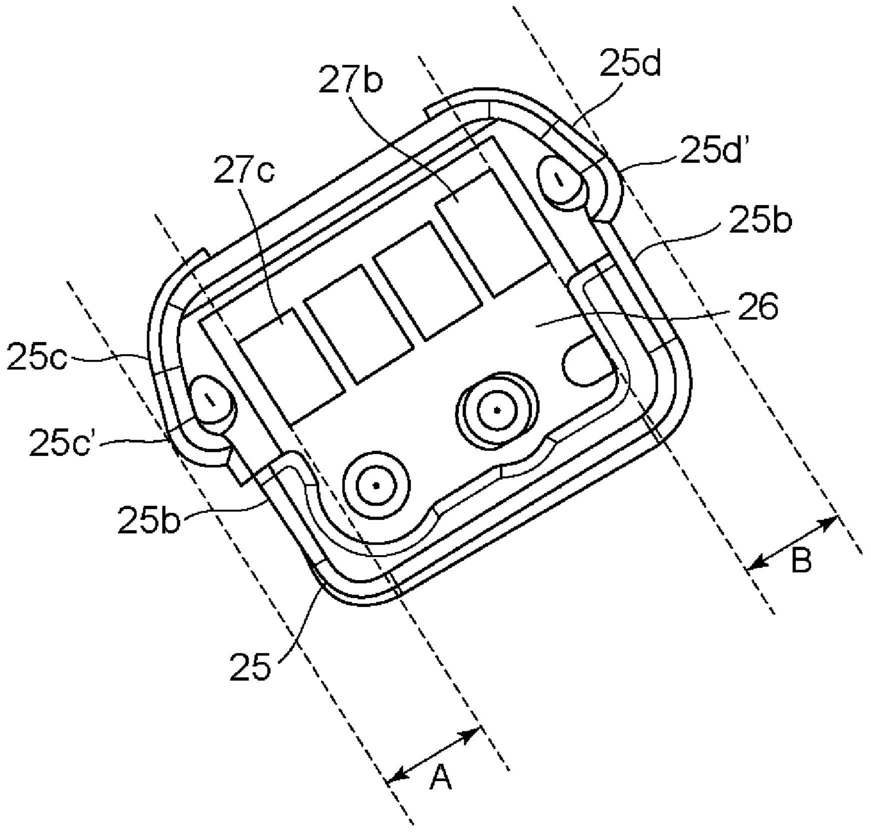

FIG. 38 is a view illustrating a structure of then electrode portion and the pad electrodes.

Figure 39:
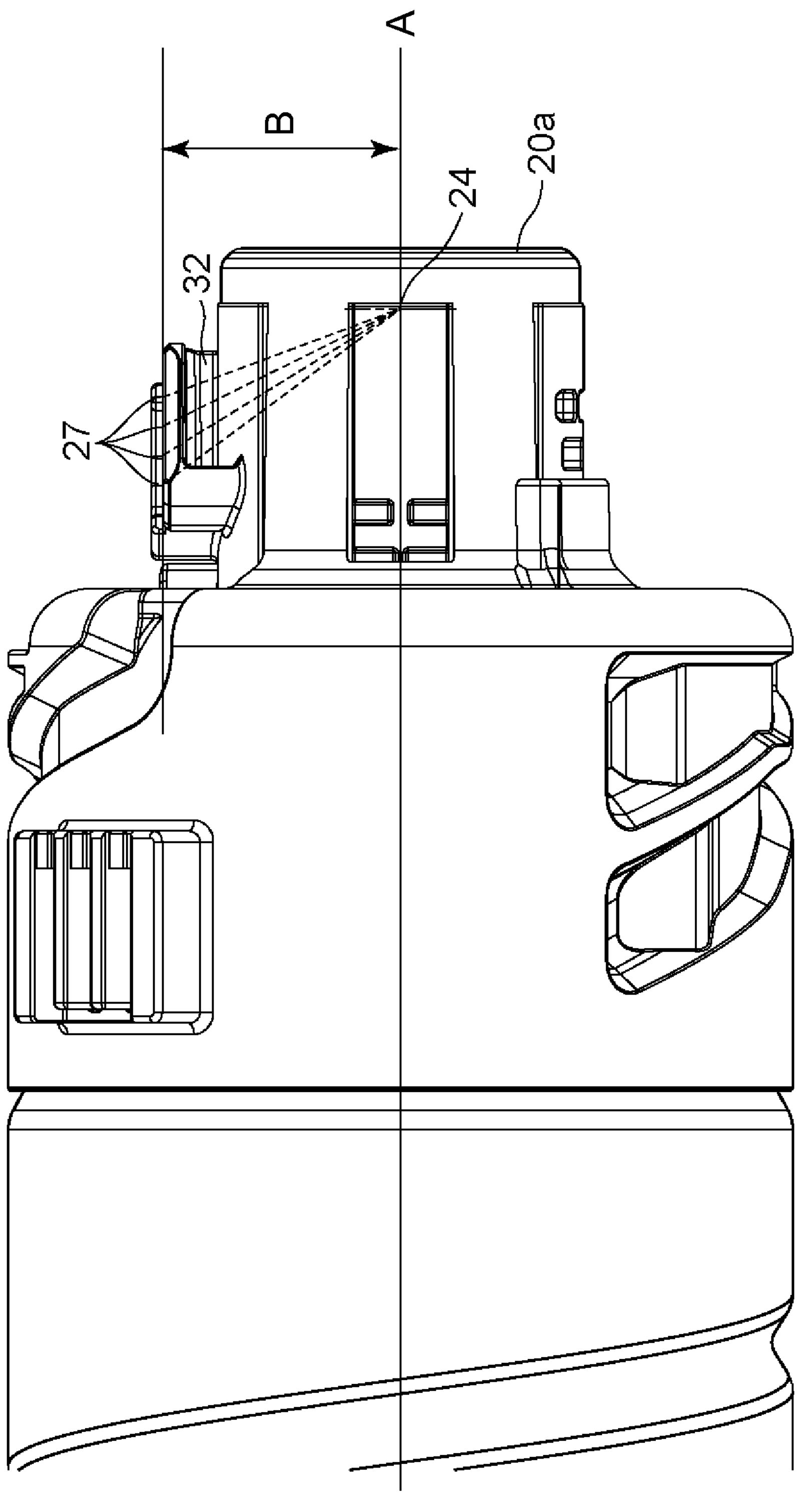

FIG. 39 is a view illustrating a structure of an ink cartridge.

EMBODIMENTS FOR CARRYING OUT THE INVENTION

According to the investigation by the inventors of the present invention, when the ink cartridge disclosed in Japanese Laid-open Patent Application No. 2008-273173 is mounted in the recording apparatus, if the mounting force is strong, the contact between the connection terminals of the recording apparatus and the pad electrodes of the ink cartridge may not be good enough in some cases.

That is, in the prior art, there is room for improvement on the member (ink cartridges) including the pad electrodes and the recording apparatus to which the member is mounted.

In the following, embodiments of the member, the ink cartridge, and the recording apparatus according to the present invention will be specifically described in conjunction with the drawings. Here, each of the following embodiments is a preferable example for carrying out the present invention, and the present invention is not limited to the structures of such examples. In addition, the contents described in each embodiment can be combined with a part or parts of the description content.

Embodiment 1

First, an example in which an ink jet printer is used as a recording apparatus, and in which an ink cartridge is used as the mountable member will be described.

<Recording Apparatus>

(Overall Structure)

Figure 1:
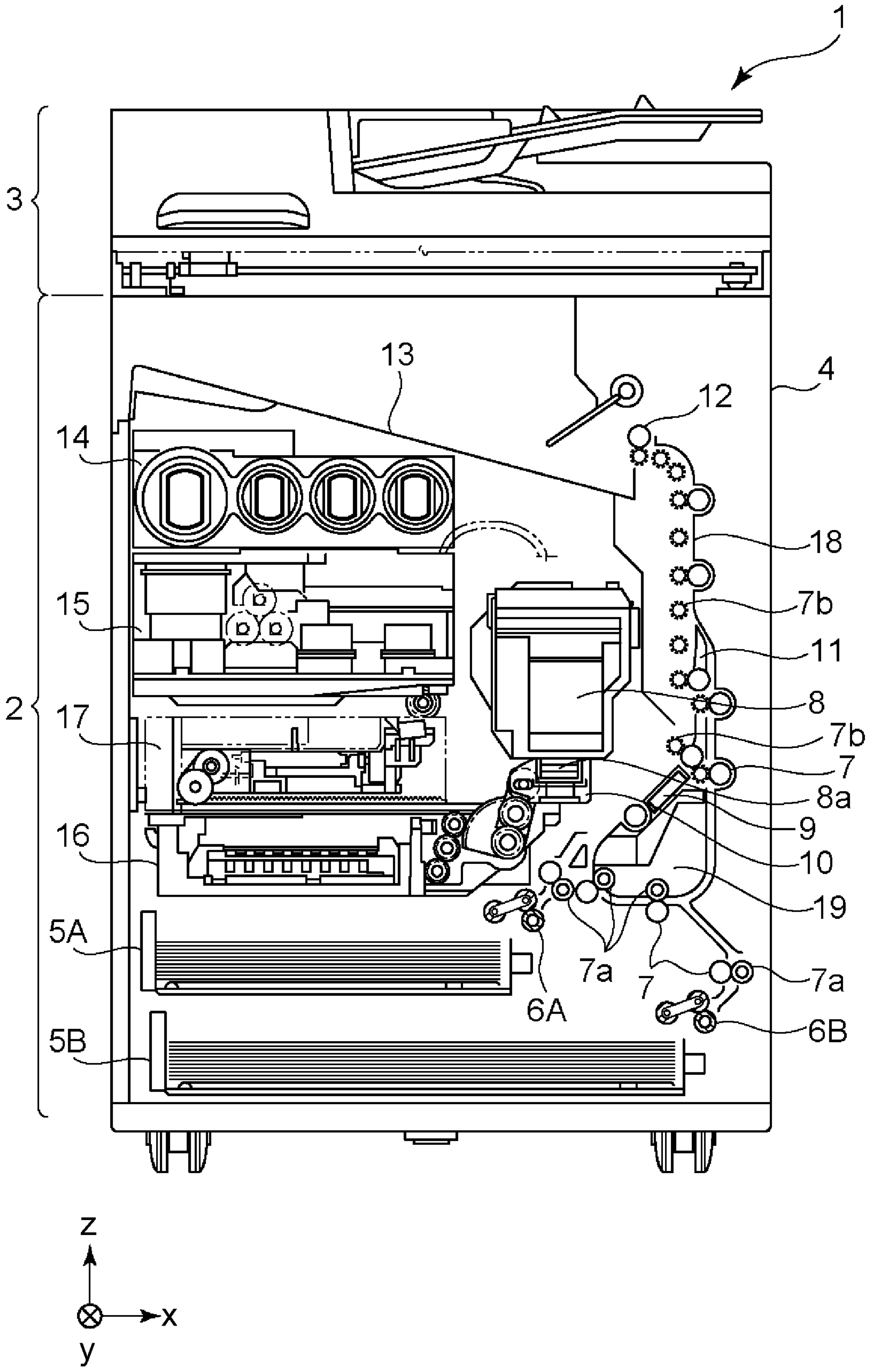
FIG. 1 is an illustration showing a structure of an ink jet printer.

Referring to FIG. 1, the overall structure of an inkjet printer 1 (hereinafter referred to as a recording apparatus 1) as an example of a recording apparatus will be described FIG. 1 is an internal structure illustration of the recording apparatus 1. In FIG. 1, a x direction indicates the horizontal direction, a y direction (the direction perpendicular to the sheet of the drawing) indicates the direction in which the discharge openings are arranged in the recording head 8 described later, and the z direction indicates the direction of gravity (vertical direction). Here, the x direction, the y direction and the z direction shown in FIG. 1 are usable with the same meaning also in the drawings after FIG. 1. For example, the x direction, the y direction and the z direction shown in Parts (a) and (b) of FIG. 2 are directions same as the x direction, the y direction and the direction shown in FIG. 1, respectively.

The recording apparatus 1 is a multifunction machine including a printing portion 2 and a scanner portion 3 above the printing portion 2, and various processes relating to a recording operation and a reading operation are individually or in interrelation with the printing portion 2 and the scanner portion 3 can be executed. The scanner portion 3 is equipped with ADF (Automatic Document Feeder) and FBS (Flat Bed Scanner), and it is possible to scan originals automatically fed by the ADF and to read originals placed on the platen of the FBS by the user. Here, FIG. 1 shows a multifunction peripheral including both the printing unit 2 and the scanner unit 3, but the scanner unit 3 may not be provided. FIG. 1 shows a state in which the recording apparatus 1 is in a stand-by state in which neither the recording operation nor the reading operation is carried out.

In the printing unit 2, a first cassette 5A and a second cassette 5B for storing a recording material (cut sheet) S are dismountably mounting at a bottom portion of the casing 4 downwardly in the gravity direction. Relatively small recording materials up to A4 size are accommodated in the first cassette 5A and relatively large recording materials up to A3 size are accommodated in the second cassette 5B in the form of a flat stack. In the neighborhood of the first cassette 5A, there is provided a first feeding unit 6A for separating and feeding the stored recording materials one by one. Similarly, in the neighborhood of the second cassette 5B, the second feeding unit 6B is provided. When the recording operation is carried out, the recording material S is selectively fed from one of the cassettes.

A feeding roller 7, a discharge roller 12, a pinch roller 7*a*, a spur 7*b*, a guide 18, an inner guide 19 and a flapper 11 are feeding mechanisms for guiding to feed the recording material S in a predetermined direction. The feeding rollers 7 are disposed on an upstream side and a downstream side of the recording head 8 and are driving rollers driven by a feeding motor (not shown). The pinch roller 7*a* is a driven roller that rotates while nipping the recording material S together with the feeding roller 7. The discharging roller 12 is a driving roller which is disposed on the downstream side of the feeding roller 7 and is driven by a feeding motor (not shown). The spur 7*b* sandwiches and feeds the recording material S together with the feeding roller 7 and the discharge roller 12 provided on the downstream side of the recording head 8.

The guide 18 is provided in the feeding path of the recording material S and guides the recording material S in a predetermined direction. The inner guide 19 extends in the y direction, has a curved side surface, and guides the recording material S along the side surface. The flapper 11 is for switching the direction in which the recording material S is fed during the duplex recording operation. The discharge tray 13 is for stacking and holding the recording materials S discharged by the discharge roller 12 after completion of the recording operation.

The recording head 8 shown in FIG. 1 is a full-line type ink jet recording head, in which ejection openings for injecting ink in accordance with recording data are arranged in the y direction in FIG. 1, and the number of ejection openings are enough to cover width of the recording material S. In addition, it is an inkjet recording head capable of color printing. When the recording head 8 is in the standby position, the ejection opening surface 8*a* of the recording head 8 is capped by the cap unit 10 as shown in FIG. 1. When performing the recording operation, the direction of the recording head 8 is changed by the print controller so that the ejection opening surface 8*a* faces the platen 9. The platen 9 is constituted by a flat plate extending in the y direction, and supports the recording material S on which the recording operation is performed by the recording head 8, at the back side of the recording material S.

The recording head 8 need not necessarily be a full-line type recording head, but may be a serial-scan type recording head that reciprocates in a direction crossing the feeding direction of the recording material S.

A mounting portion 14 is a portion to which the ink cartridge is mounted. The mounting portion 14 may be made dismountable from the recording apparatus 1. Here, in this example, four ink cartridges are mounted on the mounting portion 14, and these ink cartridges store the four colors of ink to be supplied to the recording head 8, respectively. The ink supply unit 15 is provided in the middle of a flow path connecting the mounting portion 14 and the recording head 8 and adjusts the pressure and the flow rate of the ink in the recording head 8 to appropriate levels. In addition, in this example, a circulation type ink supply "system" is employed, and the ink supply unit 15 adjusts the pressure of the ink supplied to the recording head 8 and the flow rate of the ink returning from the recording head 8 within appropriate ranges.

The maintenance unit 16 includes a cap unit 10 and a wiping unit 17 and operates at a predetermined timing to perform a maintenance operation on the recording head 8.

Here, "ink" as used herein includes any liquid that can be used for image formation or processing of a recording material by being applied to a recording material. Therefore, "ink" as used herein includes any liquid that can be used for recording. In addition, the recording is not limited in particular, and it can be applied to industrial applications and the like. For example, they can be used for biochip production, electronic circuit printing, semiconductor substrate production, and so on.

(Mounting Portion)

Parts (a) and (b) of FIG. 2 shows a view of the mounting portion 14 of the recording apparatus 1 of FIG. 1 as viewed obliquely from above in the direction of gravity, in which the mounting portion 14 is omitted. Part (a) of FIG. 2 is an illustration showing a state before the ink cartridge is mounted to the mounting portion 14. Part (b) of FIG. 2 is an illustration showing a state after the ink cartridge 20 is mounted to the mounting portion 14.

The mounting portion 14 shown in Parts (a) and (b) of FIG. 2 includes four cylindrical hole forming members 14*a*. Each hole forming member 14*a* forms a hole 14*d*. The ink cartridge 20 is inserted into the hole 14*d* formed by the hole forming member 14*a* of the mounting portion 14 and mounted to the mounting portion 14 of the recording apparatus. It is not always necessary to provide a plurality of hole forming members 14*a*. For example, one hole forming member may include a plurality of holes. It is preferred that the diameter of the hole 14*d* (the dimension measured in the direction perpendicular to the extending direction of the hole 14*d*) is 50 mm or more and 90 mm or less. Here, if the cross-section taken in the direction perpendicular to the extending direction of the hole 14*d* is not a perfect circle, the diameter of the hole 14*d* is assumed to be the circle equivalent diameter. Similarly, in the present specification, the "equivalent diameter" is taken as "diameter" unless otherwise specified.

On the back side of the hole forming member 14*a*, another hole forming member 14*b* (different member) different from the hole forming member 14*a* is provided. When mounting the ink cartridge, the side where the hole forming member 14*a* is provided is the front side, and the side provided with the hole forming member 14*b* is the rear side. The hole forming member 14*b* is also provided with a hole (not shown in Parts (a) and (b) of FIG. 2), and the hole 14*d* of the hole forming member 14*a* and the hole of the hole forming member 14*b* communicate with each other inside the mounting portion 14. The ink cartridge 20 is inserted into this communicated hole. Here, the hole forming member 14*a* and the hole forming member 14*b* may not be provided as separate members, and, for example, two hole forming members may be integrated. Examples of materials for forming the hole forming member 14*a* include ABS (acrylonitrile-butadiene-styrene copolymer resin), PPO (modified polyphenylene oxide), HIPS (high impact polystyrene resin), and the like. Materials for forming the hole forming member 14*b* include PE (polyethylene), PP (polypropylene), PPO (modified polyphenylene oxide), and the like.

At the opening on the front side of the hole 14*d* of the hole forming member 14*a*, an ID recess 14*c* is provided. The ID recess 14*c* is used for roughly aligning the ink cartridge 20 relative to the mounting portion 14 when the ink cartridge 20 is mounted. In Parts (a) and (b) of FIG. 2, the circular opening of the hole 14*d* is partially recessed to form the ID recess 14*c*.

A plurality of electrical connecting portions (not shown in Parts (a) and (b) of FIG. 2) are provided in the mounting portion 14 so as to be in contact with the respective pad electrodes of the ink cartridge and to be electrically connected with the pad electrodes by physical contact therebetween. In Parts (a) and (b) of FIG. 2, the electrical connecting portion is provided in the hole forming member 14*b* of the mounting portion 14.

FIG. 3 schematically is an enlarged view of the hole forming member 14*b* around the electrical connecting portion. FIG. 3 is a view of a cross portion of the mounting portion 14 (hole forming member 14*b*) in a portion surrounded by a portion A in part (a) of FIG. 2. Here, in FIG. 3, a part of the mounting portion 14 including the hole forming member 14*a* is omitted, for simplicity of illustration.

As shown in FIG. 3, the hole forming member 14*b* is a tubular member, and a hole 14*f* is formed inside the hole forming member 14*b*. The tubular ink receiving tube 21 projects from the rear side surface of the hole 14*f* (the bottom surface of the hole 14*f* formed by the hole forming member 14*b*). The surface on the rear side of the hole 14*f* is circular, and the ink receiving tube 21 projects from a center of the circular surface in a direction (extending direction) perpendicular to the surface. The ink receiving tube 21 is a tube for receiving the ink supplied from the ink cartridge mounted to the mounting portion 14. The ink receiving tube 21 is connected to the recording head of the recording apparatus by way of the ink flow path, and supplies the ink received from the ink cartridge to the recording head. One ink receiving tube corresponds to one color ink. Therefore, it is preferable to provide ink receiving tubes for the ink color used, respectively. Examples of materials forming the ink receiving tube 21 include SUS (stainless steel), PPO (modified polyphenylene oxide) and the like. It is preferred that the diameter of the ink receiving tube 21 (the diameter in the cross-section perpendicular to the extending direction of the ink receiving tube 21) is 2 mm or more and 5 mm or less. Further preferably, it is 3 mm or more and 4 mm or less. Here, it is preferred that the diameter of the hole 14*f* (the diameter measured in the direction perpendicular to the extending direction of the hole 14*f*) is 20 mm or more and 30 mm or less. It is preferred that the diameter of hole 14*f* is smaller than the diameter of hole 14*d*.

As shown in FIG. 3, the mounting portion 14 is provided with a plurality of electrical connecting portions 22. The electrical connecting portion 22 may be in the form of a connector pin or the like. The electrical connecting portion 22 is provided in the electrical connecting portion peripheral portion 23 which is a part of the mounting portion 14.

Copper alloy (gold-plated) or the like can be used as a material for forming the electric connecting portion 22. Examples of materials forming the electrical connecting portion peripheral portion 23 include ABS (acrylonitrile-butadiene-styrene copolymer resin), PC (polycarbonate), and the like.

The plurality of electrical connecting portions 22 are interposed between positioning walls 23*a*, 23*b* of the electrical connecting portion peripheral portion 23. The positioning walls 23*a* and 23*b* are opposed to each other with the plurality of electric connecting portions 22 interposed therebetween and perform the function of a wall for positioning the ink cartridge when mounting the ink cartridge as will be described hereinafter. As the material for forming the positioning walls 23*a* and 23*b*, PPO (modified polyphenylene oxide), ABS (acrylonitrile-butadiene-styrene copolymer resin), SUS (stainless steel) and the like can be used. Here, the electrical connecting portion peripheral part 23 may be dismountably from the mounting portion 14. In addition, the electrical connecting portion peripheral portion 23 may not be provided in the hole forming member 14*b*, but may be provided separately from the hole forming member 14*b*.

Next, the structure of the electrical connecting portion 22 and the electrical connecting portion peripheral portion 23 will be described in more detail. First, the view of the periphery of the electrical connection portion 22 in the direction of the arrow An in FIG. 3 is shown in part (a) of FIG. 4. The direction of the arrow An in FIG. 3 is the direction (z direction) heading from the lower side to the upper side with respect to the direction of gravity in the attitude of using the recording apparatus. The attitude of using the recording apparatus is the attitude in which the recording apparatus is placed when recording is carried out by the recording apparatus, and it is the attitude shown in FIG. 1. Here, "gravity direction" in this specification means the direction of gravity in the attitude in which the recording apparatus is used unless otherwise specified. In the direction of the arrow A, the hole forming member 14*b* and the electrical connecting portion 22 are visible. As will be described hereinafter, the hole forming member 14*b* visible here can support the pad electrode of the ink cartridge and can restrict the movement of the pad electrode in the vertical direction (gravity direction). By this restriction of movement, the hole forming member 14*b* serves as a supporting member for stabilizing the mounting of the ink cartridge. As shown in part (a) of FIG. 4, as viewed in the direction of arrow A, the hole forming member 14*b* covers a part of the electric connecting portion 22. Here, the hole forming member 14*b* is not limited to the form covering a part of the electric connecting portion 22 as shown here, but it may be formed so as not to cover the electric connecting portion 22 is viewed in the direction of part (a) of FIG. 4.

Next, the periphery of the electrical connecting portion 22 as viewed in the direction of the arrow B in FIG. 3 is shown in part (b) of FIG. 4. The direction of the arrow B in FIG. 3 is the direction from the upper side to the lower side with respect to the direction of gravity. In addition, the periphery of the electrical connecting portion 22 as viewed in the direction of the arrow C in FIG. 3 is shown in part (c) of FIG. 4. The direction of the arrow C is an oblique direction from the upper side to the lower side with respect to the direction of gravity. In the direction of the arrow B and the direction of the arrow C, the electrical connecting portion 22 is not seen, and the connector 22*a* extending toward the inside of the recording apparatus from the electrical connecting portion 22 is seen. The connector 22*a* extends from the electrical connecting portion 22 and has the function of wiring that enables the electrical connecting portion 22 to be electrically connected to the inside of the recording device. As a material for forming the connector 22*a*, copper alloy (gold plating) and the like are available.

A cross-section taken along line A-A' of part (b) of FIG. 4 is shown in part (d) of FIG. 4. As described above, the ink receiving tube 21 projects from the rear side surface of the hole 14*f* formed by the hole forming member 14*b*. In addition, the plurality of electrical connecting portions 22 are interposed between the positioning walls 23*a*, 23*b*.

Next, FIG. 4 (*e*) shows the periphery of the electrical connecting portion 22 of the mounting portion as viewed in the direction of the arrow D in FIG. 3. The direction of the arrow D in FIG. 3 is the direction from the front side to the back side when mounting the ink cartridge to the mounting portion. In addition, it is also the extending direction of the hole (hole 14*d* and hole 14*f*) formed by the hole forming member 14*a* and the hole forming member 14*b*. Furthermore, it is the y direction, the horizontal direction perpendicular to the direction of gravity. As viewed in the direction of arrow D, the ink receiving tube 21 is visible on the rear side of the hole 14*f* formed by the hole forming member 14*b*. In addition, the positioning wall 23*a*, and the positioning wall 23*b* as another positioning wall arranged so as to partially overlap the positioning wall 23*a* on the far side of the positioning wall 23*a* are seen. Here, the hole forming member 14*a* is omitted, but when the hole forming member 14*a* is provided, the hole forming member 14*a* is seen in front of the hole forming member 14*b*. And, the ink receiving tube 21 is seen on the rear side of the hole formed by connecting the holes (the hole 14*d* and the hole 140 formed by the hole forming member 14*a* and the hole forming member 14*b*. To the ink receiving tube 21, the ink cartridge is inserted from the front side to the rear side (y direction) along the inserting direction.

Parts (a) and (b) of FIG. 5 is a view of the periphery of the electric connecting portion 22 as viewed another angular direction. Part (a) of FIG. 5 shows the periphery of the electrical connecting portion 22 as viewed in the direction of the arrow E in FIG. 3. Part (b) of FIG. 5 shows the periphery of the electrical connecting portion 22 as viewed in the direction of the arrow F in FIG. 3. The arrow E direction and the arrow F direction obliquely extend from the lower side to the upper side in the gravy direction around the electric connecting portion 22. As described in part (a) of FIG. 4, a part of the electrical connecting portion 22 of the electrical connecting portion 22 is covered with the hole forming member 14*b* in the downward direction of the electrical connecting portion 22. In addition, in Parts (a) and (b) of FIG. 5, the four electrical connecting portions 22 are all in the form of connector pins. Each connector pin has a triangular shape. The connector pin is deformed so that any point of the connector pin, particularly the apex of the triangle contacts the pad electrode of the ink cartridge to be collapsed, by which an electrical contact point is provided. The electrical contact point can be thought of as the center of gravity position (the position of the center of gravity of the contact area between the connector pin and the pad electrode) of the connector pin that is in contact with the pad electrode when the mounting of the ink cartridge is completed. In this electrical contact point, the pad electrode and the connector pin (electrical connecting portion) can be electrically connected. The pad electrode and the electrical connecting portion are electrically connected and electricity flows through the electrical contact point, so that the recording apparatus can detect the mounting of the ink cartridge, for example. Besides, for example, the recording apparatus reads the information (ink property information such as ink color information and/or ink remainder information) the ink cartridge provided in a chip or the like, and the recording apparatus can recognize the type of the mounted ink cartridge.

<Ink Cartridge>

An ink cartridge mountable to the recording apparatus shown in FIG. 1 will be described.

Parts (a)-(d) of FIG. 6 shows the appearance of the ink cartridge. Part (a) of FIG. 6 is a view illustrating the appearance of the ink cartridge 20. Parts (b) to (d) of FIG. 6 are illustrations showing the ink cartridge 20 shown in part (a) of FIG. 6 as seen at another angle.

One ink cartridge 20 shown in Parts (a)-(d) of FIG. 6 stores one-color of ink. A plurality of color inks may be stored separately in one ink cartridge 20 or may be constituted to supply the accommodated plural color inks to the respective ink receiving tubes. In addition, as a set of ink cartridges 20, a plurality of ink cartridges may store ink of the same color.

The ink cartridge 20 shown in Parts (a)-(d) of FIG. 6 is constituted with a cylindrical (cylindrical) casing as a base. As will be described hereinafter, the shape of the casing is not limited to a cylindrical shape, and it may be a polygonal prism shape such as a triangular prism shape or a quadrangular prism shape, for example. Or, it may be a conical shape, or it may be a polygonal pyramid shape such as a triangular pyramid shape or a quadrangular pyramid shape.

The ink cartridge 20 has at least a first portion 20*a*, a second portion and a third portion 20*c* as portions which phase outwardly of the ink cartridge 20. The side where the insertion portion (ink discharging portion) 24 which will be described hereinafter is provided is the first portion 20*a*. The part on the side opposite to the first portion 20*a* is the second portion 20*b*. And, the first portion 20*a* and the second portion 20*b* are connected by the third portion 20*c*. The first portion 20*a* and the second portion 20*b* are the end portions of the ink cartridge 20, and the first portion 20*a* may be referred to as a first end portion, and the second portion 20*b* may be referred to as a second end portion. The third portion 20*c* is between the first portion 20*a* and the second portion 20*b*, and in Parts (a)-(d) of FIG. 6, the third portion 20*c* extends in a direction perpendicular to the first portion 20*a* and the second portion 20*b*. As shown in Parts (a)-(d) of FIG. 6, the first portion 20*a*, the second portion 20*b*, and the third portion 20*c* may be respective surfaces. Or, at least one of the first portion the second portion 20*b*, and the third portion 20*c* may not be a surface. For example, when the ink cartridge 20 has a triangular pyramidal shape, the first portion 20*a* is the bottom surface of the triangular pyramid and the second portion 20*b* is the apex on the bottom surface of the triangular pyramid (at a position opposed to the bottom surface), the third portion 20*c* may be a side surface of a triangular pyramid. In such a case, the second portion 20*b* is an apex, not a surface.

The portion facing outwardly of the ink cartridge 20 refers to a portion facing away from a central axis of the ink cartridge 20 (an axis extending through the center of gravity of the ink cartridge 20 or extending parallel to the longitudinal direction of the ink cartridge 20). For example, the side surface of the columnar ink cartridge 20 shown in Parts (a)-(d) of FIG. 6 faces away from the central axis of the ink cartridge 20, so that it faces outwardly of the ink cartridge 20. On the other hand, for example, the upper surface (upper surface above a gap (space) 32) constituting a gap (space) 32 shown in Parts (a) and (b) of FIG. 20 is a portion exposed to the outside (space) (outwardly) of the ink cartridge 20. However, since it faces in the direction approaching the center axis of the ink cartridge 20, it is not a portion facing the outside of the ink cartridge 20 but is a portion that faces to the inside of the ink cartridge 20.

The first portion 20*a* has an insertion portion 24 into which the ink receiving tube 21 shown in FIG. 3 or the like is inserted. Therefore, it can be said first portion 20*a* is a front portion of the ink cartridge 20. In Parts (a)-(d) of FIG. 6, the first portion 20*a* is a surface. The insertion portion 24 may be provided with a seal member having an opening. When the seal member is provided, the ink receiving tube is inserted into the opening of the seal member of the insertion portion 24. It is preferred that the diameter of the insertion portion 24 (the diameter as measured in the direction perpendicular to the direction in which the ink receiving tube is inserted) is 2 mm or more and 5 mm or less. It is preferred that the diameter of the first portion 20*a* including the insertion portion 24 is 8 mm or more and 14 mm or less.

Inside the ink cartridge 20, the ink is stored. The ink stored in the ink cartridge 20 is supplied to the recording apparatus through the ink receiving tube inserted in the insertion portion 24 (the opening of the sealing member in the case where the sealing member is provided) and used for recording. As described above, the inserting portion 24 is a part for discharging the ink stored in the ink cartridge 20, it can also be referred to as an ink discharging portion.

The ink cartridge 20 has a large-diameter portion having a diameter relatively larger (than a small-diameter portion) and a small-diameter portion having a diameter relatively smaller than the large-diameter portion. Here, the diameter is the equivalent circle diameter of the cross-section of the ink cartridge 20 as measured in the direction perpendicular to the direction from the first portion 20*a* to the second portion 20*b*. The ink cartridge 20 in Parts (a)-(d) of FIG. 6 has a circular cylindrical shape, and the diameter of the circle is measured in the cross-section taken along the direction perpendicular to the height direction of the cylinder. The part of the small diameter portion on the side where the insertion portion 24 is located is the first portion 20*a*. The second portion 20*b* is provided in the large diameter portion. The third portion 20*c* connecting the first portion 20*a* and the second portion 20*b* is a surface extending between the large diameter portion and the small diameter portion and including a step between the large diameter portion and the small diameter portion. The ink cartridge 20 may not have a large diameter portion or a small diameter portion, may have the same diameter, or may have a shape including no step in the third portion 20*c*. The ink cartridge 20 shown in Parts (a)-(d) of FIG. 6 has a cylindrical shape, the first portion 20*a* and the second portion 20*b* are the bottom surface of the cylinder, and the third portion 20*c* is the side surface of the cylinder. As described above, the ink cartridge 20 is not limited to circular cylindrical shape. The first portion 20*a* and/or the second portion 20*b* may have a step shape.

It is preferred to the diameter of the large diameter portion of the ink cartridge 20 is 50 mm or more and 80 mm or less. It is preferred to the diameter of the small diameter portion of the ink cartridge 20 is 20 mm or more and 30 mm or less. The diameter of the ink cartridge 20 can be made different depending on the amount and kind of ink to be stored. For example, in the ink cartridge set, for a large capacity ink cartridge, the diameter of the large diameter portion is 70 mm or more and 80 mm or less (for example 75 mm). And, for a small capacity ink cartridge, the diameter of the large diameter portion is 50 mm or more and 60 mm or less (for example, 55 mm). Description, it is preferred that the diameters of the small diameter portions do not differ between different ink cartridges different in the amounts and/or the kinds, from the standpoint of mounting facilities. Therefore, the diameter of the small diameter portion is 20 mm or more and 30 mm or less (for example, 25 mm) in both the large capacity ink cartridge and the small capacity ink cartridge. It is preferred that for ink cartridges with different amounts and the kinds of ink therein, the diameters of the small diameter portions are made the same, and the diameters of the large diameter portion is made different.

It is preferred that the length of the large diameter portion of the ink cartridge 20 as measured in the direction parallel to the direction from the first portion 20*a* to the second portion 20*b* is 190 mm or more and 220 mm or less. It is preferred that the length of the small diameter portion of the ink cartridge 20 in the direction parallel to the direction from the first portion 20*a* to the second portion 20*b* is 20 mm or more and 30 mm or less. From the standpoint of mounting, it is preferred that the above-described lengths of the large diameter portion and the small diameter portion of the ink cartridge 20 are substantially the same, even when the amount and/or type of ink stored therein are different from each other as in the above-described ink cartridge set. Here, the direction from the first portion 20*a* to the second portion 20*b* of the ink cartridge 20 (the direction from the second portion 20*b* to the first portion 20*a*) in this specification is the direction in which the shortest line connecting the first portion 20*a* and the second portion 20*b* extends. This direction is the direction along the longitudinal direction of the ink cartridge 20 in Parts (a)-(d) of FIG. 6. In addition, it is a direction parallel to the longitudinal direction of the ink cartridge 20.

Next, the projection 25 and the ID projection 28 will be described. The projecting portion 25 and the ID projection 28 are provided in the third portion 20*c* of the ink cartridge 20.

In Parts (a)-(d) of FIG. 6, the projecting portion 25 is provided on the portion of the small diameter portion of the third portion 20*c* and projects from the periphery of the projecting portion 25 constituting the third portion 20*c*. That is, the part projecting in the third portion 20*c* is the projecting portion 25. The periphery of the projecting portion 25 is the side surface (circumferential surface portion) of the column shape here, and the projecting portion 25 projects from the side surface of the column shape.

The projecting portion 25 has a roof surface 25*a* serving as a roof of the projecting portion 25 and a projecting portion side surface 25*b*. Here, there are four sides of the projecting portion side surface 25*b*, and these surfaces are connected with the roof surface 25*a* at the upper side. A chip-shaped electrode portion 26 including a memory element storing ink color information and/or remaining ink information is provided on the roof surface 25*a*. The electrode portion 26 is provided with a plurality of pad electrodes 27 which can be brought into contact with the electrical connection portion of the recording apparatus (mounting portion) and electrically connectable with the electrical connecting portion. The pad electrode 27 and the electrode portion 26 having the chip may be disposed at positions separated from each other. In such a case, they are electrically connected by wiring.

The roof surface 25*a* is a portion facing outwardly of the ink cartridge 20. And, since the roof surface 25*a* is a part of a portion connecting the first portion 20*a* and the second portion 20*b*, it is a part of the third portion 20*c*. Therefore, it can be said electrode portion 26 and the plurality of pad electrodes 27 provided on the roof surface 25*a* are provided in the third portion 20*c*. The electrode portion 26 and the plurality of pad electrodes 27 are provided at positions closer to the first portion 20*a* than to the second portion 20*b* of the third portion 20*c*.

It is preferred that the size of the roof surface 25*a* of the projecting portion 25 is such that the maximum length of one side is 9 mm or more and 16 mm or less. The size of the roof surface 25*a* of the projecting portion 25 is the size when the roof surface 25*a* of the projecting portion 25 is viewed from the side where the pad electrode 27 is provided (from the side opposed to the pad electrode 27).

It is preferable that the height of the projection 25 is 3 mm or more and 10 mm or less. The height of the projecting portion 25 is further preferably 8 mm or less. Here, the height of the projecting portion 25 is the height projecting from the surroundings from the surrounding surface measured in the vertical direction of the projecting portion 25, and the height of the portion is indicated by "A" in part (a) of FIG. 6. As shown in part (a) of FIG. 6, when there is a part with different height in the projecting portion 25, it is set as an average value at 100 randomly distributed points in the projecting portion 25.

It is preferable that the projecting portion 25 is located at a distance of 5 mm or more and 10 mm or less from the first portion 20*a* in a direction parallel to the direction from the first portion 20*a* to the second portion 20*b* of the ink cartridge 20, on the side of the first portion 20*a*. In addition, it is further preferably located at a position of 6 mm or more and 7 mm or less away from the first portion 20*a*. On the other hand, it is preferred that the part on the second portion 20*b* side of the projecting portion 25 is located at a position of 20 mm or more and 25 mm or less away from the first portion 20*a* in a direction parallel to the direction from the first portion 20*a* to the second portion 20*b* of the ink cartridge 20. In addition, it is further preferable that it is located at a position of 22 mm or more and 23 mm or less from the first portion 20*a*. Here, the direction from the first portion 20*a* to the second portion 20*b* is the same as the longitudinal direction of the ink cartridge 20 in Parts (a)-(d) of FIG. 6 example. In addition, "the portion on the side of the first portion 20 *a*" in the present specification means "the portion closest to the first portion 20 *a*". Similarly, "the portion on the side of the second portion 20 *b*" means "the portion closest to the second portion 20 *b*".

The electrode portion 26 may be constituted only by the pad electrode 27. In this case, the pad electrode 27 is disposed directly on the roof surface 25*a* of the projecting portion 25.

In Figure the positions of the centers of gravity of the electrodes of the plurality of pad electrodes 27 are arranged on the roof surface 25*a* of the projecting portion 25 in a direction perpendicular to the direction from the first portion 20*a* to the second portion 20*b* of the ink cartridge 20 (in the longitudinal direction in Parts (a)-(d) of FIG. 6). In other words, the positions of the centers of gravity of the electrodes of the plurality of pad electrodes 27 are arranged in the direction parallel to the direction perpendicular to the direction from the first portion 20*a* to the second portion 20*b* (the longitudinal direction in Parts (a)-(d) of FIG. 6) of the ink cartridge 20 (arranged in the shorter side direction in Parts (a)-(d) of FIG. 6). Each pad electrode 27 has a rectangular shape in this example. The long side and the short side of the rectangle shape are inclined with respect to the longitudinal direction and the short direction of the ink cartridge 20.

The ID projection 28 is provided on the large diameter portion of the third portion 20*c*. The ID projecting portion 28 projects from the portion around the ID projecting portion 28 in the third portion 20c. The portion around the ID projection 28 is the side surface (circumferential surface) of the columnar ink cartridge, and the ID projection 28 projects from this side surface.

It is preferable that the portion of the ID projection 28 on the side of the first portion 20a is at a position of 40 mm or more and 50 mm or less away from the first portion 20a in a direction parallel to the direction from the first portion 20a to the second portion 20b of the ink cartridge 20. In addition, it is further preferably located at a position of 41 mm or more and 45 mm or less away from the first portion 20a. On the other hand, it is preferred that the portion of the ID projecting portion 28 on the side of the second portion 20b is disposed at a position of 50 mm or more and 60 mm or less away from the first portion 20a, as measured in the direction parallel to the direction from the first portion 20a to the second portion 20b of the ink cartridge 20. In addition, it is further preferably located at a position of 55 mm or more and 58 mm or less away from the first portion 20a.

In addition, it is preferred that the height of the ID projection 28 is 3 mm or more and 10 mm or less. The height of the ID projection 28 is further preferably 4 mm or more and 5 mm or less. Here, the height of the ID projection 28 is the dimension in the orthogonal direction from the projection surroundings, and it is the length of the part indicated by "B" in part (d) of FIG. 6. In the case where the ID projecting portion 28 has portions with different heights, the height of the ID projecting portion 28 is an average value at 100 randomly dispersed positions in the ID projecting portion 28.

Examples of the material for forming the projecting portion 25 include PE (polyethylene), PP (polypropylene), and the like. As a material for forming the electrode portion 26, there is a flexible printed board made of glass epoxy or polyimide. Examples of the material for forming the pad electrode 27 include Ni, Au and the like. Materials for forming the ID projection 28 include PE (polyethylene), PP (polypropylene), and the like.

Parts (a) and part (b) of FIG. 7 show the internal structure of the ink cartridge 20. The casing 70 constituting a part of the third portion 20c has a two-layer structure including an outer layer 70a and an inner layer 70b. The outer layer 70a is a layer indicated by a solid line in part (b) of FIG. 7, and it is preferred that it is formed of a highly rigid material. On the other hand, the inner layer 70b is a layer indicated by a dotted line in part (b) of FIG. 7, and it is preferred that it is formed of a flexible material. That is, it is preferred that the outer layer 70a is more rigid than the inner layer 70b. The outer layer 70a and the inner layer 70b are separate bodies and are in a separable state from each other. The outer layer 70a constitutes the outer part of the casing. The inner layer 70b is a bag shape having flexibility and constitutes the inner part of the casing. The ink is stored inside (inside) the inner layer 70b, and the outside thereof is covered by the outer layer 70a. The outer layer 70a and the inner layer 70b have openings, respectively, and the two openings are disposed at overlapping positions. The opening of the inner layer 70b is joined to the joint member 73, thereby forming a closed space. The ink is stored in this closed space. It is preferred that the outer layer 70a and the inner layer 70b are formed by injection blowing. Examples of materials for forming the outer layer 70a include PET (polyethylene terephthalate), PBT (polybutylene terephthalate), and the like. Examples of materials for forming the inner layer 70b include PE (polyethylene), PP (polypropylene), and the like.

The casing 70 is connected with the cover member 78. The casing 70 constitutes a part of the large diameter portion of the ink cartridge. The cover member 78 constitutes a part of the large diameter portion of the ink cartridge and a part of the small diameter portion. The insertion portion 24 is provided in the small diameter portion of the cover member 78. Examples of the material forming the cover member 78 include PE, PP, ABS (acrylonitrile-butadiene-styrene copolymer resin), and the like. It is preferred that the length of the cover member 78 is 60 mm or more and 80 mm or less. Further preferably, it is 60 mm or more, 70 mm or less. Here, the length of the cover member 78 is the length as measured in the left-right direction in part (a) of FIG. 7. In addition, if the ink cartridge 20 has a shape as shown in Parts (a) and (b) of FIG. 7, the length of the cover member 78 is the length measured in the direction along the longitudinal direction of the ink cartridge 20.

A portion facing the outside of the casing 70 (the third portion 20c of the ink cartridge) has a screw-like groove 80 formed in the outer layer. By providing the screw-like groove 80, the strength of the casing 70 is enhanced. The groove 80 may be a single groove or a plurality of grooves not connected with each other.

From the strength viewpoint of case 70, it is preferred that the extending direction of the groove 80 is a direction inclined with respect to the longitudinal direction of the ink cartridge.

The ink cartridge 20 supplies the ink to the outside (into the recording apparatus) of the ink cartridge 20, and when the amount of the contained ink decreases, the inner layer 70b deforms correspondingly to the volume of the decreased ink. When the stored ink is finally used up, the inner layer 70b is in a collapsed state. On the other hand, when the outer layer 70a is made of a material having a high rigidity, the outer layer 70a is hardly deformed and substantially maintains its original shape. In the casing 70, the atmosphere communication vent 71 is opened in the second portion 20b of the ink cartridge. Through the atmosphere communication opening 71, the atmosphere air is introduced into the space between the outer layer 70a and the inner layer 70b. By covering the portions except for the small part of the atmosphere communicating vent 71 by a label 72, evaporation of the ink can be satisfactorily suppressed. Examples of the material forming the label 72 include PP (polypropylene) film, paper, and the like.

The joint member 73 has an insertion portion 24 into which the ink receiving tube is inserted at the free end portion. That is, when the joint member 73 is provided, the joint member 73 constitutes at least a part of the first portion of the ink cartridge. A seal member 24a having an opening is provided in the insertion portion 24, and unless it is mounted on the recording device, the supply opening valve 74 is sealed by urging the supply opening valve 74 toward the opening side by the spring 75. Examples of the material forming the seal member 24a include rubber, elastomer and the like. Examples of the material forming the spring 75 include SUS (stainless steel) and the like. The other end side of the spring 75 closes the inner space of the joint member 73 and the inside of the casing by an air check valve 76. The air check valve 76 is placed such that the air does not flow backward during the process of evacuating the casing after the ink is filled in the process of manufacturing the ink cartridge. Examples of materials of the air check valve 76 include PE (polyethylene), PP (polypropylene), and the like. After injecting the ink into the casing (inner layer), the joint member 73 is connecting to the casing, and the air in the casing is removed through the air vent 77 of joint member 73. Thereafter, the air vent 77 is sealed with a film, but the interior of the joint member 73 and the casing is closed by the air check valve 76 so that the air does not flow back into the casing between the air venting step and the film welding step. Here, the joint member 73 is provided with the projecting portion 25, and the electrode portion 26 is provided on the projecting portion 25. In addition, the joint member 73 enters the cover member 78 and is exposed to the outside through the opening 78*a* of the cover member 78. The insertion portion 24 is also exposed to the outside through the opening 78*a* of the cover member 78. In this case, the joint member 73 constitutes a part of the first portion 20*a* of the ink cartridge and a part of the third portion 20*c*.

When ink is supplied from the ink cartridge, the ink receiving tube is inserted into the joint member 73 from the insertion portion 24, and the inside of the joint member 73 is decompressed. By this pressure reduction, the air check valve 76 is opened. And, the ink in the casing moves into the joint member 73 via the ink flow path member 79 and is supplied to the recording apparatus via the ink receiving pipe. The ink flow path member 79 collects the ink accumulated in the lower part in the casing and supplies it to the ink receiving pipe side. For this reason, as shown in part (b) of FIG. 7, it is preferred that the end portion on the far side from the insertion portion 24 is on the lower side in the direction of gravity and the end portion on the side near to the insertion portion 24 is on the upper side in the direction of gravity. In addition, as shown in part (b) of FIG. 7, it is preferred that the ink flow path member 79 is constituted to incline from the lower side to the upper side from the second portion side of the ink cartridge toward the first portion side. Examples of the material forming the ink flow path member 79 include PE (polyethylene), PP (polypropylene), and the like.

<Mounting Operation of Ink Cartridge>

The ink cartridge can be mounted to the mounting portion of the recording apparatus. The mounting operation when mounting the ink cartridge in the mounting portion of the recording apparatus will be explained.

Parts (a)-(e) of FIG. 8 is a view illustrating a process of mounting the ink cartridge to the mounting portion. In Parts (a)-(e) of FIG. 8, for the mounting portion 14 of the recording device, a part of the hole forming member is indicated by a dotted line, for better illustration. In addition, the groove 80 of the third portion 20*c* of the ink cartridge 20 shown in FIGS. 6 and 7 is omitted. Here, the hole forming member 14*b* covering a part of the electrical connecting portion 22 as described in part (a) of FIG. 4 does not exist in the mounting portion 14 shown here.

Before the state becomes as shown in part (a) of FIG. 8, the first portion 20*a* side of the ink cartridge 20 is first placed in the hole of the hole forming member. And, the relative position between the ink cartridge 20 and the mounting portion 14 is roughly matched by the ID projecting portion 28 of the ink cartridge 20 and the ID recessed portion 14*c* of the mounting portion 14. The insertion is prevented if an ink cartridge other than the ink cartridge to be inserted into the hole of the hole forming member is about to be inserted since the ID projection 28 and the ID recess portion 14*c* do not match. For example, if an attempt is made to insert an ink cartridge that stores magenta in the hole to which the ink cartridge of cyan should be inserted, the shapes of the ID projection 28 and the ID recess portion 14*c* do not match, and therefore, it is impossible to put the ink cartridge into the hole. On the other hand, for example, when trying to insert an ink cartridge storing cyan ink in a hole into which a cyan ink cartridge is to be inserted, the shapes of the ID projection 28 and the ID recess portion 14*c* match with each other, and therefore the ink cartridge can be inserted into the hole.

When the shape of the ID projection 28 matches the shape of the ID recess portion 14*c*, the ink cartridge 20 is inserted into the hole of the mounting portion 14 along the inserting direction with the first portion 20*a* at the leading side. Part (a) of FIG. 8 is an illustration showing the stage of partway of this insertion. The inserting direction of the ink cartridge 20 is a direction in which the first portion 20*a* is directed forward and can also be said to be a direction in which the insertion portion 24 is at the leading side. In the following, the inserting direction with the first portion 20*a* of the ink cartridge 20 at the leading side is simply referred to as "inserting direction of the ink cartridge (20)". In part (a) of FIG. 8, the inserting direction of the ink cartridge 20 is indicated by an arrow. The inserting direction of the ink cartridge 20 is the same as the direction from the second portion 20*b* of the ink cartridge 20 toward the first portion 20*a* (and the longitudinal direction of the ink cartridge 20), in this example.

As shown in part (a) of FIG. 8, when the ID recessed portion 14*c* of the mounting portion 14 extends along the extension direction of the hole formed by the hole forming member, the ink cartridge 20 is inserted so that the ID projection 28 moves along the ID recess 14*c*. In Parts (a)-(e) of FIG. 8, the inserting direction of the ink cartridge 20 is the same as the extending direction of the hole formed by the hole forming member.

Part (b) of FIG. 8 is an illustration showing a state where insertion of the ink cartridge 20 in the inserting direction is completed. It is preferred that in inserting the ink cartridge 20 up to the state shown in part (b) of FIG. 8, the pad electrodes 27 of the ink cartridge 20 are not exposed to the recording device (the mounting portion 14, particularly the hole forming member 14*a*). By inserting the ink cartridge 20 up to the state of part (b) of FIG. 8 without touching the pad electrodes 27 with the recording device, it is possible to prevent the pad electrodes 27 from being damaged, when inserting it up to the state shown in part (b) of FIG. 8. Therefore, it is preferred that for example, a space is provided so that the pad electrodes 27 do not touch the hole formed by the hole forming member of the mounting portion 14, by which the pad electrodes 27 of the electrode portion 26 do not touch the recording device while the ink cartridge 20 is being inserted in the inserting direction. Or, by increasing the diameter of the hole 14*d* shown in part (a) of FIG. 2, the pad electrodes 27 can be prevented from hitting the hole forming member 14*a*.

Here, at the stage of part (b) of FIG. 8, the ink receiving tube 21 of the mounting portion is inserted in the insertion portion 24. That is, the ink receiving tube 21 is inserted into the inserting portion 24 in a process of advancing the ink cartridge 20 straight along the inserting direction and inserting it into the hole forming member.

Next, for example, as the projection 25 comes into contact with the mounting portion, the ink cartridge 20 is rotated as shown in part (c) of FIG. 8. The trigger of the rotation of the ink cartridge 20 is not limited to this. For example, a mark may be provided on the ink cartridge 20, and the user may start to rotate the ink cartridge 20 using this mark. Or, by closing the cover of the recording device, the cover pushes the ink cartridge 20, the ink cartridge 20 may be inserted in the inserting direction until a certain point, and then the rotation may be started.

The rotation of the ink cartridge 20 shown in part (c) of FIG. 8 is a rotation about an axis along the inserting direction of the ink cartridge 20. In other words, when inserting the ink cartridge 20 in the inserting direction along the central axis of the ink cartridge 20, it is the rotation with the central axis of the ink cartridge 20 as the rotational axis. Or, it can be said this rotation is the rotation about the axis along the extending direction of the ink receiving tube 21 as the rotation axis. In addition, in the case of the ink cartridge 20 shaped as shown in Parts (a)-(e) of FIG. 8, it is the rotation about the axis along the longitudinal direction of the ink cartridge 20. At the time of the rotation shown in part (c) of FIG. 8, the ink cartridge 20 does not move in the above-mentioned inserting direction. By the rotation of the ink cartridge 20, the state shown in part (c) of FIG. 8 is changed from the state shown in part (c) of FIG. 8. In the state shown in part (d) of FIG. 8, the projecting portion 25, the electrode portion 26 on the projecting portion 25, and the plurality of pad electrodes 27 are placed between the two positioning walls interposing the plurality of electrical connecting portions 22 (only one positioning wall 23*b* is shown in Parts (a)-(e) of FIG. 8). When the rotation advances to the state shown in part (e) of FIG. 8, the projecting portion 25, the electrode portion 26, and the plurality of pad electrodes 27 are interposed between the positioning walls, and the electric connecting portion 22 of the mounting portion is brought into contact with the center of gravity of each pad electrode of the plurality of pad electrodes 27. Therefore, the pad electrode 27 becomes electrically connected to the electric connecting portion 22. When the pad electrode 27 comes into contact with the electrical connecting portion 22 and becomes electrically connected, mounting of the ink cartridge 20 to the mounting portion is completed. Here, the center of gravity of the pad electrode 27 is not necessarily in contact with the electric connecting portion 22, but it is preferable that the center of gravity of the pad electrode 27 contacts the electric connecting portion 22 from the standpoint of the reliability of electrical connection. In addition, it is preferred that a space is provided in the mounting portion to prevent the ID projecting portion 28 from coming into contact with the hole forming member during this rotation. Here, each of the plurality of pad electrodes 27 shown in Parts (a)-(e) of FIG. 8 has a rectangular shape, and the center of each pad electrode 27 is the center of gravity of the pad electrode 27, in this example.

At the completion of the mounting shown in part (e) of FIG. 8, the preferred position of the tip of the ink receiving tube 21 is as follows. That is, it is 10 mm or more, 20 mm or less away from the first portion 20*a* of the ink cartridge 20, as measured in a direction parallel to the direction from the first portion 20*a* to the second portion 20*b* of the ink cartridge 20. Further preferably, it is located 11 mm or more and 15 mm or less away from the first portion 20*a*. Here, in Parts (a)-(e) of FIG. 8, the direction from the first portion 20*a* to the second portion 20*b* is the same as the longitudinal direction and the inserting direction of the ink cartridge 20.

Parts (a) to (d) of FIG. 9 show the movement of the pad electrode 27 as viewed and another angle by the rotation of the ink cartridge 20 shown in parts (b) to (e) of FIG. 8. Parts (a)-(d) of FIG. 9 is an enlarged view of the periphery of the electrical connecting portion peripheral portion 23 as viewed in the direction perpendicular to the inserting direction of the ink cartridge 20. Parts (a) to (d) in FIG. 9 correspond to parts (b) to (e) in FIG. 8, respectively. As shown in parts (a) to (d) of FIG. 9, the projecting portion 25, the electrode portion 26, and the plurality of pad electrodes 27 are inserted between the two positioning walls interposing the plurality of electric connecting portions 22, by the rotation of the ink cartridge 20. And, the plurality of pad electrodes 27 of the electrode portion 26 come into contact with the electrical connection portion 22 of the electrical connection portion peripheral portion 23, and are electrically connected to the electrical connection portion 22. As shown in Parts (a)-(d) of FIG. 9, while the ink cartridge 20 is being rotated, the ink cartridge 20 is not moved in the inserting direction.

By bring the positioning wall (the positioning walls 23*a*, 23*b* in FIG. 4) into contact with the projecting portion 25 (particularly the projecting portion side surface 25*b* of the projecting portion 25 in particular), the ink cartridge 20 is easy to rotate along the shape of the positioning wall, when the ink cartridge 20 rotates. The positioning wall can determine the position of the projection 25 in rotational mounting. By bring the projecting portion 25 and the positioning wall into contact with each other, the pad electrodes 27 of the ink cartridge 20 is positioned relative to the electrical connecting portion 22 of the mounting portion.

Here, even when the ink cartridge 20 does not have the projecting portion 25, it is easy to position the pad electrodes 27 of the electrode portion 26 relative to the electrical connecting portion 22 of the mounting portion, by bring the electrode portion 26 into contact with the positioning wall. In this case, the ink cartridge 20 is rotated in contact with the side surface of the electrode portion 26 into contact with the positioning wall.

As described above, when the projecting portion 25 (projecting portion side surface 25*b*) of the ink cartridge 20 and the electrode portion 26 are rotated while being in contact with the positioning wall, the rotary mounting becomes easy. And, in this case, the moving direction of the pad electrode 27 when the ink cartridge 20 is rotated is the direction along the extending direction of the positioning wall. Furthermore, the moving direction of the pad electrode 27 when the ink cartridge 20 is rotated may be parallel to the extending direction of the positioning wall.

When performing the rotational mounting as described above, the pad electrode 27 moves in a direction different from the inserting direction of the ink cartridge 20 indicated by an arrow in part (a) of FIG. 8, part (b) of FIG. 8 and part (a) of FIG. 9. The moving direction of the pad electrode 27 is the same as the rotational direction indicated by the arrow in part (c) of FIG. 8, part (d) of FIG. 8, part (b) of FIG. 9 and part (c) of FIG. 9. As the pad electrode 27 moves, the pad electrode 27 can be electrically connected to the electrical connecting portion 22 of the mounting portion.

As described above, with rotation mounting, the pad electrode 27 moves in a direction different from the inserting direction of the ink cartridge 20 when the ink cartridge 20 is mounted. In addition, the ink cartridge 20 is rotatable about the axis along the inserting direction as the rotation axis (or the extending direction of the ink receiving tube, the direction from the first portion 20*a* to the second portion 20*b* (the direction from the second portion 20*b* to the first portion 20*a*), the longitudinal direction). An ink discharging portion (insertion portion) 24 is provided on this rotary shaft. And, the pad electrode 27 moves as described above by the rotation. Therefore, even if the ink cartridge 20 is strongly inserted in the inserting direction, the impact applied to the pad electrode 27 and the electrical connecting portion 22 when the pad electrode 27 contacts the electrical connecting portion 22 can be reduced. This is because the inserting direction of the ink cartridge 20 and the moving direction of the pad electrode 27 are different from each other. In FIGS. 8 and 9, the pad electrode 27 is not in contact with the electrical connecting portion 22 when inserting in the inserting direction. Since the impact applied to the pad electrode 27 and the electrical connecting portion 22 can be reduced, the contact between the pad electrode 27 and the electrical connecting portion 22 can be improved. In addition, occurrence of deformation and so on of the pad electrode 27 and the electric connecting portion 22 and so on can be suppressed.

On the other hand, a case is considered in which when the ink cartridge 20 is inserted in the inserting direction, the pad electrode 27 moves only in the same direction as the inserting direction of the ink cartridge 20, and the pad electrode 27 is electrically connected to the electrical connecting portion 22. In this case, the impact caused by the insertion of the ink cartridge 20 in the inserting direction tends to be directly transmitted to the pad electrode 27 contacting the electrical connecting portion 22. An insertion speed of the ink cartridge 20 in the inserting direction tends to be high. Therefore, when the impact caused by the insertion in the inserting direction tends to be transmitted to the pad electrodes 27 and the electrical connecting portion 22 when the pad electrodes 27 and the electrical connecting portion 22 are connected, the contact between the pad electrodes 27 and the electrical connecting portion 22 may not be good enough in some cases. As a result, deformation or the like of the pad electrodes 27 and the electric connecting portion 22 may occur.

The angle through which the ink cartridge 20 rotates (the angle through which the ink cartridge 20 is rotated) after insertion in the inserting direction is preferably 180 degrees or less in consideration of operability. Further preferably, it is 135 degrees or less, and even further preferably 100 degrees or less. In addition, from the standpoint of operability, it is preferably 10 degrees or more, further preferably it is 45 degrees or more, even further preferably 80 degrees or more. The rotation angle of the ink cartridge 20 is most preferably 90 degrees. Here, the rotation angle of the ink cartridge 20 is the rotation angle through which a certain point of the ink cartridge 20 rotates about the center of gravity of the portion in the direction perpendicular to the inserting direction of the ink cartridge, when viewing the ink cartridge from the first portion side. The certain point of the ink cartridge 20 is, for example, the pad electrode 27 or the ID projection 28. To explain in the Figure, the rotation angle of the ink cartridge 20 is an angle, from the position of part (b) of FIG. 8 to the position of part (e) of FIG. 8, or from the position of part (a) of FIG. 9 to the position of part (d) of FIG. 9. In these Figures, the ink cartridge 20 is rotated by 90 degrees.

<Removing Operation of Ink Cartridge>

The ink cartridge 20 is dismounted from the mounting portion when consuming the stored ink up and replacing the ink cartridge, for example. Removal operation when removing the ink cartridge 20 from the mounting portion will be described.

Removal of the ink cartridge 20 may basically be carried out so as to make the movement opposite to the mounting. First, the ink cartridge 20 is rotated in a direction opposite to the rotating direction at the time of mounting. By the rotation, the pad electrode 27 is separated from the electrical connecting portion 22. Next, in the case where the positioning walls 23*a*, 23*b* and the projecting portion 25 are provided, the projecting portion 25, the electrode portion 26, and the pad electrodes 27 come out from between the positioning walls 23*a*, 23*b*. The direction of this movement is opposite to the direction of movement of the pad electrode 27 described above.

When the projecting portion 25 is provided, the rotation of the ink cartridge 20 is carried out until the projecting portion 25 is not interposed by the positioning walls 23*a*, 23*b*. When the projecting portion 25 is not interposed between the positioning walls 23*a*, 23*b*, the ink cartridge 20 can be pulled out, and therefore, the ink cartridge 20 is pulled straight out in the direction opposite to the inserting direction described above.

In this manner, the removal of the ink cartridge 20 from the mounting portion is completed.

In the structure in which the ink cartridge 20 is rotated and then pulled out, the speed at which the ink cartridge 20 is removed (the moving speed of a certain point of the ink cartridge 20) tends to be slow due to the rotation. Accordingly, the contact state between the pad electrodes 27 and the electrical connecting portions is made preferable, And sudden removal of the ink receiving tube 21 from the insertion portion 24 can be suppressed, the ink receiving tube 21 and the ink in the insertion portion 24 Scattering hardly occurs.

On the other hand, if removal of the ink cartridge 20 is carried out by pulling straight out in the direction opposite to the inserting direction, the speed of removal of the ink cartridge 20 tends to be high. Therefore, the scattering of ink may occur in the ink receiving tube 21 or the inserting portion 24 as described above.

Regarding the removal of the ink cartridge 20, the above-described structures are merely an example, and the present invention is not limited to this. It is not always necessary to remove it by the operation in the opposite movement.

Embodiment 2

The Embodiment 2 will be described focusing on parts different from those of Embodiment 1. In the following description of each embodiment, explanation will be focused on the characteristic parts of each embodiment, and description of common parts may be omitted in some cases.

In Embodiment 1, the electrical connecting portion 22 of the mounting portion is in contact with the center of gravity of each pad electrode 27 in the plurality of pad electrodes 27 of the ink cartridge 20, and the pad electrode 27 is electrically connected to the electrical connecting portion 22. Since the electrical connection point 22 and the pad electrode 27 are in electrical contact with each other because they are in contact with each other, the electrical contact point is the same as the center of gravity of each pad electrode 27.

In addition, in Embodiment 1, the ink cartridge 20 is rotated as shown in Parts (a)-(d) of FIG. 9. The moving direction of the pad electrode 27 in this rotation is the same direction or parallel to the direction connecting the centers of gravity of the plurality of pad electrodes 27. Since the center of gravity of each pad electrode 27 is electrical contact point, the direction in which the electrical contact points of the pad electrodes are arranged in Embodiment 1 is the same as or parallel to the moving direction of the pad electrode 27. Here, the direction in which the electrical contact points of the pad electrodes in the plurality of pad electrodes in this specification are arranged means the direction in which the line connecting the electrical contact points of the pad electrodes extends. It is unnecessary to consider all the pad electrodes of the plural pad electrodes and it suffices to consider the direction in which the electrical contact points of the pad electrodes of at least two pad electrodes are arranged. In addition, the movement trace of the pad electrode is a curve in Embodiment 1 for example, however, in this specification, the tangential line of the curve at the crossing of the curve and the pad electrode is taken as the moving direction of the pad electrode in such a case. In the case that it is difficult to determine the position of the electrical contact point, the direction of the arrangement of the electrical contact points may be substituted by a direction of the line connecting a downstream (with respect to the rotational direction) end of the pad electrode that is closest to the first portion 20*a* an upstream end of the pad electrode that is closest to the second portion 20*b*.

FIG. 10 shows the structure of the ink cartridge 20 according to Embodiment 2. In Embodiment 2, the direction in which the electrical contact points of the pad electrodes 27 are arranged is a direction crossing the moving direction of the pad electrodes 27. That is, the electrical contact points of the pad electrodes 27 are arranged in a nonparallel direction to the moving direction of the pad electrode 27. Here, the crossing direction includes also the directions perpendicular to each other.

The ink cartridge 20 shown in FIG. 10 will be described further. In FIG. 10, in the plurality of pad electrodes 27 of the electrode portion 26, the positions of the centers of gravity of the pad electrodes 27 are arranged in a direction of crossing (inclining) with respect to the direction from the first portion 20*a* to the second portion 20*b* of the ink cartridge 20. In FIG. 10, the direction from the first portion 20*a* to the second portion 20*b* of the ink cartridge 20 is the same as the longitudinal direction and the inserting direction of the ink cartridge 20. In addition, a plurality of electrical connecting portions on the recording device side (not shown in FIG. 10) are also made to correspond to the plurality of pad electrodes 27 and arranged in the same direction.

The ink cartridge 20 shown in FIG. 10 is rotated in the same direction as described n conjunction with Parts (a)-(e) of FIG. 8. That is, After inserting the ink cartridge 20 in the inserting direction, the ink cartridge 20 is rotated about the ink receiving tube while preventing the ink cartridge 20 from advancing in the inserting direction. The pad electrode 27 moves due to the rotation of the ink cartridge 20, and the electrical connecting portions comes into contact with the respective centers of gravity of the pad electrodes 27. And, by the contact between the pad electrodes 27 and the electric connecting portions, the pad electrodes 27 and the electric connecting portions are electrically connected. As described above, the center of gravity of the plurality of pad electrodes 27 are arranged in the direction crossing the moving direction of the pad electrodes 27. In all the pad electrodes 27, the center of gravity of each pad electrode 27 are the electrical contact point. Therefore, in the plurality of pad electrodes 27, the direction in which the electrical contact points of the pad electrodes 27 are arranged crosses or crosses the moving direction of the pad electrodes 27.

In the ink cartridge 20 shown in FIG. 10, as the projecting portion 25 is viewed from the side opposed to the pad electrodes 27 (the upper side of the pad electrode 27), the portion of the projecting portion side surface 25*b* of the projecting portion 25 interposing the pad electrode 27 is partially projected in shape. As described above, a projection is provided on the projecting portion side surface 25*b*, and the projection is brought into contact with the positioning wall to rotate the ink cartridge 20, thereby stabilizing the mounting.

By the electrode pads 27 in arranged such that they are arranged in a direction crossing the direction of movement of the pad electrodes 27, it is easy to increase the distance from the electrical contact point of the pad electrode 27. For this reason, electrical connection at electrical contact point is improved. On the contrary, if the electrical contact points of the pad electrodes 27 are arranged side by side in the direction parallel to the entry direction of the connector pins, that is, in the direction parallel to the moving direction of the pad electrode 27, the distance from the electrical contact point of the pad electrode 27 is not easily increase. This is because the arranging direction of the pad electrodes 27 is the same as the moving direction, it is difficult to increase the distance of the pad electrodes.

It is preferred that the electrical contact point of each pad electrode is arranged at a position of 5 mm or more and 25 mm or less however the first portion 20*a* in a direction parallel to the direction from the first portion 20*a* to the second portion 20*b* of the ink cartridge 20. Further preferably, it is 10 mm or more and 20 mm or less away from the first portion 20*a*. It is preferred that the electrical contact points of all the pad electrodes are in this range. That is, the electrode portion 26 and the pad electrodes 27 preferably provided adjacent to the first portion 20*a*.

The positional relationship between the projection of the projecting portion side surface 25*b* of the projecting portion 25 and the electrical contact point of the pad electrode will be described. FIG. 38 is an enlarged view of the projecting portion 25 of the ink cartridge 20, the electrode portion 26 on the projecting portion 25, and the pad electrode 27, shown in FIG. 10. The projections 25*c*, 25*d* project from the side surface 25*b* of the projecting portion which is the side surface of the projecting portion 25. In the projections 25*c*, 25*d*, the projection 25*c* is on the side close to the first portion 20*a* and the projection 25*d* is on the side close to the second portion 20*b*. The apex of the projection 25*c* (the position most projecting from the side surface 25*b* of the projecting portion) is referred to as the apex 25*c*', and the apex of the projection 25*d* (the position projecting most from the projecting portion side surface 25*b*) is called an apex 25 *d*'. And, the shortest distance from the apex 25*c*' to the pad electrode 27*c* is the length An on the straight line connecting the apex 25*c*' and the apex 25*d*', and the shortest distance from the apex 25*d*' to the pad electrode 27*b* is the length B (FIG. 38). The length A is preferably 2.0 mm or more and 4.0 mm or less, and further preferably 2.5 mm or more and 3.5 mm or less. Similarly, the length B is preferably 2.0 mm or more and 4.0 mm or less, and further preferably 2.5 mm or more and 3.5 mm or less.

In Embodiment 2, the direction in which the electrical contact points of the respective pad electrodes in the plurality of pad electrodes are arranged crosses the direction from the first portion 20*a* to the second portion 20*b*. The preferred arrangement of the electrical contact points of the pad electrodes is as follows. That is, it is preferred that the electrical contact point of the pad electrode closest to the first portion 20*a* is disposed at a position of 5 mm or more and 15 mm or less from the first portion 20*a* as measured in a direction parallel to the direction from the first portion 20*a* to the second portion 20*b* of the ink cartridge 20. Further preferably, it is 10 mm or more and 11 mm or less from the first portion 20*a*. On the other hand, it is preferred that the electrical contact point of the pad electrode most remote from the first portion 20*a* is disposed at a position of 15 mm or more and 25 mm or less away from the first portion 20*a* as measured in the direction parallel to the direction from the first portion 20*a* to the second portion 20*b* of the ink cartridge 20. Further preferably, it is 17 mm or more and 18 mm or less away from the first portion 20*a*. Here, in this specification, when the electrical contact points of the respective pad electrodes are not arranged on a straight line, the direction in which the electrical contact points of the respective pad electrodes are arranged is the direction of the linear approximation line of the electrical contact points.

Embodiment 3

In Embodiment 3, the mounting operation of the ink cartridge to the mounting portion of the recording apparatus is different from that described in Embodiment 1.

The mounting operation in Embodiment 3 will be described, referring to Parts (a)-(d) of FIG. 11. The ink cartridge 20 mounted in Parts (a)-(d) of FIG. 11 is the ink cartridge described in Embodiment 2. Here, in Parts (a)-(d) of FIG. 11, the hole forming member of the mounting portion is omitted, and only the electrical connecting portion peripheral portion 23 of the mounting portion is shown.

The explanation up to the state of part (a) in FIG. 11 is the same as the explanation from part (a) of FIG. 8 to part (b) of FIG. 8. However, in Embodiment 3, in the state of part (a) of FIG. 11, that is, before the rotation of the ink cartridge 20, it is not necessary to insert the ink receiving tube (not shown in Parts (a)-(d) of FIG. 11) into the insertion portion 24. It is preferred that in Embodiment 3, in a state before the ink cartridge 20 is rotated, the ink receiving tube is not inserted into the insertion portion 24.

The reason why it is preferable not to insert the ink receiving tube in the insertion portion 24 in a state before the rotation of the ink cartridge 20 is as follows. It is preferred that when inserting the ink receiving tube into the insertion portion 24 or pulling out the ink receiving tube from the insertion portion 24, the movement of the ink cartridge 20 is made as slow as possible in order to suppress scattering of ink from the ink receiving tube or the insertion portion 24. Therefore, it is preferred that up to the state of part (a) in FIG. 11, the ink receiving tube is not inserted into the inserting portion 24, and the ink receiving tube is inserted into the inserting portion 24 at the timing when the movement of the ink cartridge becomes slow by the subsequent rotation.

The same applies when removing the ink receiving tube from the insertion portion 24. During the rotation of the ink cartridge 20 in which the movement of the ink cartridge 20 tends to become slow, the ink receiving tube comes out of the insertion portion 24 and the state of part (a) of FIG. 11 is provided. Thereafter, the ink cartridge 20 is pulled out from the mounting portion in the direction opposite to the inserting direction. When extracting the ink cartridge 20 in the direction opposite to the inserting direction, there is no situation where the ink receiving tube comes out of the insertion portion 24. For this reason, even if the ink cartridge 20 is pulled out in the direction opposite to the inserting direction earlier, the scattering of ink does not easily occur.

This is the reason why it is preferable not to insert the ink receiving tube into the insertion portion 24 before rotating the ink cartridge 20 in Embodiment 3.

Next, as shown in part (b) of FIG. 11, the ink cartridge 20 is rotated. Timing of rotation can be the same as that explained in Embodiment 1. However, in Embodiment 3, also in this rotation, the ink cartridge 20 is inserted in the inserting direction. That is, the ink cartridge 20 is inserted in the inserting direction with the first portion 20*a* (and the insertion portion 24) at the leading side while the ink cartridge 20 itself rotates. The trace of the movement of a certain point of the ink cartridge 20 ((the pad electrode 27 and the ID projection 28, for example) in this movement process is a screw shape (helical shape). In the following, such rotation is referred to as "screw rotation", and mounting by screw rotation of the ink cartridge is referred to as "screw rotation mounting".

When the ink receiving tube is not inserted into the insertion portion 24 in the state of part (a) of FIG. 11, the ink receiving tube is inserted into the insertion portion 24 in the process of screw rotation mounting of the ink cartridge 20. When the ink receiving tube is inserted into the insertion portion 24 by the rotation of the ink cartridge 20, it is preferable that the ink receiving tube starts to be inserted into the insertion portion 24 by rotating the ink cartridge more than 10 degrees from the state of part (a) in FIG. 11. The angle through which the ink cartridge 20 rotates until the ink receiving tube is inserted into the insertion portion 24 is further preferably 15 degrees or more, and even further preferably 20 degrees or more. In addition, the angle through which the ink cartridge 20 rotates until the ink receiving tube is inserted into the insertion portion 24 is preferably 40 degrees or less, further preferably 30 degrees or less, and even further preferably 25 degrees or less.

By the screw rotation mounting, the state shown in part (b) of FIG. 11 is changed to the state shown in part (c) of FIG. 11. In the state shown in part (c) of FIG. 11, the projecting portion 25, the electrode portion 26 on the projecting portion 25, and the plurality of pad electrodes 27 start to be inserted between the two positioning walls interposing the plurality of electrical connecting portions. It is preferred that the angle through which the ink cartridge 20 rotates until the plurality of pad electrodes 27 start to be inserted between the two positioning walls interposing the plurality of electric connecting portions is 40 degrees or more. Further preferably, it is 50 degrees or more, even further preferably 55 degrees or more. In addition, it is preferred that the angle through which the ink cartridge 20 rotates until the plurality of pad electrodes 27 start to be inserted between the two positioning walls interposing the plurality of electric connecting portions is 75 degrees or less. Further preferably, it is 70 degrees or less, and even further preferably 65 degrees or less.

When advancing the screw rotation until the state shown in part (d) of FIG. 11 is reached, the projecting portion 25, the electrode portion 26, and the plurality of pad electrodes 27 are interposed between the positioning walls, and the electrical connecting portion of the mounting portion come into contact with the centers of gravity of pad electrodes 27. Therefore, the pad electrode 27 is electrically connected to the electrical connection portion. When the pad electrodes 27 come into contact with the electrical connecting portions and are electrically connected with each other, the mounting of the ink cartridge 20 to the mounting portion is completed. The angle through which the ink cartridge 20 rotates until the plurality of pad electrodes 27 start contacting the electrical connecting portion is preferably 70 degrees or more, and further preferably 80 degrees or more. In addition, the angle through which the ink cartridge 20 rotates before the plurality of pad electrodes 27 start contacting the electrical connecting portion is preferably 90 degrees or less, further preferably 88 degrees or less.

Part (d) of FIG. 11 shows the completion state of the mounting in which the pad electrode 27 has been brought into electrical contact with the electrical connecting portion, and therefore, they are electrically connected. It is preferred that the angle through which the ink cartridge 20 rotates by the time of completion of mounting is 90 degrees.

The preferred position of the tip of the ink receiving tube at the completion of mounting is as follows. That is, it is preferred that it is 10 mm or more and 20 mm or less away from the first portion 20*a* of the ink cartridge 20 as measured in a direction parallel to the direction from the first portion 20*a* to the second portion 20*b* of the ink cartridge 20. Further preferably, it is away from 11 mm or more to 15 mm or less from the first portion 20*a*. Here, the direction from the first portion 20*a* to the second portion 20*b* is the same as the longitudinal direction and the inserting direction of the ink cartridge 20 in Parts (a)-(d) of FIG. 11.

Parts (a) to (d) of FIG. 12 show the movement of the pad electrode 27 shown in parts (a) to (d) of FIG. 11 as viewed from another angle. Parts (a)-(d) of FIG. 12 is an enlarged view of the periphery of the electrical connecting portion peripheral portion 23. Parts (a) to (d) in FIG. 12 correspond to parts (a) to (d) in Parts (a)-(d) of FIG. 11, respectively. As shown in parts (a) to (d) of FIG. 12, the projecting portion 25, the electrode portion 26, and the plurality of pad electrodes 27 are inserted between the two positioning walls by the screw rotation of the ink cartridge 20, and the positioning walls are opposed to each other interposing a plurality of electric connecting portions 22. And, the plurality of pad electrodes 27 of the electrode portion 26 contact the electrical connection portions 22 of the electrical connection portion peripheral portion 23 and are electrically connected to the electrical connection portion 22.

Here, it is preferred that even when the screw of the ink cartridge 20 is rotated, the positioning walls 23*a* and 23*b* are in contact with the projecting portion 25 (in particular, the projecting portion side surface 25*b* of the projecting portion 25). The contact between the positioning walls 23*a*, 23*b* and the projection 25 facilitates screw rotation of the ink cartridge 20 along the shape of the positioning walls 23*a*, 23*b*. The positioning walls 23*a*, 23*b* can determine the position of the projecting portion 25 in screw rotation mounting. The pad electrode 27 of the ink cartridge 20 is positioned with respect to the electrical connecting portion 22 of the mounting portion by the mutual contact operation between the projecting portion 25 and the positioning walls 23*a*, 23*b*.

It is preferred that an angle formed between the projecting portion side surface 25*b* of the projecting portion 25 and a direction from the first portion 20*a* to the second portion 20*b* of the ink cartridge 20 is 50 degrees or more and 70 degrees or less. Further preferably, it is 55 degrees or more. In addition, it is preferably less than 60 degrees. Here, this angle is the angle as viewed from the side facing the top surface of the projecting portion 25. The direction of the projecting portion side surface 25*b* is the direction in which the projecting portion side surface 25*b* extends as the projecting portion 25 is viewed from the side opposed to the pad electrode 27. Here, in the case where the projecting portion side surface 25*b* does not have a linear shape due to including the projection as described above, the direction of the side surface may be determined by regarding the projecting portion side surface 25*b* as the approximate straight line. If such a relationship of angles is satisfied, better mounting is possible. Here, although a plurality of projecting portion side surfaces 25*b* are provided, better mounting is possible if at least one of the projecting portion side surfaces 25*b* satisfies the above angle relationship. In particular, it is preferred that in the direction in which the pad electrodes 27 are arranged, the projecting portion side surfaces 25*b* positioned on the outer sides of the opposite ends of the plurality of pad electrodes 27 satisfy the above-described angle relationship.

Here, in this specification, unless otherwise noted, the angle formed between two directions and the angle at which a certain direction is inclined with respect to another direction are the smaller of the four angles formed by the two directions. In other words it is the pair of the smaller angles out of two pairs of the same angles. In addition, when two directions (or lines) are in a twisted position relationship, two lines parallel to each direction (or line) are drawn from arbitrary points, and the angle formed by the two directions (or lines) is the intended angle.

Even when the ink cartridge 20 does not have the projecting portion 25, the positioning between the pad electrode 27 of the electrode portion 26 and the electrical connecting portion 22 of the mounting portion is easy by bring the electrode portion 26 into contact with the positioning walls 23*a*, 23*b*. In this case, the moving direction of the pad electrode 27 in the screw rotation of the ink cartridge 20 is the direction along the extending direction of the positioning walls 23*a*, 23*b*. In addition, the moving direction of the pad electrode 27 at the time of screw rotation of the ink cartridge 20 can be the direction along the extending direction of the positioning walls 23*a*, 23*b*. Further, the moving direction of the pad electrode 27 at the time of screw rotation of the ink cartridge 20 can be made parallel to the extending direction of the positioning walls 23*a*, 23*b*.

When the screw rotation mounting as described above is carried out, the pad electrode 27 moves in a moving direction different from the inserting direction of the ink cartridge 20 indicated by an arrow in part (a) of FIG. 11. In screw rotation mounting, the pad electrode 27 rotates in a screw shape with a component in the inserting direction, And the pad electrode 27 moves while rotating in a screw shape with respect to the linear inserting direction. That is, the pad electrode 27 moves in a direction different from the inserting direction of the ink cartridge 20. As the pad electrode 27 moves, the pad electrode 27 comes in contact with the electric connecting portion and is electrically connected to the electric connecting portion.

As described above, in screw rotation mounting, when mounting the ink cartridge 20, the pad electrode 27 moves in a direction different from the inserting direction of the ink cartridge 20. Therefore, even if the insertion of the ink cartridge 20 in the inserting direction is carried out with a strong force, the impact applied to the pad electrode 27 and the electrical connecting portion 22 when the pad electrode 27 comes into contact with the electrical connecting portion 22 on the mounting portion side can be made smaller. Since the impact applied to the pad electrode 27 and the electric connecting portion 22 can be reduced, the pad electrode 27 and the electric connecting portion 22 can be brought into good contact with each other.

As has been descried in the foregoing, the ink cartridge 20 is rotatable about the axis extending along the inserting direction and the longitudinal direction, and can be mounted by this rotation. And, when mounting the ink cartridge 20, the pad electrode 27 moves in a direction different from the inserting direction of the ink cartridge 20. It is preferred that the moving direction of the pad electrode 27 is inclined by 50 degrees or more with respect to the inserting direction of the ink cartridge 20. In addition, it is further preferable that it is inclined by 60 degrees or more. As in Embodiment 1, it may be inclined (orthogonal) by 90 degrees, but it is preferable that the inclination is 80 degrees or less, further preferably 70 degrees or less.

Additionally, in Embodiment 2, the ink cartridge 20 is inserted in the inserting direction, and after the insertion in the inserting direction is stopped, the ink cartridge 20 is rotated so that pad electrode 27 is moved in a direction different from the inserting direction of the ink cartridge 20. On the other hand, in Embodiment 3, also in the rotation after inserting the ink cartridge 20 in the inserting direction, the ink cartridge 20 is rotated (screw rotation) while being inserted in the inserting direction so that pad electrode 27 is moved in a direction different from the inserting direction of ink cartridge 20.

In Embodiment 3, the ink cartridge 20 is mounted with the screw rotation, and therefore, the moving speed of the ink cartridge 20 in the inserting direction tends to be slow. Therefore, the movement speed of the pad electrode 27 of the ink cartridge 20 is also likely to be slow, and the contacting action relative to the electrical connecting portion of the pad electrode 27 can be satisfactorily performed. In addition, a series of actions up to completion of mounting can be carried out more smoothly, and therefore, it is also excellent in terms of operability. As described above, it is possible to make the inserting direction of the ink cartridge 20 and the moving direction of the pad electrode 27 different from each other merely by executing screw rotation mounting. Further, deformation of the pad electrode 27 and scattering of ink at the ink receiving tube and the insertion portion are less likely to occur in removing the ink cartridge 20.

Here, the angle through which the screw of the ink cartridge 20 is rotated is preferably 180 degrees or less, further preferably 135 degrees or less, and even further preferably 100 degrees or less from the standpoint of operability. In addition, from the standpoint of operability, it is preferably 10 degrees or more, further preferably 45 degrees or more, even further preferably 80 degrees or more. The angle through which the screw of the ink cartridge 20 is rotated is most preferably 90 degrees. Here, the angle through which the ink cartridge 20 makes the screw rotation is the rotation angle when a certain point of the ink cartridge 20 rotates about the center of gravity of the cross-section in the direction perpendicular to the inserting direction of the ink cartridge 20 as viewing the ink cartridge 20 from the first portion side. The certain point of the ink cartridge 20 is, for example, the pad electrode 27 or the ID projection 28. To explain in the Figure, the angle through which the ink cartridge 20 rotates is an angle from the position of part (a) of FIG. 11 to the position of part (d) of FIG. 11 or from the position of part (a) of FIG. 12 to the position of part (d) of FIG. 12. In these Figures, the ink cartridge 20 is rotated through 90 degrees.

In Embodiment 3, if the electrical contact points of the pad electrodes 27 are arranged in a direction crossing the moving direction of the pad electrode 27, the arrangement and the size of the pad electrode 27 and the electric connecting portion can be selected particularly efficiently. In addition, the electrical connection between the pad electrodes 27 and the electrical connecting portions can be easily performed satisfactorily.

The electrical contact points of the pad electrodes 27 are preferably arranged at an angle of 60 degrees or more with respect to the moving direction of the pad electrode 27, further preferably inclined by 70 degrees or more, even further preferably inclined by 80 degrees or more. Also, it is preferred that the electrical contact points of the pad electrodes 27 are arranged in a direction perpendicular to the moving direction of the pad electrode 27. As described above, the angle at which two directions cross is a small angle out of the four angles formed by the two directions. Therefore, the angle at which two directions cross is at most 90 degrees. At this time, the two directions are orthogonal with each other. In addition, in Embodiment 3, the pad electrode 27 moves in the form of a screw, but in such a case, the angle formed by the two directions (inclination angle) is calculated, considering the moving direction of the pad electrode as follows. That is, the direction of movement of the pad electrode is approximated as the direction of the tangent line of the movement locus at the crossing point between the direction in which the electrical contact point of the pad electrode 27 arranged and the movement locus of the screw-shaped pad electrode 27 (approximate straight line).

It is preferred that the direction in which the electrical contact points of the pad electrodes 27 are arranged is inclined by 20 degrees or more and 40 degrees or less with respect to the direction from the first portion 20*a* to the second portion 20*b* of the ink cartridge 20. Moreover, it is preferable that it is inclined by 30 degrees or more and 35 degrees or less. Here, the direction from the first portion 20*a* to the second portion 20*b* is the same as the longitudinal direction and the inserting direction of the ink cartridge 20 in FIG. 10.

Next, an example of the arrangement of the pad electrode 27 will be described. Parts (a) to (f) of FIG. 13 show examples of arrangement of pad electrodes 27 as the plurality of pad electrodes 27 are viewed from above. In Parts (a)-(h) of FIG. 13, the moving direction of the pad electrode 27 in Embodiment 3 is indicated by a solid arrow and a line connecting the electrical contact points 27*a* of the pad electrodes 27 is indicated by a dotted line with arrows. The moving direction of the pad electrode 27 is approximately linearly shown as described above. The two arrows in parts (a)-(f) of FIG. 13 are perpendicular to each other. That is, in parts (a)-(f) of FIG. 13, the electrical contact points 27*a* of the pad electrodes 27 are arranged in the direction perpendicular to the moving direction of the pad electrode 27. Here, the plurality of pad electrodes 27 may include the pad electrode 27 in which the electrical contact point 27*a* is not the same as the center of gravity of the pad electrode 27. For example, in the pad electrode 27 of part (c) of FIG. 13, the centers of gravity and the electrical contact points 27*a* do not coincide at any pad electrode 27.

It is preferred that when the connector pin relatively moves toward the electrical contact point 27*a* of the pad electrode 27, the connector pin does not touch the pad electrode other than the pad electrode supposed to be brought into contact for electrical connection. This is for the following reasons. For example, in some cases, the pad electrodes and the connector pins are already in a state of flowing electricity at the time of mounting, and the mounting completion is detected by the contact between the pad electrodes and the connector pins. In case of such detection, there is a possibility that the detection cannot be performed in order, if the connector pin contacts the pad electrode other than the pad electrode supposed to be contacted to establish the electrical connection. In addition, when the connector pin rides on a pad electrode other than the pad electrode to be contacted, the ridden pad electrode may be damaged. From such a standpoint, it is preferred that the arrangement is such that the pad electrodes do not overlap in the direction of insertion of the connector pin, that is, the direction of movement of the pad electrode. In the arrangements shown in parts (a), part (b) thereof, part (c) thereof, part (d) thereof, and part (f) thereof of FIG. 13, the pad electrodes 27 do not overlap in the moving direction of the pad electrodes 27.

The relationship between the moving direction of the pad electrode 27 and the direction in which the electrical contact points of the pad electrodes 27 are arranged has been described above. Here, since the area occupied by the pad electrode 27 (the area of the pad electrode 27) can be an electrical contact point relative to the electrical connecting portion 22 of the pad electrode 27, the electrical contact point of the pad electrode 27 may be considered as being the area of the pad electrode 27. In addition, the direction in which the electrical contact point are arranged may be considered in relation with the direction from the first portion 20*a* to the second portion 20*b* of the ink cartridge or the inserting direction of the ink cartridge into the hole forming member, not in relation with the moving direction of the pad electrode 27. Even with these structures, it is possible to make good electrical contact between the pad electrode 27 and the electrical connecting portion 22.

For example, the plurality of pad electrodes 27 preferably have the areas arranged in the direction crossing the moving direction of the pad electrodes 27, that is, the areas of (occupied by) the pad electrodes 27 are arranged so as to be crossed by a line (U, part (h) of FIG. 13) inclined relative to the moving direction of the pad electrodes 27, as viewed in the direction perpendicular to the surfaces of the pad electrodes 27 (perpendicular to the sheet of the drawing of part (h) of FIG. 13). The plurality of pad electrodes 27 preferably have the areas arranged in the direction crossing the moving direction of the pad electrodes at an angle of 60 degrees or more, further preferably 70 degrees or more, and even further preferably 80 degrees or more, that is, the areas of the pad electrodes 27 are arranged so as to be crossed by a line inclined by an angle of 60 degrees or more, further preferably 70 degrees or more, and even further preferably 80 degrees or more with respect to the moving direction of the pad electrodes 27, as viewed in the direction perpendicular to the surfaces of the pad electrodes 27. The plurality of pad electrodes 27 preferably have the areas arranged so as to be crossed by a line perpendicular to the moving direction of the pad electrodes 27, as viewed in the direction perpendicular to the surfaces of the pad electrodes 27. Here, when the moving direction of the pad electrode is curved or screw shape, the moving direction of the pad electrode is considered as extending direction of the approximate straight line as described above.

In addition, it is preferred that the plurality of pad electrodes 27 have the areas arranged in the direction crossing the direction W (part (h) of FIG. 13) from the first portion 20*a* toward the second portion 20*b* of the ink cartridge 20, that is, the areas of the pad electrodes 27 are arranged so as to be crossed by a line U (part (h) of FIG. 13) inclined with respect to the direction W from the first portion 20*a* toward the second portion 20*b* of the ink cartridge 20, as viewed in the direction perpendicular to the surfaces of the pad electrodes 27. In addition, it is preferred that the plurality of pad electrodes 27 have the areas arranged in the direction crossing the direction W (part (h) of FIG. 13) from the first portion 20*a* toward the second portion 20*b* of the ink cartridge 20 at an angle (γ) which is 10 degrees or more (β) and 60 degrees or less (α), further preferably 30 or more degrees and 35 degrees or less, that is, the areas of the pad electrodes 27 are arranged so as to be crossed by a line U (part (h) of FIG. 13) inclined by an angle (γ) which is 10 degrees or more (β) and 60 degrees or less (α), and further preferably 30 degrees or more and 35 degrees or less, with respect to the direction W from the first portion 20*a* toward the second portion 20*b* of the ink cartridge 20, as viewed in the direction perpendicular to the surfaces of the pad electrodes 27. As to the case in which the angle formed between the line U and the direction W from the first portion 20*a* toward the second portion 20*b* of the ink cartridge 20 is the largest as viewed in the direction perpendicular to the surfaces of the pad electrodes 27, as indicated by line T in part (h) of FIG. 13 is the largest, the angle (α) formed between the direction W and the line T is preferably 40 degrees or more and 60 degrees or less. On the other hand, as to the case in which the angle formed between the line (U) and the direction (W) from the first portion 20*a* toward the second portion 20*b* of the ink cartridge 20 is the largest as viewed in the direction perpendicular to the surfaces of the pad electrodes 27, as indicated by line T in part (h) of FIG. 13 is the smallest, the angle (α) formed between the direction (W) and the line T is preferably 10 degrees or more and 20 degrees or less. The direction from the first portion 20*a* to the second portion 20*b* of the ink cartridge 20 can also be considered as the longitudinal direction of the ink cartridge 20.

In addition, it is preferred that the plurality of pad electrodes 27 have the areas arranged so as to be crossed by a line U (part (h) of FIG. 13) inclined with respect to the inserting direction of the ink cartridge 20, as viewed in the direction perpendicular to the surfaces of the pad electrodes 27. In addition, it is preferred that the plurality of pad electrodes 27 have the areas arranged so as to be crossed by a line U (part (h) of FIG. 13) inclined by an angle (γ) which is 10 degrees or more (β) and 60 degrees or less (α), with respect to the inserting direction of the ink cartridge 20, as viewed in the direction perpendicular to the surfaces of the pad electrodes 27. In addition, it is preferred that the plurality of pad electrodes 27 have the areas arranged in the direction crossing the inserting direction of the ink cartridge 20 at an angle (γ) which is 20 degrees or more (β) and 40 degrees or less (α), that is, the areas of the pad electrodes 27 are arranged so as to be crossed by a line inclined by an angle (γ) which is 20 degrees or more (β) and 40 degrees or less (α), with respect to the inserting direction of the ink cartridge 20, as viewed in the direction perpendicular to the surfaces of the pad electrodes 27. It is further preferred that the angle (γ) is 30 degrees or more and 35 degrees or less. As to the case in which the angle formed between the line (U) and the inserting direction of the ink cartridge 20 is the largest as viewed in the direction perpendicular to the surfaces of the pad electrodes 27, as indicated by line T in part (h) of FIG. 13 is the largest, the angle (α) formed between the inserting direction and the line T is preferably 40 degrees or more and 60 degrees or less. On the other hand, as to the case in which the angle formed between the line (U) and the inserting direction of the ink cartridge 20 is the largest as viewed in the direction perpendicular to the surfaces of the pad electrodes 27, as indicated by line T in part (h) of FIG. 13 is the smallest, the angle (α) formed between the inserting direction and the line T is preferably 10 degrees or more and 20 degrees or less.

In addition, it is preferred that the plurality of pad electrodes 27 have the areas arranged in the direction crossing the longitudinal direction of the ink cartridge 20, that is, the areas of the pad electrodes 27 are arranged so as to be crossed by a line inclined with respect to the longitudinal direction of the ink cartridge 20, as viewed in the direction perpendicular to the surfaces of the pad electrodes 27. In addition, it is preferred that the plurality of pad electrodes 27 have the areas arranged in the direction crossing the longitudinal direction of the ink cartridge 20 at an angle (γ) which is 20 degrees or more (β) and 40 degrees or less (α), that is, the areas of the pad electrodes 27 are arranged so as to be crossed by a line inclined by an angle (γ) which is 20 degrees or more (β) and 40 degrees or less (α), with respect to the longitudinal direction of the ink cartridge 30, as viewed in the direction perpendicular to the surfaces of the pad electrodes 27. It is further preferred that the angle (γ) is 30 degrees or more and 35 degrees or less.

Also, it is preferred that the pad electrode 27 closest to the first portion 20*a* among the plurality of pad electrodes 27 has the area of the pad electrode 27 at a position of 5 mm or more and 15 mm or less away from the first portion 20*a* as measured in a direction parallel to the direction from the first portion 20*a* to the second portion 20*b* of the ink cartridge 20. Further preferably, it is 10 mm or more and 11 mm or less away from the first portion 20*a*. On the other hand, it is preferred that the pad electrode 27 most remote from the first portion 20*a* has the area of the pad electrode 27 at a position of 15 mm or more and 25 mm or less away from the first portion 20*a* as measured in a direction parallel to the direction from the first portion 20*a* to the second portion 20*b* of the ink cartridge 20. Further preferably, it is 17 mm or more and 18 mm or less away from the first portion 20*a*. Here, the pad electrode 27 closest to the first portion 20*a* means the pad electrode 27 including the portion closest to the first portion 20*a* among the plurality of pad electrodes 27. In addition, the pad electrode 27 furthest from the first portion 20*a* means the pad electrode 27 including a portion most remote from the first portion 20*a* among the plurality of pad electrodes 27.

In the case where the electrical connection on the mounting portion side is a connector pin, it is preferred that the pad electrode 27 extends from the electrical contact point along the moving direction of the pad electrode 27. In particular, it is preferred that the longitudinal direction of the pad electrode 27 is along the moving direction of the pad electrode 27 from the electrical contact point. The reason for this is as follows. The connector pin moves toward the electrical contact point while being in contact with the pad electrode 27, so that dust and the like adhering to the pad electrode 27 can be removed. And, after the state is established in which the electrical contact points a substantially free of dust or the like, the pad electrodes 27 and the connector pins make final contact with each other at the electrical contact points. For this reason, it is preferred that the pad electrode 27 extends from the electrical contact point along the moving direction of the pad electrode 27 so that a portion where dust or the like has been sufficiently removed can be made as an electrical contact point.

Also, it is preferred that the length of the pad electrode 27 from the electrical contact point (the distance the pad electrode 27 extends or the shortest distance from the electrical contact point to the end of the pad electrode 27) is 0.5 mm or more. Further preferably, it is 1.0 mm or more. From the stand point of the space, it is preferable that the length of the pad electrode 27 from the electrical contact point is 4.0 mm or less. As for these lengths, all of the plurality of pad electrodes 27 may satisfy, or at least one pad electrode 27 may satisfy.

Here, each connector pin may be constituted to extend in a direction crossing (inclining) the moving direction of the pad electrode 27 (structure in which the longitudinal direction of the connector pin crosses with the moving direction of the pad electrode). However, this may result in that the surface of the connector pin rides on the side edge (step) of the pad electrode 27 of the electrode portion 26, and the reliability of the connector pin or the pad electrode 27 may be deteriorated. On the other hand, in order to avoid such a liability, the shape and arrangement of the connector pins are complicated, and the occupied space will be large.

In the case where the electrode portion 26 has a plurality of pad electrodes 27, the moving direction of the pad electrode 27 may be regarded as the moving direction of the electrode portion 26.

In addition, it is preferred that the inclinations and angles in the two directions described above are satisfied by all of the pad electrodes 27 among the plurality of pad electrodes 27 of the ink cartridge.

Next, the description will be made as to the desirable number, size, arrangement, and so on of the pad electrode 27 in consideration of mounting of the ink cartridge. First, it is preferred that the ink cartridge has four or more pad electrodes 27. Parts (a)-(h) of FIG. 13 shows an example in which the ink cartridge has four pad electrodes (two for an electric power supply line for enabling access to the information stored in the memory element of the electrode portion 26, and two for informational line), it is further preferable that the ink cartridge has four pad electrodes 27. More specifically, the four pad electrodes include a grounding pad electrode for providing a reference potential of the circuit and always having an electric potential of 0, a clock signal pad electrode for providing a reference for the minimum unit of data transmission and providing pulses at a constant frequency, an electric power supply pad electrode for actuating IC and the like and having a positive potential, and a data signal pad electrode for actuating the circuit by feeding binary signal in accordance with data. In FIG. 18, the shown pad electrodes are the grounding pad electrode, the clock signal pad electrode, the electric power supply pad electrode, and the data signal pad electrode, in the order named from the top of this Figure. It is preferable that the grounding pad electrode is larger than the other electrode. This is because it is preferable that the grounding pad electrode is first assuredly connected to make the reference potential constant so that the operations are stabilized. Referring to part (g) of FIG. 13, the lateral width of the plurality of pad electrodes 27 will be described. As shown in part (g) of FIG. 13, the lateral width of the plurality of pad electrodes 27 is a length measured between the laterally inside end portions (27*d*, 27*e*) of the most laterally outside pad electrodes 27 (the pad electrodes 27*b*, 27*c*) along a straight line passing through all the pad electrodes 27 as described above (the portion indicated by a reference character An in part (g) of FIG. 13). The lateral width of the plurality of pad electrodes 27 is preferably 5 mm or more and 10 mm or less, further preferably 6 mm or more and 9 mm or less, even further preferably 7 mm or more and 8 mm or less.

Embodiment 4

In Embodiment 3, the projecting portion of the ink cartridge (the side surface of the projecting portion) is in contact with the positioning wall of the mounting portion while moving the projecting portion along the positioning wall, so that the screw rotation mounting is executed. By this screw rotation mounting, the pad electrode of the electrode portion provided on the projecting portion moves in a direction different from the inserting direction with the first portion (and the insertion portion) of the ink cartridge at the leading side, so that they are electrically connected to electrical connections.

In Embodiment 4, a guide portion for facilitating screw rotation mounting is provided on the ink cartridge, and the screw rotation is carried out using this guide portion.

FIG. 14 shows then ink cartridge including the guide portion. The guide portion 29 is provided in the third portion 20*c* of the ink cartridge. The guide portion 29 is a groove extending along the rotational direction at the time of mounting. Here, the guide portion 29 is a screw shaped groove (part of a screw shape). One guide portion 29 may be provided, or a plurality guide portions 29 may be provided. In FIG. 14, a second guide portion 38 different from the guide portion 29 is provided at a position opposite to the guide portion 29 of the ink cartridge. The second guide portion 38 is a groove independent from the guide portion 29 (not connected). Here, the guide portion 29 and the second guide portion 38 are provided on the cover member 78 shown in Parts (a) and (b) of FIG. 7. In addition, the guide portion 29 and the second guide portion 38 are provided in the large diameter portion of the ink cartridge. The pad electrode 27 is provided in the small diameter portion, but the guide portion 29 is provided in the large diameter portion, and therefore, the extending direction of the guide portion 29 and the moving direction of the pad electrode 27 are not strictly the same. However, these directions are substantially the same, and the guide portion 29 has a shape extending along the moving direction of the pad electrode 27 (and the rotational direction of the ink cartridge 20) at the time of mounting. Therefore, the extending direction of the guide portion 29 can also be considered as the moving direction of the pad electrode 27 or the rotational direction of the ink cartridge 20.

The guide portion 29 and the second guide portion 38 are open at the end of the large diameter portion (the opening 29*a*, the second opening 38*a*) at the connecting portion between the large diameter portion and the small diameter portion. It is preferred that the opening 29*a* and the second opening 38*a* are located at diametrically opposite positions of the ink cartridge 20. In addition, it is preferred that the second opening 38*a* is disposed on a line extending from the opening 29*a* through the center of gravity of the ink cartridge 20 in a cross-section perpendicular to the longitudinal direction of the ink cartridge 20.

Referring to parts (a) to (c) of FIG. 15, the mounting operation of the ink cartridge 20 using the guide portion 29 and the second guide portion 38 will be described. Here, although the mounting operation using the two guide portions will be explained, for example, but only one guide portion 29 may be used.

First, the ink cartridge 20 is inserted in the inserting direction relative to the recording apparatus until the state shown in part (a) of FIG. 15 is reached. The operation so far is basically the same as that explained in part (a) of FIG. 11. However, in part (a) of FIG. 15, the lock pin 30 of the electrical connecting portion peripheral portion 23 of the mounting portion is inserted into the guide portion 29. The lock pin 30 is inserted into the guide portion 29 through the opening 29*a* of the guide portion 29. Similarly, the second lock pin 39 is inserted into the second guide portion 38 through the second opening 38*a* of the second guide portion 38.

The lock pin 30 and the second lock pin 39 are guide portions of the mounting portion and have respective pin shapes. It is preferred that the ends of the lock pins (end portions on the side of being inserted into the guide portions 29, 38) are semispherical. In addition, it is preferred that the lock pin 30 and the second lock pin 39 press the ink cartridge 20. In Parts (a)-(c) of FIG. 15, the ink cartridge 20 is sandwiched between the lock pin 30 and the second lock pin 39 to press the ink cartridge 20, respectively. By this, the ink cartridge 20 does not easily move relative to the mounting portion, and therefore, the accuracy of mounting of the ink cartridge 20 is enhanced. As described above, it is preferred that the ink cartridge 20 is sandwiched between the lock pin 30 and the second lock pin 39. Therefore, it is preferred that the guide portion 29 and the second guide portion 38 corresponding to the lock pin 30 and the second lock pin 39 are located diametrically opposite to each other of the ink cartridge 20. That is, it is preferred that the second guide portion 38 is disposed on a line extending from the guide portion 29 through the center of gravity in the cross-section perpendicular to the longitudinal direction of the ink cartridge 20.

Parts (a) and (b) of FIG. 16 shows the positional relationship between the two guide portions and the lock pin. Part (a) of FIG. 16 shows the ink cartridge 20 as viewed from obliquely above the electrical connecting portion peripheral part 23, and part (b) of FIG. 16 shows the ink cartridge 20 as viewed from the insertion portion 24 side. As shown in parts (a) and part (b) thereof of FIG. 16, the lock pin 30 and the second lock pin 39 are disposed in the positions opposed to each other, and the guide portion 29 and the second guide portion 38 corresponding thereto are also disposed at positions where the ink cartridge 20 faces to each other.

The ink cartridge 20 is rotated by the screw from the state where the guide portion of the mounting portion and the guide portion of the ink cartridge 20 are engaged with each other, as shown in part (b) of FIG. 16, and the ink cartridge 20 is rotated while advancing the ink cartridge 20 in the inserting direction. As shown in part (a) of FIG. 15 to part (b) of FIG. 15. At this time, the lock pin 30 is restricted by the guide portion 29, and therefore, the direction of the screw rotation is determined by the guide portion 29, and the projecting portion 25 is guided between the positioning walls 23*a* and 23*b*. Moreover, when the rotating operation is further carried out, the mounting completed state of part (c) in FIG. 15 is reached, but immediately before that, the lock pin 30 rides over the guide portion rib 29*b* disposed inside the groove of the guide portion 29. By this, when the user grips the ink cartridge 20, the user feels a click and can be informed of the completion of the mounting. Similarly, the guide portion ribs may be provided in the second guide portion 38.

The projection 25 and the positioning walls 23*a*, 23*b* may be in contact with each other also during rotation using the guide portion 29. By using the contact between the projecting portion 25 and the positioning walls 23*a*, 23*b* in addition to the guide portion 29 and the second guide portion 38 and the lock pin, the screw rotation is more stable.

Here, the rotation using the guide portion 29 is not limited to the screw rotation, and also when rotating in the inserting direction of the ink cartridge 20 as in Embodiment 1 without insertion thereof, the guide portion 29 may be used.

The ink cartridge 20 may be provided with a groove other than the guide portion 29. For example, as shown in part (a) of FIG. 17, the groove 31 may be provided along the guide portion 29.

In the case where the guide portion 29 of the ink cartridge 20 is a groove, it is preferable that the depth of the guide portion 29 is 1.0 mm or more and 5.0 mm or less, considering the function as a guide for rotation. The depth of the guide portion 29 is further preferably 2.0 mm or more and 4.0 mm or less. Here, it is preferred that in the portion where the guide portion rib 29*b* is provided inside the guide portion, the depth of the guide portion is shallow, corresponding to the provision of the guide portion rib 29*b*, the depth of the guide portion is 0.4 mm or more, 0.6 mm or less. It is preferred that the height of the guide portion rib 29*b* is 1.5 mm or more and 2.0 mm or less. Here, it is preferred that when the height of the guide portion rib 29*b* is X and the depth of the guide portion 29 is Y, $X<Y$ is satisfied. By satisfying the inequality $X<Y$, it is possible to prevent the guide portion rib 29*b* from projecting out of the guide portion 29.

It is preferred that the extending direction of the guide portion 29 of the ink cartridge is inclined by 50 degrees or more and 80 degrees or less with respect to the direction from the first portion 20*a* toward the second portion 20*b* of the ink cartridge 20. Further preferably, it is 60 degrees or more. Even further preferably, it is less than 70 degrees. In Parts (a)-(c) of FIG. 15, the direction from the first portion 20*a* toward the second portion 20*b* of the ink cartridge 20 is the same as the longitudinal direction of the ink cartridge 20.

In addition, the extending direction of the guide portion in this specification is considered as follows. First, the ink cartridge 20 is viewed from the direction facing the pad electrode 27. The extending direction of the guide portion 29 as viewed in this direction is defined as the extending direction of the guide portion 29. The guide portion 29 shown in Parts (a)-(c) of FIG. 15 extends in the form of a screw and is not a perfect straight line when sing the guide portion 29 from the side opposed to the pad electrode 27, but in such a case, a straight line (approximate straight line) is assumed. In addition, even when the shape and width of the guide portion 29 vary depending on the location, the extension direction of the guide portion 29 is considered as the extension direction of the approximate straight line of the guide portion 29. In FIG. 18, the extending direction of the guide portion 29 as viewed from the side facing the pad electrode 27 is indicated by a solid arrow A. In addition, the direction in which the electrical contact points of the pad electrodes 27 are arranged is indicated by the dotted line B. The extending direction of the guide portion 29 and the direction in which the electrical contact points of the pad electrodes 27 are arranged are inclined and cross with each other at an angle C at the position of the crossing between the two directions.

Next, the relationship between the extension direction of the guide portion 29 of the ink cartridge 20 and the direction in which the electrical contact points of the pad electrodes 27 are arranged will be described. As described above, the guide portion 29 has a shape corresponding to the rotational direction at the time of mounting, and has a shape extending along the rotational direction and the moving direction of the pad electrode 27. That is, the extending direction of the guide portion 29 can be considered in the same way as the moving direction of the pad electrode 27 in rotational mounting. From this standpoint, it is preferred that the direction in which the electrical contact points of the pad electrodes 27 are arranged is a direction crossing the extending direction of the guide portion 29.

It is preferable that the electrical contact points of the pad electrodes 27 be arranged at an angle of 60 degrees or more with respect to the extending direction of the guide portion 29, further preferably it is arranged at the angle of 70 degrees or more, and even further preferably it is arranged at the angle of 75 degrees or more. In addition, it is preferred that the electrical contact points of the pad electrodes 27 are inclined by 85 degrees or less (with an inclination of 85 degrees or less) with respect to the extending direction of the guide portion 29. Here, considering that the guide portion is in the large diameter portion and the pad electrode is in the small diameter portion, the direction in which the electrical contact points of the pad electrodes are arranged and the extending direction of the guide portions are not perpendicular to each other, similarly to the relationship between the direction in which the electrical contact points of the pad electrodes are arranged and the direction of movement of the pad electrodes.

For the multiple pad electrodes 27, the plurality of pad electrodes 27 have the areas arranged so as to be crossed by a line U (part (h) of FIG. 13) inclined with respect to the extending direction of the guide portion 29, as viewed in the direction perpendicular to the surfaces of the pad electrodes 27. The plurality of pad electrodes 27 preferably have the areas arranged in the direction inclined relative to the extending direction of the guide portion 29, that is, the areas of the pad electrodes 27 are arranged so as to be crossed by a line U (part (h) of FIG. 13) inclined by an angle which is 60 degrees or more, further preferably 70 degrees or more, and even further preferably 75 degrees or more with respect to the extending direction of the guide portion 29, as viewed in the direction perpendicular to the surfaces of the pad electrodes 27. Moreover, it is preferred that the angle is 85 degrees or less (with an inclination of 85 degrees or less) with respect to the extending direction of the guide portion 29.

It is preferred that a portion of the guide portion 29 on the side of the second portion 20*b* is disposed at a position of 35 mm or more and 60 mm or less away from the first portion 20*a*, as measured in a direction parallel to the direction from the first portion 20*a* to the second portion 20*b* of the ink cartridge 20. In addition, it is further preferable that it is disposed at a position of 45 mm or more and 50 mm or less away from the first portion 20*a*. The portion of the guide portion 29 on the side of the second portion 20*b* is the end portion on the side opposite to the opening 29*a* of the guide portion 29 when the opening 29*a* side of the guide portion 29 is deemed as the starting point of the guide portion 29. In addition, when the opening 29*a* is oriented, the position of the portion on the side of the first portion 20*a* of the guide portion 29 is the same as the position of the opening 29*a*. The opening 29*a* is separated from the first portion 20*a* by the length of the small diameter portion. That is, it is preferred that the portion of the guide portion 29 on the side of the first portion 20*a* is disposed at a position of 20 mm or more and 30 mm or less away from the first portion 20*a*, as measured in a direction parallel to the direction from the first portion 20*a* to the second portion 20*b* of the ink cartridge 20.

It is preferred that the position of the center of gravity of the guide portion rib 29*b* is disposed at a position of 40 mm or more and 50 mm or less from the first portion 20*a* in a direction parallel to the direction from the first portion 20*a* to the second portion 20*b* of the ink cartridge 20.

The shape of the guide portion is not limited to the shape shown in FIG. 14. For example, as shown in part (b) of FIG. 17, it may have steps, that is, the stair shaped guide portion 40.

In addition, the guide portion 29 need not be a groove, and it may be a projection guide portion 41 including a projection shape as shown in part (c) of FIG. 17. The projection guide portion 41 shown in part (c) of FIG. 17 is a guide portion has a shape of a lock pin projecting from the third portion 20*c* of the ink cartridge. In this case, the guide portion on the mounting portion side has, for example, a groove shape, and the projection guide portion 41 of the ink cartridge is inserted into the groove shaped guide portion on the mounting portion side, and the ink cartridge 20 can be rotated along the guide portion on the mounting portion side. This mounting is shown in Parts (a)-(d) of FIG. 19. In Parts (a)-(d) of FIG. 19, the groove-shaped guide portion 42 on the mounting portion side is indicated by a dotted line. First, as shown in part (a) of FIG. 19, the ink cartridge is inserted in the inserting direction until the position where the projection guide portion (lock pin) 41 on the ink cartridge side fits in the groove-shaped guide portion 42 on the mounting portion side as shown in part (a). Thereafter, the ink cartridge is rotated as shown in parts (b) to (d) of FIG. 19, and the mounting of the ink cartridge is completed.

Regarding the above-described depth, position, and extending direction of the guide portion 29, the same applies to the second guide portion 38. In addition, it is preferred that the guide portion 29 and the second guide portion 38 have symmetrical shapes with respect to each other.

Embodiment 5

In Embodiment 5, a gap (space) is provided below the pad electrode. The ink cartridge in Embodiment 5 is shown in Parts (a)-(d) of FIG. 20.

Part (a) of FIG. 20 is a general arrangement of the ink cartridge. The ink cartridge 20 shown in part (a) of FIG. 20 has the electrode portion 26 on the projecting portion 25. The electrode portion 26 has a plurality of pad electrodes 27. Up to this point, the structure is as explained in the previous embodiments, but in Embodiment 5, the projecting portion 25 is partially hollowed out, so that the projecting portion 25 has the gap (space) 32. The gap (space) 32 is provided below the pad electrode 27. Below the pad electrode 27 is based on a direction from the pad electrode 27 toward the center of gravity in a cross-section of the ink cartridge 20 taken along a direction perpendicular to the direction from the first portion 20*a* to the second portion 20*b* of the ink cartridge 20.

Part (b) of FIG. 20 is an enlarged view of the periphery of the electrode portion 26 of the ink cartridge shown in part (a) of FIG. 20, as seen from the side surface side of the ink cartridge 20. There is provided a gap (space) 32 below the pad electrode of the electrode portion 26. The gap (space) 32 opens toward the insertion portion 24 (the first portion 20*a*) side of the projecting portion 25. There is no opening of the gap (space) 32 on the side of the second portion 20*b* of the projecting portion 25 (cantilevered configuration, in this example). The gap 32 is a space formed by the wall of the projecting portion 25 and is surrounded by the wall of the projecting portion 25 except a part thereof. A part of the projection 25 not surrounded by the wall is the opening of the gap (space) 32.

Part (c) of FIG. 20 is a view of the periphery of the electrode portion 26 of the ink cartridge shown in part (a) of FIG. 20 as viewed from the first surface 20*a* (and the insertion portion 24) side.

Part (d) of FIG. 20 is a cross-sectional view of the ink cartridge taken along line A-A' of part (c) of FIG. 20, and is a view of the cross-section of the ink cartridge as seen from above the projecting portion 25. Part (d) of FIG. 20 shows a state in which the projecting portion 25 is cut, and the space surrounded by the projecting portion 25 is the gap (space) 32. The projecting portion 25 covers the space above the gap (space) 32, and the electrode portion and the pad electrode are provided on a table (tray) provided at the top thereof.

A supporting member (not shown in Parts (a)-(d) of FIG. 20) of the mounting portion is inserted into the gap (space) 32. By this, the pad electrode 27 on the gap (space) 32 is supported on the support member at the lower side, and therefore, downward movement is restricted. In particular, the pad electrode 27 is pushed from above by the electric connecting portion such as the connector pin, which is supported on the support member at the bottom, and therefore, the pad electrodes 27 is sandwiched in the vertical direction, and the damage to the pad electrode 27 can be suppressed. In addition, the position of the pad electrodes 27 can be stabilized and satisfactory connection can be assured. The sandwiching of the pad electrodes 27 can be effected by the electric connecting portion and the surface opposite to the side contacting the electric connecting portion of the ink cartridge. That is, in the case of FIG. 20, the entire small-diameter portion of the ink cartridge can be sandwiched in the vertical direction of part (c) of FIG. 20. It is preferred that a gap (space) 32 is provided under the pad electrodes 27, and the pad electrodes 27 are sandwiched between the electrical connecting portion and the support member inserted in the gap (space) 32. By using the electrical connecting portion and the support member inserted in the gap (space) 32, the pad electrode 27 can be sandwiched in a closer position, and therefore, the relative position between the pad electrode 27 and the electrical connecting portion is more stable. When sandwiching the pad electrodes 27 by sandwiching the entire small diameter portion, it is not easy to stabilize the relative position between the pad electrodes 27 and the electric connecting portion because the diameter of the small diameter portion is large at the time of consideration of the sandwiching of the pad electrodes 27.

For example, a part of the hole forming member 14*b* can be used as the supporting member of the mounting portion. As shown in part (a) of FIG. 4, when the hole forming member 14*b* covers the electric connecting portion 22, the hole forming member 14*b* covering the electric connecting portion 22 is used as a supporting member, and this supporting member is inserted into the gap (space) 32 of the ink cartridge.

Referring to FIG. 21 and Parts (a)-(d) of FIG. 22, the state of mounting the ink cartridge in Embodiment 5 will be described. FIG. 21 is a view of the hole forming member 14*b* of the mounting portion of the recording apparatus as viewed from the side opposite to the side where the ink cartridge is inserted. A part of the hole forming member 14*b* is a projecting plate-shaped wall portion 14*e*. The wall portion 14*e* which is a part of the hole forming member 14*b* functions as the above-mentioned supporting member. Above the hole forming member 14*b*, the electrical connecting portion peripheral portion 23 including the electrical connecting portion 22 constituted by the connector pins is disposed. Here, in FIG. 21, the positioning wall is omitted and not shown, for better illustration.

Part (a)-(d) of FIG. 22 shows the process of mounting the ink cartridge in the hole forming member 14*b* of FIG. 21. The ink cartridge 20 gradually rotates from the state shown in part (a) of FIG. 22. And, from the state of part (c) of FIG. 22 to the state of part (d) of FIG. 20, the wall portion 14*e* as the support member is inserted into the space 32 under the pad electrode 27.

Parts (a)-(c) of FIG. 23 schematically shows the state of mounting the ink cartridge described with reference to Parts (a)-(d) of FIG. 22. As the ink cartridge 20 is rotated from the state shown in part (a) of FIG. 23, the wall portion 14*e* as the support member is inserted into the gap (space) 32 under the electrode portion 26 including the pad electrode from the state of part (b) of FIG. 23 to the state of part (c) of FIG. 23.

Referring to FIG. 24 and Parts (a)-(d) of FIG. 25, the state of mounting of the ink cartridge as viewed from above the mounting portion will be described. FIG. 24 is a view illustrating the mounting portion. The parts (a)-(d) of FIG. 25 show the mounting process in the cross-section taken along line A-A' of FIG. 24. As shown in parts (a) to (d) of FIG. 25, the electrode portion 26 including the pad electrodes 27 enters between the electric connecting portion 22 and the wall portion 14*e*, and the wall portion 14*e* as the supporting member is inserted into the gap (space) 32 below the electrode portion 26 including the pad electrode 27. In addition, during this period, the pad electrode 27 is moved to a position where it is sandwiched between the positioning walls 23*a*, 23*b*.

In addition to stabilizing the positional relationship between the electrical connecting portion 22 and the pad electrode 27, the gap (space) 32 can also perform another function. For example, heat may be produced at the electrical contact point between the electrical connecting portion 22 and the pad electrode 27. In order to stabilize the supply of ink, it is preferred that this heat does not affect the ink receiving tube 21 and the insertion portion 24. The gap (space) 32 provided under the pad electrode 27 can serve as a heat radiation member. That is, the heat generated at the electrical contact point can escape to the outside through the gap (space) 32.

On the other hand, when the ink cartridge 20 is formed of a member with high heat conductivity, the gap (space) 32 functions as a heat insulating member on the contrary, so that the heat generated at the electrical contact point is not easily transferred onto the ink receiving tube 21 and the insertion portion 24.

The gap (space) 32 may not be provided under all the pad electrodes 27 of the plurality of pad electrodes 27. For example, the space 32 may not be provided at some portion below the pad electrodes 27. Or, in a part of a certain pad electrode 27, the space 32 may not be provided therebelow. It is preferred that the part constituting the outer periphery of the gap (space) 32 has a maximum length of one side of 10 mm or more and 15 mm or less. The part constituting the outer periphery of the gap (space) 32 includes lines constituting the outer periphery of the gap (space) 32 when the gap (space) 32 is viewed from the side (upper side) opposed to the pad electrode 27. That is, it is preferred that among the lines constituting the outer periphery of the gap (space) 32 as viewed in the direction shown in part (d) of FIG. 20, the maximum length of the straight side is 10 mm or more and 15 mm or less.

It is preferred that the height of the gap (space) 32 is 1 mm or more and 5 mm or less. The height of the gap (space) 32 is further preferably 2 mm or more. In addition, it is preferably 3 mm or less. Here, the height of the gap (space) 32 is the height in the vertical direction from the surface of the third surface 20*c*, and the height in the vertical direction of the gap (space) 32 in part (b) of FIG. 7 and part (c) of FIG. 23. If there are parts with different heights in the gap (space) 32, it is the average value of the heights at 100 points randomly distributed in the gap (space) 32.

In addition, the gap (space) 32 may have a shape in which the lower part of the gap (space) 32 is open. That is, there may be a space below the pad electrode, and the structural members of the ink cartridge do not exist under the space.

The gap (space) 32 may have a space as an ink cartridge in a state where the ink cartridge is mounted on the mounting portion. For example, before mounting in the mounting portion, the gap (space) 32 may be filled with a certain member and a void may be formed by retracting the member in the process of mounting, and in such a case, the ink cartridge is regarded as including a gap (space) in a mounted state in which the member is in the retracted state. In addition, as described above, even when a support member which is a member other than the ink cartridge is inserted into the gap (space) and the gap (space) is filled, the ink cartridge has the gap (space). The gap (space) 32 can also be referred to as a recess portion of the ink cartridge.

Referring to FIG. 39, the position of the gap (space) 32 and the pad electrodes 27 and so on will be described. FIG. 39 is an enlarged view of the first portion side 20*a* of the ink cartridge. In the first portion 20*a*, the insertion portion (ink discharging portion) 24 is provided. In FIG. 39, it seems that the insertion portion 24 is provided at a position retracted from the position indicated by the first portion 20*a*, but this is because the insertion portion 24 is located slightly backward, as shown in part (a) of FIG. 20, for example. The axis of the ink cartridge 20 extending with the shortest distance from the insertion portion 24 to the second portion (here, the axis extending along the longitudinal direction and perpendicular to the first portion 20*a*) is defined as an axis A. It is preferred that the length in the direction perpendicular to the third surface 20*c* from the axis A to the pad electrode 27 (the length indicated by B in FIG. 39, hereinafter the length B) is 15 mm or more and 20 mm or less. Further preferably, it is 16 mm or more and 18 mm or less. By selecting the length B within this range, the mounting of the ink cartridge is stabilized. Here, in the case that the gap (space) 32 is provided, the height of the gap (space) 32 is included in the length B.

Also, similarly from the standpoint of mounting ink cartridges, it is preferred that the linear distance (the length of a portion indicated by a dotted line in FIG. 39) from the insertion portion 24 to the pad electrode 27 is 15 mm or more and 25 mm or less. It is preferred that all of the pad electrodes 27 are provided at positions falling within this range. Here, this linear distance is the length of the shortest straight line connecting the center of the insertion portion 24 with the position closest to the center of the insertion portion 24 of the pad electrode 27. In addition, it is preferred that there are a plurality of pad electrodes 27, among which the difference in linear distance from the insertion portion 24 between the pad electrode near the center of the insertion portion 24 and the pad electrode most remote from the insertion portion 24 is 2 mm or more and 4 mm or less. For the numerical values explained in FIG. 39, if any area of the pad electrode 27 satisfy the, the effect is satisfactorily provided. In particular, the center of gravity of the pad electrode 27 and the electrical contact point preferably satisfy these numerical values in order to provide the effect.

Embodiment 6

Heretofore, a circular cylindrical ink cartridge has been illustrated and described. However, as described above, the shape of the ink cartridge is not limited to a circular cylindrical shape. For example, as shown in part (a) of FIG. 26, a quadrangular prism shaped ink cartridge may be used.

Referring to Parts (a)-(c) of FIG. 26, a process of mounting an ink cartridge including a quadrangular prism shape to a mounting portion (not shown in Parts (a)-(c) of FIG. 26) will be described.

First, the ink cartridge is inserted straight along the inserting direction with the first portion 20*a* at the leading side. This state is shown in part (a) of FIG. 26. And, as shown in part (b) of FIG. 26 and part (c) of FIG. 26, the ink cartridge 20 is rotated in the same manner as explained in the previous embodiments. Due to this rotation, the pad electrodes 27 of the electrode portion 26 move in the different direction with respect to the inserting direction of the ink cartridge 20. And, the pad electrode 27 comes into contact with the electrical connecting portion of the mounting portion and is electrically connected thereto.

Here, the ink cartridge 20 may have a polygonal column shape other than a quadrangular prism, a conical shape, or a polygonal pyramid shape.

Embodiment 7

In Embodiment 7, the portion of the ink cartridge on the side of the first portion 20*a*, that is, the tip portion, rotates independently of the casing. Parts (a)-(d) of FIG. 27 shows an example of how such an ink cartridges is mounted on ink cartridge mounting portion. Here, in Parts (a)-(d) of FIG. 27, the mounting portion is omitted for better illustration.

Part (a) of FIG. 27 is a view illustrating an ink cartridge before being mounted on the mounting portion. The ink cartridge 20 includes the insertion portion 24 in the front first portion 20*a*. The ink cartridge 20 is inserted in the inserting direction into the hole formed by the hole forming member of the mounting portion as shown above with the first portion 20*a* at the leading side. At the initial stage of insertion, the ink cartridge 20 is inserted into the hole of the hole forming member while maintaining the state shown in part (a) of FIG. 27.

Next, from the point of time when the ink cartridge 20 is inserted to some extent, the tip of the ink cartridge starts to rotate as shown in part (b) of FIG. 27. This rotation can be carried out using the lock pin and the guide portion described above, for example. In addition, for example, a member capable of rotating the tip portion may be provided in the ink cartridge 20, and the tip portion may be rotated by manually rotating this member by the user.

Further, the rotation continues 27 by the way of the state shown in part (c) of FIG. 27 until finally reaching the state shown in part (d) of FIG. 27. The casing does not rotate and may be fixed during this rotating operation. Or, the casing does not rotate, and it may just be inserted in the inserting direction. On the other hand, since the tip portion rotates, the pad electrodes 27 provided at the tip portion rotate in the same way as the tip portion. That is, when looking at the ink cartridge as a whole, the pad electrode 27 moves in a moving direction different from the inserting direction (here, the inserting direction of the casing) with the first portion 20*a* at the leading side. This movement allows the pad electrodes 27 to connect with the electrical connecting portion.

Here, in Parts (a)-(d) of FIG. 27, the casing of the ink cartridge 20 is formed into a quadrangular prism shape, and the tip portion has likewise a quadrangular prism shape. The shape of the ink cartridge 20 is not limited to this, and it may be, for example, a circular cylindrical shape or a triangular prism shape as described above, or a tip portion. In addition, the combination of the shapes of the casing and the tip portion is also not particularly limited, and combinations of shapes different from each other may be used, for example, the casing has a columnar shape and the tip portion has a quadrangular prism shape.

Embodiment 8

In this embodiment, the rotation of the ink cartridge is carried out by using a grip portion provided on the ink cartridge (Parts (a)-(c) of FIG. 28). In Parts (a)-(c) of FIG. 28, a part of the structure of the mounting portion is omitted, for better illustration.

First, the ink cartridge 20 including a gripping portion 33 is prepared. This ink cartridge 20 is inserted along the inserting direction into the hole of the hole forming member of the mounting portion up to the state as shown in part (a) of FIG. 28.

Next, the user grips the grip portion 33, or a member of the recording device grips the gripping portion 33 and rotates the ink cartridge 20. As described above, as shown in part (b) of FIG. 28 and part (c) of FIG. 28, the pad electrodes 27 of the electrode portion 26 is electrically connected to the electrical connecting portion by rotating the ink cartridge 20. Here, even when inserting the ink cartridge 20 along the inserting direction, the ink cartridge 20 may be inserted using the grip portion 33.

Also when the ink cartridge 20 is rotated using the grip portion 33, it may be rotated using the positioning wall and the guide portion described above, or may be rotated without using them. When these members are not used, a mark is provided on the ink cartridge 20, and with this mark as index, the user can grip the grip portion 33 and start the rotation of the ink cartridge 20.

It is preferred that the grip portion 33 is provided on a portion of the ink cartridge 20 opposite to the side including the insertion portion 24, that is, on a side closer to the second portion 20*b* than the first portion 20*a*. In addition, it is preferable to provide it in the third portion 20*c*, and the recess portion is formed by partially recessing the third portion 20*c*, and the recess portion can serve as the grip portion 33 as shown in Parts (a)-(c) of FIG. 28, for example.

It is preferred that two gripping portions 33 are provided on the ink cartridges 20 at positions facing to each other. Or, the diameter of the second portion 20*b* side of the ink cartridge 20 may be reduced over the entire circumference, and the reduced portion may be used as the grip portion. It is preferred that the depth of the grip portion 33 is 5 mm or more and 15 mm or less. Further preferably, it is 6 mm or more, 13 mm or less.

In addition, it is preferred that the portion of the gripping portion 33 on the side of the first portion 20*a* is disposed at a position of 190 mm or more and 210 mm or less away from the first portion 20*a*, as measured in a direction parallel to the direction from the first portion 20*a* to the second portion 20*b* of the ink cartridge 20. On the other hand, it is preferred that the portion of the grip portion 33 on the side of the second portion 20*b* is disposed at a position of 200 mm or more and 250 mm or less away from the first portion 20*a*, as measured in a direction parallel to the direction from the first portion 20*a* toward the second portion 20*b* of the ink cartridge 20. In addition, it is further preferably disposed at a position of 230 mm or more and 240 mm or less away from the first portion 20*a*. In the case that the grip portion 33 is formed to the same position as the second portion 20*b*, it is the length from the first portion 20*a* on the second portion 20*b* side of the gripping portion 33 to the position where it is provided as measured in the direction from the first portion 20*a* toward the second portion 20*b*. Here, in Parts (a)-(c) of FIG. 28, the direction from the first portion 20*a* toward the second portion 20*b* of the ink cartridge 20 is the same as the longitudinal direction of the ink cartridge 20.

Here, in the examples so far, by rotating the ink cartridge 20, the pad electrodes 27 move in the direction different from the inserting direction of the ink cartridge 20, but the present invention is not limited to such an example. For example, even if the ink cartridge 20 is not rotated, the pad electrodes 27 moves in a direction different from the inserting direction of the ink cartridge 20, so that the pad electrode 27 and the electric connecting portion can be satisfactorily connected with each other.

Embodiment 9

In the first to Embodiment 8s, an ink cartridge that stores ink is used as the member that can be mounted (mountable) on the mounting portion. In Embodiment 9, a member that does not store ink is used as the member that can be mounted (mountable) to the mounting portion. Here, the description having been made about ink cartridges so far can be applied to the members which do not store the ink in the same way except for the description peculiar to ink cartridge.

FIG. 29 shows a member 34 as an example of the member not containing ink. The member 34 shown in FIG. 29 corresponds to the portion including the small diameter portion of the ink cartridge 20 shown in Parts (a)-(d) of FIG. 6. In addition, it corresponds to the portion including the cover member 78 shown in Parts (a) and (b) of FIG. 7. The member 34 shown in FIG. 29 does not contain ink therein.

The basic structure of the member 34 is the same as the structure described with reference to Embodiment 1, especially Parts (a)-(d) of FIG. 6. The member 34 has at least a first portion 34*a*, a second portion 34*b*, and a third portion 34*c* as a portion facing outwardly of the member 34. The part on the side where the insertion portion 24 is provided is the first portion 34*a*. The part opposite to the first portion 34*a* is the second portion 34*b*. And, the first portion 34*a* and the second portion 34*b* are connected by the third portion 34*c*. The first portion 34*a* and the second portion 34*b* are the ends of the member 34 and may be referred to as a first end portion and a second end portion, respectively. The third portion 34*c* is between the first portion 34*a* and the second portion 34*b*, and in FIG. 29, the third portion 34*c* is perpendicular to the first portion 34*a* and the second portion 34*b* (extending in orthogonal directions). Each of the first portion 34*a*, the second portion 34*b*, and the third portion 34*c* may be surfaces, respectively. Or, the first portion 34*a*, the second portion 34*b*, and the third portion 34*c* may not be surfaces. For example, when the member 34 has a triangular pyramid shape, the first portion 34*a* may be the bottom surface of the triangular pyramid and the third portion 34*c* may be the apex above the bottom surface of the triangular pyramid. Here, the portion facing outwardly of the member 34 means the portion facing away from the center of the member 34.

The first portion 34*a* is a portion in front of the member 34, and in FIG. 29, it is a surface. The first portion 34*a* is provided with an insertion portion 24 into which the ink receiving tube 21 shown in FIG. 3 or the like is inserted. The insertion portion 24 may be provided with a seal member having an opening. When the seal member is provided, the ink receiving tube is inserted into the opening of the seal member of the insertion portion 24.

The member 34 has a large diameter portion having a relatively large diameter and a small diameter portion having a diameter relatively smaller than that of the large diameter portion. The part of the small diameter portion on the side where the insertion portion 24 is provided is the first portion 34*a*. The second portion 34*b* is provided in the large diameter portion. The third portion 34*c* connecting the first portion 34*a* and the second portion 34*b* is a surface extending between the large diameter portion and the small diameter portion and including a step between the large diameter portion and the small diameter portion.

The third portion 34*c* is provided with a projection 25 and an ID projection 28. In FIG. 29, the projecting portion 25 projects from a portion of the small diameter portion of the third portion 34*c*. On the other hand, the ID projecting portion 28 projects from a portion of the large diameter portion of the third portion 34*c*.

The projecting portion 25 has a roof surface 25*a* serving as the roof of the projecting portion and a projecting portion side surface 25*b*. The projecting portion side surface 25*b* has four surfaces, which are connected by the roof surface 25*a* at the upper side. Above the roof surface 25*a*, the electrode portions 26 in the form of a chip is provided. The electrode portion 26 is provided with a plurality of pad electrodes 27 which are to be in contact with the electrical connection portion of the recording apparatus (mounting portion) so as to be electrically connected to the electrical connecting portion.

The roof surface 25*a* is a portion facing the outside of the member 34 and is a part of a portion connecting the first portion 34*a* and the second portion 34*b* and therefore is a part of the third portion 34*c*. That is, it can be said that the electrode portion 26 and the plurality of pad electrodes 27 are provided on the third portion 34*c*.

The electrode portion 26 may be constituted only by the pad electrodes 27. In this case, the pad electrodes 27 are disposed directly on the roof surface 25*a* of the projecting portion 25. Here, in FIG. 29, the positions of the centers of gravity of the electrodes of the plurality of pad electrodes 27 are arranged on the roof surface 25*a* of the projecting portion 25 in a direction perpendicular to the direction from the first portion 34*a* toward the second portion 34*b* of the member 34. Each pad electrode 27 has a rectangular shape.

Parts (a)-(c) of FIG. 30 show how the member 34 is mounted on the mounting portion. Basically, it is the same as described in conjunction with Parts (a)-(e) of FIG. 8 and Parts (a)-(d) of FIG. 9. The ink receiving tube is inserted into the insertion portion 24, but no ink is stored inside the member 34, and therefore, merely by mounting the member 34 to the mounting portion, the ink is not supplied to the ink receiving tube. The insertion portion 24 may be a part into which the ink receiving tube is inserted. In the case that it is difficult to mount the member 34 in the hole of the hole forming member due to the space problem, when mounting the member 34 on the mounting portion, the member 34 can be gripped by a gripping member (not shown) and the member 34 can be rotated by using the gripping member outside the hole of the hole forming member, for example.

Also in mounting the member 34, the member 34 is inserted along the inserting direction with the first portion 34*a* at the driving side until reaching part (a) of FIG. 30. And, as shown in part (b) of FIG. 30, part (c) of FIG. 30, the member 34 is rotated. In part (c) of FIG. 30, the pad electrode 27 of the member 34 comes into contact with the electrical connecting portion of the mounting portion, and the mounting of the member 34 is completed. In the mounting as shown in Parts (a)-(c) of FIG. 30, the moving direction of the pad electrode 27 is different from the inserting direction of the member 34.

Embodiment 10

In the member 34 described in Embodiment 9, the electrical connecting portion 22 of the mounting portion contacts the center of gravity of each pad electrode 27 of the plurality of pad electrodes 27, and the pad electrode 27 is electrically connected to the electrical connecting portion 22, as explained in the case of the ink cartridge. In this example, considering the point where the electrical connecting portion 22 and the pad electrode 27 are in contact, that is, the electrical contact points of the pad electrodes 27 are arranged in a direction parallel to the moving direction of the pad electrode 27.

In contrast, in Embodiment 10, the electrical contact points of the pad electrodes 27 are arranged in a direction crossing the moving direction of the pad electrode 27. That is, the direction in which the electrical contact points of the pad electrode 27 are arranged is a direction not parallel to the moving direction of the pad electrodes 27. Here, the crossing direction includes the directions perpendicular to each other.

Parts (a) to (c) of FIG. 31 show the process of mounting such a member 34 to the mounting portion. Basically, it is the same as described in conjunction with Parts (a)-(d) of FIG. 11 and Parts (a)-(d) of FIG. 12, and the member 34 shown in part (a) of FIG. 31 is screw-rotated to provided the state shown in part (c) of FIG. 31. An example of arrangement of a plurality of pad electrodes 27 is also as shown in Parts (a)-(h) of FIG. 13.

In Embodiment 10, the electrical contact points of the plurality of pad electrodes 27 are arranged in a direction crossing the moving direction of the pad electrodes 27. The electrical contact points of the pad electrodes 27 are preferably arranged at an angle of 60 degrees or more with respect to the direction of movement of the pad electrode 27, further preferably it is inclined by degrees or more, even further preferably is inclined by 80 degrees. Moreover, it is preferred that the electrical contact points of the pad electrodes 27 are arranged in a direction perpendicular to the moving direction of the pad electrode 27 (in the vertical direction, the angle formed by the two directions is 90 degrees). The angle at which two directions cross is a small angle among the four corners formed by the two directions. Therefore, the angle at which two directions cross is at most 90 degrees (at this time, the two directions are orthogonal). The moving direction of the pad electrode in Embodiment 10 is a direction in which an approximate straight line (approximate straight line) extends in the same manner as described in Embodiment 3.

It can also be considered that the electrical contact points of the pad electrodes 27 are replaced with the areas of the pad electrodes 27. The direction in which the electrical contact points are arranged may be considered not in relation with the moving direction of the pad electrode 27, but in relation with the direction from the first portion 34*a* toward the second portion 34*b* of the member 34 or the inserting direction of the member 34 into the hole forming member. Also with these structures, it is possible to accomplish satisfactory contact between the pad electrodes 27 and the electrical connecting portion 22.

In addition, it is preferred that the plurality of pad electrodes 27 have the areas arranged in a direction crossing with the moving direction of the pad electrodes 27, that is, the areas are arranged so as to be crossed by a line U (part (h) of FIG. 13) inclined with respect to the direction of the arrangement of the pad electrodes 27, as viewed in the direction perpendicular to the surfaces of the pad electrodes 27. The plurality of pad electrodes 27 preferably have the areas are arranged in a direction inclined with respect to the moving direction of the pad electrode 27 by 60 degrees or more, further preferably 70 degrees or more, and even further preferably by 80 degrees, that is, the areas are arranged so as to be crossed by a line inclined by an angle of 60 degrees or more, further preferably have by 70 degrees or more, even further preferably 80 degrees or more with respect to the moving direction of the pad electrode 27. The plurality of pad electrodes 27 preferably have the areas in the direction perpendicular to the moving direction of the pad electrodes 27 (in a vertical direction, the angle formed by the two directions is 90 degrees), that is, the areas are arranged so as to be crossed by a line perpendicular to the moving direction of the pad electrodes 27. Here, when the moving direction of the pad electrode is curved or screw shape, it can be considered as the direction in which the moving direction of the pad electrode extends the approximate straight line as described above.

In addition, it is preferred that the plurality of pad electrodes 27 have the areas arranged in the direction crossing the direction from the first portion 34*a* toward the second portion 34*b* of the member 34, that is, the area are arranged so as to be crossed by a line U (similarly to part (h) of FIG. 13) inclined with respect to the direction from the first portion 34*a* toward the second portion 34*b* of the ink cartridge 34, as viewed in the direction perpendicular to the surfaces of the pad electrodes 27. In addition, it is preferred that the plurality of pad electrodes 27 have the areas arranged in the direction inclined with respect to the direction from the first portion 34*a* toward the second portion 34*b* of the member 34 by 10 degrees or more and 60 degrees or less, that this, the areas are arranged so as to be crossed by a line U (similarly to part (h) of FIG. 13) inclined by an angle (γ) which is 10 degrees or more (β) and 60 degrees or less (α), with respect to the direction (W) from the first portion 34*a* toward the second portion 34*b* of the member 34, as viewed in the direction perpendicular to the surfaces of the pad electrodes 27. As to the case in which the angle formed between the line (U) and the direction (W) from the first portion 34*a* toward the second portion 34*b* of the member 34 is the largest as viewed in the direction perpendicular to the surfaces of the pad electrodes 27, as indicated by line T (in part (h) of FIG. 13) is the largest, the angle (α) formed between the direction (W) and the line T is preferably 40 degrees or more and 60 degrees or less. On the other hand, as to the case in which the angle formed between the line (U) and the direction (W) from the first portion 34*a* toward the second portion 34*b* of the member 34 is the largest as viewed in the direction perpendicular to the surfaces of the pad electrodes 27, as indicated by line T (in part (h) of FIG. 13) is the smallest, the angle (α) formed between the direction (W) and the line T is preferably 10 degrees or more and 20 degrees or less. The direction from the first portion 34*a* to the second portion 34*b* of the member 34 can also be considered as the longitudinal direction of the member 34.

In addition, it is preferred that the direction in which the areas of the pad electrodes 27 of the plurality of pad electrodes 27 are arranged crosses the inserting direction of the member 34. In addition, it is preferred that the plurality of pad electrodes 27 have the areas arranged in a direction inclined relative to the inserting direction of the member 34 by an angle of 10 degrees or more and 60 degrees or less, that is, the areas are arranged so as to be crossed by a line U (similarly to part (h) of FIG. 13) inclined by an angle (γ) which is 10 degrees or more (β) and 60 degrees or less (α), with respect to the inserting direction of the member 34, as viewed in the direction perpendicular to the surfaces of the pad electrodes 27. As to the case in which the angle formed between the line (U) and the inserting direction of the member 34 is the largest as viewed in the direction perpendicular to the surfaces of the pad electrodes 27, as indicated by line T (in part (h) of FIG. 13) is the largest, the angle (α) formed between the inserting direction and the line T is preferably 40 degrees or more and 60 degrees or less. On the other hand, as to the case in which the angle formed between the line (U) and the inserting direction of the member 34 is the largest as viewed in the direction perpendicular to the surfaces of the pad electrodes 27, as indicated by line T in part (h) of FIG. 13 is the smallest, the angle (α) formed between the inserting direction and the line T is preferably 10 degrees or more and 20 degrees or less.

In addition, it is preferred that the direction in which the electrical contact points of the pad electrodes 27 are arranged crosses the longitudinal direction of the member 34. It is preferred that the direction in which the electrical contact points of the pad electrodes 27 are arranged is inclined by 20 degrees or more and 40 degrees or less with respect to the longitudinal direction of the member 34. Further, it is further preferable that it is inclined by 30 degrees or more and 35 degrees or less.

In addition, it is preferred that the direction in which the electrical contact points of the pad electrodes 27 are arranged process the direction from the first portion 34*a* to the second portion 34*b* of the member 34. It is preferred that the direction in which the electrical contact points of the respective pad electrodes 27 are arranged is inclined by 20 degrees or more and 40 degrees or less with respect to the direction from the first portion 34*a* toward the second portion 34*b* of the member 34. Further, it is further preferable that it is inclined by 30 degrees or more and 35 degrees or less. Here, the direction from the first portion 34*a* to the second portion 34*b* is the same as the longitudinal direction and the inserting direction of the member 34 in Embodiment 10.

In addition, it is preferred that the direction in which the electrical contact points of the pad electrodes 27 are arranged process the inserting direction of the member 34. It is preferred that the direction in which the electrical contact points of pad electrode 27 are arranged is inclined by 20 degrees or more and 40 degrees or less with respect to the inserting direction of the member 34. Further, it is further preferable that it is inclined by 30 degrees or more and 35 degrees or less.

Here, it is preferred that similarly to the ink cartridge in Embodiment 5, the member 34 shown in Embodiment 10 also is provided with a gap (space) below the pad electrode.

Embodiment 11

In Embodiment 9 and Embodiment 10, the member 34 mounted to the mounting portion can be used for various purposes, but it is also possible to use the member as a part of the ink cartridge or with the ink cartridge.

FIG. 32 shows an example in which the member 34 is used as a part of the ink cartridge. In FIG. 32, an ink cartridge member 35 including an ink storing portion in which ink is stored is mounted to the member 34. With this structure, the member 34 described in Embodiment 9 and Embodiment 10 is first mounted to the mounting portion of the recording apparatus. And, after mounting the member 34, the ink cartridge member 35 is mounted to the member 34. The ink cartridge member 35 contains ink to be supplied to the recording head inside, and has a supply opening 35*a* for supplying the stored ink to the recording apparatus. When the ink cartridge member 35 is mounted to the member 34, the supply opening 35*a* of the ink cartridge member 35 is disposed at the position of the insertion portion 24 (opening) of the member 34. And, the ink receiving tube of the recording device is inserted into the insertion portion 24 of the member 34 and the supply opening 35*a* of the ink cartridge member 35. By this, the ink stored in the ink cartridge member 35 can be supplied to the recording head through the ink receiving tube.

Parts (a)-(d) of FIG. 33 schematically shows a structure in which the ink cartridge member 35 is further mounted after the member 34 is mounted on the mounting portion. In part (a) of FIG. 33, the member 34 is shown in a state of being seen from the outside, and in the parts (b) to (d) of FIG. 33, the inside of the member 34 is shown. For the first place, the member 34 is mounted to the mounting portion as shown in part (a) of FIG. 33 and part (b) of FIG. 33. This mounting is as explained in the foregoing. Subsequently, as shown in part (c) of FIG. 33 and part (d) of FIG. 33, the ink cartridge member 35 is mounted to the member 34 and the mounting portion. As shown in part (d) of FIG. 33, the supply opening 35*a* of the ink cartridge member 35 is disposed at the position of the insertion portion 24 of the member 34.

An example in which a portion corresponding to a portion including a small diameter portion of the ink cartridge is used as the member 34 has been described. The member 34 may have a shape as shown in Parts (a)-(c) of FIG. 34. First, similarly to the cylindrical member 34 as shown in part (a) of FIG. 34, a cylindrical ink cartridge member 35 is prepared. A plurality of pad electrodes are provided on the member 34. And, after mounting the member 34 to the mounting portion, as shown in part (b) of FIG. 34 and part (c) of FIG. 34, the ink cartridge member 35 is mounted from behind.

Embodiment 12

In Embodiment 11, the structure in which the ink cartridge member 35 is directly connected to the member 34. In Embodiment 12, a tube connectable to the ink receiving tube is mounted (connected) to the member 34, and the end portion of the connected tube opposite to the ink receiving tube side is connected to the supply opening of the ink containing bottle 36.

An example of the structure of Embodiment 12 is shown in FIG. 35. In FIG. 35, the ink containing portion of the ink containing bottle 36 is in fluid communication with the ink receiving tube 21 by way of the tube 37. The tube 37 is connected to the ink receiving tube 21 by way of the insertion portion 24, and supplies the ink accommodated in the ink accommodating bottle 36 to the ink receiving tube 21.

In the case of the structure as shown in FIG. 35, the latitude in designing the ink containing bottle 36 is large, and the ink containing portion of the ink containing bottle 36 can be easily enlarged. Therefore, the capacity of the ink storage bottle 36 can be increased, and ink can be supplied from this large capacity ink storage bottle 36.

The mounting of the member 34 to the mounting portion and the like are the same as those described above.

Embodiment 13

As a structure of the electrode portion 26 of the member 34, a pattern as shown in Parts (a)-(d) of FIG. 36 can be considered. Parts (a)-(d) of FIG. 36 is an enlarged view of only the periphery of the electrode portion 26 of the member 34. In part (a) of FIG. 36, the electrode portion 26 and the pad electrode 27 are provided on the projecting portion 25, and this is the structure as explained above. In part (b) of FIG. 36, unlike part (a) of FIG. 36, the upper surface of the projecting portion 25 is an inclined surface, and the electrode portion 26 and the pad electrode 27 are provided on this inclined surface.

In the part (c) of FIG. 36, the member 34 does not have the projecting portion in which the electrode portion 26 and the pad electrodes 27 are arranged, and the electrode portion 26 and the pad electrode 27 are directly provided on the side surface of the member 34. Part (d) of FIG. 36 is an example in which the arrangement of the pad electrode 27 is different from the part (c) of FIG. 36.

Here, the structure example of the electrode portion 26 and the pad electrode 27 of the member 34 shown here can be similarly applied to the ink cartridge.

Embodiment 14

As an example different from the example shown in Embodiment 13 regarding the structure of the electrode portion 26 of the member 34 and the pad electrodes 27, there is a structure shown in Parts (a)-(d) of FIG. 37.

Parts (a) to (d) of FIG. 37 are illustrations of the periphery of the electrode portion 26 of the member 34 as viewed in four directions. In Parts (a)-(d) of FIG. 37, the pad electrode 27 projects from the electrode portion 26 on the projecting portion 25. In this case, the projecting portion 25 may not be provided, and the pad electrode 27 may project from the surface of the member 34.

Here, the structure example of the electrode portion 26 and the pad electrode 27 of the member 34 shown here can also be applied to the ink cartridge in the same manner.

Preferred Structure Example of the Present Invention

Finally, preferred structure examples disclosed in the present application can be summarized as follows. Here, the contents described in each structure example can be appropriately combined within a range without contradiction.

Structure Example A

Structure Example A-1

A member mountable to a mounting portion provided with an ink receiving tube and a plurality of electrical connecting portions, said member comprising:

- a first portion including an outwardly facing surface and provided with an inserting portion into which the ink receiving tube is capable of being inserted;
- a second portion opposite from said first portion;
- a third portion connecting said first portion and said second portion with each other and provided with a plurality of pad electrodes electrically connectable with said electrical connecting portions,
- wherein said member is mountable to the mounting portion by being inserted into said mounting portion in an inserting direction with said first portion at a leading side, and
- wherein said pad electrodes are electrically connectable with said electrical connecting portions by being moved in a direction different from the inserting direction.

Structure Example A-2

A member according to Structure Example A-1, wherein said pad electrodes include respective electrical contact points electrically connectable with the electrical connecting portions, and a direction in which electrical contact points are arranged crosses with a moving direction of said pad electrodes.

Structure Example A-3

A member according to Structure Example A-2, wherein a direction in which said electrical contact points are arranged is inclined by not less than 60° relative to a moving direction of said pad electrodes.

Structure Example A-4

A member according to Structure Example A-2, wherein a direction in which said electrical contact points are arranged is inclined by not less than 70° relative to a moving direction of said pad electrodes.

Structure Example A-5

A member according to Structure Example A-2, wherein a direction in which said electrical contact points are arranged is inclined by not less than 80° relative to a moving direction of said pad electrodes.

Structure Example A-6

A member according to Structure Example A-2, wherein a direction in which said electrical contact points are arranged crosses with a direction perpendicular to a moving direction of said pad electrodes.

Structure Example A-7

A member according to any one of Structure Examples A-1-A-6, wherein said pad electrodes include respective electrical contact points electrically connectable with the electrical connecting portions, and said electrical contact points are disposed at positions away from said first portion by not less than 5 mm and not more than 25 mm as measured in a direction parallel with the direction from said first portion toward said second portion.

Structure Example A-8

A member according to any one of Structure Examples A-1-A-6, wherein said pad electrodes include respective electrical contact points electrically connectable with the electrical connecting portions, and said electrical contact points are disposed at positions away from said first portion by not less than 10 mm and not more than 20 mm as measured in a direction parallel with the direction from said first portion toward said second portion.

Structure Example A-9

A member according to any one of Structure Examples A-1-A-8, wherein said pad electrodes include respective electrical contact points electrically connectable with the electrical connecting portions, and wherein one of electrical contact points that is closest to said first portion is disposed at a position away from said first portion by not less than 5 mm and not more than 15 mm as measured in a direction parallel with the direction from said first portion to said second portion.

Structure Example A-10

A member according to any one of Structure Examples A-1-A-8, wherein said pad electrodes include respective electrical contact points electrically connectable with the electrical connecting portions, and wherein one of electrical contact points that is closest to said first portion is disposed at a position away from said first portion by not less than 10 mm and not more than 11 mm as measured in a direction parallel with the direction from said first portion to said second portion.

Structure Example A-11

A member according to any one of Structure Examples A-1-A-10, wherein said pad electrodes include respective electrical contact points electrically connectable with the electrical connecting portions, and wherein one of said electrical contact points that is most remote from said first portion is disposed at a position away from said first portion by not less than 15 mm and not more than 25 mm as measured in a direction parallel with the direction from said first portion to said second portion.

Structure Example A-12

A member according to any one of Structure Examples A-1-A-10, wherein said pad electrodes include respective electrical contact points electrically connectable with the electrical connecting portions, and wherein one of said electrical contact points that is most remote from said first portion is disposed at a position away from said first portion by not less than 17 mm and not more than 18 mm as measured in a direction parallel with the direction from said first portion to said second portion.

Structure Example A-13

A member according to any one of Structure Examples A-1-A-12, wherein said pad electrodes include respective electrical contact points electrically connectable with the electrical connecting portions, and wherein a direction in which said electrical contact points are arranged crosses with a direction from said first portion toward said second portion.

Structure Example A-14

A member according to Structure Example A-13, wherein a direction in which said electrical contact points are arranged is inclined by not less than 20° and not more than 40° relative to a directional from said first portion toward said second portion.

Structure Example A-15

A member according to Structure Example A-13, wherein a direction in which said electrical contact points are arranged is inclined by not less than 30° and not more than 35° relative to a directional from said first portion toward said second portion.

Structure Example A-16

A member according to any one of Structure Example A-1-A-15, wherein said pad electrodes include respective electrical contact points electrically connectable with the electrical connecting portions, and wherein a direction in which said electrical contact points are arranged crosses with a longitudinal direction of said member.

Structure Example A-17

A member according to Structure Example A-16, wherein a direction in which said electrical contact points are arranged is inclined relative to a longitudinal direction of said member by not less than 20° and not more than 40°.

Structure Example A-18

A member according to Structure Example A-16, wherein a direction in which said electrical contact points are arranged is inclined relative to a longitudinal direction of said member by not less than 30° and not more than 35°.

Structure Example A-19

A member according to any one of Structure Examples A-1-A-18, wherein a direction in which said electrical contact points are arranged crosses with the inserting direction.

Structure Example A-20

A member according to Structure Example A-19, wherein a direction in which said electrical contact points are arranged is inclined relative to the crosses inserting direction by not less than 20° and not more than 40°.

Structure Example A-21

A member according to Structure Example A-19, wherein a direction in which said electrical contact points are arranged is inclined relative to the crosses inserting direction by not less than 30° and not more than 35°.

Structure Example A-22

A member according to any one of Structure Examples A-1-A-21, wherein the electrical connecting portions are provided in a recording device.

Structure Example A-23

A member according to any one of Structure Examples A-1-A-22, wherein said pad electrodes include respective electrical contact points electrically connectable with the electrical connecting portions, and all of said electrical contact points are gravity centers of the respective pad electrodes, respectively.

Structure Example A-24

A member according to any one of Structure Examples A-1-A-22, wherein said pad electrodes include respective electrical contact points electrically connectable with the electrical connecting portions, and in a part of said pad electrodes, said electrical contact points are gravity centers of the pad electrodes, and in the other part of said pad electrodes, said electrical contact points are not gravity centers of said pad electrodes.

Structure Example A-25

A member according to any one of Structure Examples A-1-A-24, wherein said pad electrodes include respective electrical contact points electrically connectable with the electrical connecting portions, and wherein each of said pad electrodes has a length from the electrical contact point is not less than 0.5 mm and not more than 4.0 mm.

Structure Example A-26

A member according to any one of Structure Examples A-1-A-25, wherein said third portion is provided with a guide portion configured to rotate said member.

Structure Example A-27

A member according to Structure Example A-26, wherein said pad electrodes include respective electrical contact points electrically connectable with the electrical connecting portion, and wherein said electrical contact points are arranged in a direction crossing with the direction in which said guide portion extends.

Structure Example A-28

A member according to Structure Example A-27, wherein the direction in which said electrical contact points are arranged is inclined relative to the direction in which said guide portion extends by not less than 60°.

Structure Example A-29

A member according to Structure Example A-27, wherein the direction in which said electrical contact points are arranged is inclined relative to the direction in which said guide portion extends by not less than 70°.

Structure Example A-30

A member according to Structure Example A-27, wherein the direction in which said electrical contact points are arranged is inclined relative to the direction in which said guide portion extends by not less than 75°.

Structure Example A-31

A member according to any one of Structure Examples A-26-A-30, wherein the direction in which said electrical contact points are arranged is inclined relative to the direction in which said guide portion extends by not more than 85°.

Structure Example A-32

A member according to any one of Structure Examples A-26-A-31, wherein said guide portion includes a groove.

Structure Example A-33

A member according to Structure Example A-32, wherein said groove has a screw-shape.

Structure Example A-34

A member according to Structure Example A-32 or A-33, wherein said guide portion has a depth of not less than 1.0 mm and not more than 5.0 mm.

Structure Example A-35

A member according to Structure Example A-32 or A-33, wherein said guide portion has a depth of not less than 2.0 mm and not more than 4.0 mm.

Structure Example A-36

A member according to any one of Structure Example A-32-A-35, further comprising a rib provided inside said guide portion.

Structure Example A-37

A member according to Structure Example A-36, wherein said rib has a height of not less than 1.5 mm and not more than 2.0 mm.

Structure Example A-38

A member according to Structure Example A-36 or A-37, wherein said rib has a height smaller than a depth of said guide portion.

Structure Example A-39

A member according to any one of Structure Examples A-32-A-38, wherein the mounting portion is provided with a locking pin which is capable of entering said guide portion to guide said member so as to rotate said member, wherein the mounting portion is provided with a locking pin which is capable of inserting into said guide portion to guide said member so as to rotate said member.

Structure Example A-40

A member according to any one of Structure Examples A-26-A-39, wherein said guide portion extends in a direction crossing with a direction from said first portion to said second portion.

Structure Example A-41

A member according to Structure Example A-40, wherein a direction in which said guide portion extends is inclined by not less than 50° and not more than 80° relative to a direction from said first portion to said second portion.

Structure Example A-42

A member according to Structure Example A-40, wherein a direction in which said guide portion extends is inclined by not less than 60° and not more than 70° relative to a direction from said first portion to said second portion.

Structure Example A-43

A member according to any one of Structure Examples A-26-A-42, wherein said second portion has a portion having a relatively large diameter, and said first portion has a portion having the relatively small diameter, and wherein said pad electrodes are provided on the portion having the relatively small diameter.

Structure Example A-44

A member according to any one of Structure Examples A-26-A-43, further comprising a second guide portion at a position opposed to said first mentioned guide portion.

Structure Example A-45

A member according to any one of Structure Examples A-26-A-44, wherein said pad electrodes have areas which are arranged so as to be crossed by a line inclined with respect to a direction in which said guide portion extends.

Structure Example A-46

A member according to Structure Example A-45, wherein said pad electrodes have areas which are arranged so as to be crossed by a line inclined by not less than 60° relative to a direction in which said guide portion extends.

Structure Example A-47

A member according to Structure Example A-45, wherein said pad electrodes have areas which are arranged so as to be crossed by a line inclined by not less than 70° relative to a direction in which said guide portion extends.

Structure Example A-48

A member according to Structure Example A-45, wherein said pad electrodes have areas which are arranged so as to be crossed by a line inclined by not less than 75° relative to a direction in which said guide portion extends.

Structure Example A-49

A member according to any one of Structure Examples A-45-A-48, wherein said pad electrodes have areas which are arranged so as to be crossed by a line inclined by not more than 85° with respect to a direction in which said guide portion extends.

Structure Example A-50

A member according to any one of Structure Examples A-1-A-49, wherein said second portion has a portion having a relatively large diameter, and said first portion has a portion having the relatively small diameter, and wherein said pad electrodes are provided on the portion having the relatively small diameter.

Structure Example A-51

A member according to Structure Example A-50, wherein said second portion has a portion having a relatively large diameter, and said first portion has a portion having the relatively small diameter, and wherein said pad electrodes are provided on and are bridged between the portion having the relatively small diameter and on the portion having the relatively large diameter.

Structure Example A-52

A member according to Structure Example A-50 or A-51, wherein the relatively large diameter is not less than 50 mm and not more than 80 mm.

Structure Example A-53

A member according to any one of Structure Examples A-50-A-52, wherein the relatively small diameter is not less than 20 mm and not more than 30 mm.

Structure Example A-54

A member according to any one of Structure Examples A-50-A-53, wherein a length of the relatively large diameter portion as measured in the direction parallel to the direction from the first portion toward the second portion is not less than 190 mm and not more than 220 mm.

Structure Example A-55

A member according to any one of Structure Examples A-50-A-54, wherein a length of the relatively small diameter portion as measured in the direction parallel to the direction from the first portion toward the second portion is not less than 20 mm and not more than 30 mm.

Structure Example A-56

A member according to any one of Structure Example A-1-A-55, wherein said third portion provided with a projected portion.

Structure Example A-57

A member according to Structure Example A-56, wherein said pad electrodes are provided on said projected portion.

Structure Example A-58

A member according to any one of Structure Examples A-56 or A-57, wherein said second portion has a portion having a relatively large diameter, and said first portion has a portion having the relatively small diameter, and wherein said projected portion is provided on the portion having the relatively small diameter.

Structure Example A-59

A member according to any one of Structure Examples A-56-A-58, wherein said projected portion has a top side and which said pad electrodes are provided, and said side has a maximum side length of not less than 9 mm and not more than 16 mm, as seen in a direction facing the top side.

Structure Example A-60

A member according to any one of Structure Examples A-56-A-59, wherein said projected portion has a height of not less than 3 mm and not more than 10 mm.

Structure Example A-61

A member according to any one of Structure Examples A-56-A-59, wherein said projected portion has a height of not less than 3 mm and not more than 8 mm.

Structure Example A-62

A member according to any one of Structure Examples A-56-A-61, wherein a first portion side of said projected portion is disposed at a position away from said first portion by not less than 5 mm and not more than 10 mm, as measured in a direction parallel with a direction from said first portion toward said second portion.

Structure Example A-63

A member according to any one of Structure Examples A-56-A-61, wherein a first portion side of said projected portion is disposed at a position away from said first portion by not less than 6 mm and not more than 7 mm, as measured in a direction parallel with a direction from said first portion toward said second portion.

Structure Example A-64

A member according to any one of Structure Examples A-56-A-63, wherein a second portion side of said projected portion is disposed at a position away from said first portion by not less than 20 mm and not more than 25 mm, as measured in the direction from said first portion toward said second portion.

Structure Example A-65

A member according to any one of Structure Examples A-56-A-63, wherein a second portion side of said projected portion is disposed at a position away from said first portion by not less than 22 mm and not more than 23 mm, as measured in the direction from said first portion toward said second portion.

Structure Example A-66

A member according to any one of Structure Examples A-56-A-65, wherein the mounting portion has a positioning wall, and wherein by rotating said member while said projected portion is in contact with said positioning wall, said pad electrodes are moved in the direction different from the inserting direction.

Structure Example A-67

A member according to any one of Structure Examples A-56-A-66, wherein an angle formed between a side surface of said projected portion in the direction from said first portion and said second portion is not less than 50° and not more than 70°.

Structure Example A-68

A member according to any one of Structure Examples A-56-A-66, wherein an angle formed between a side surface of said projected portion in the direction from said first portion and said second portion is not less than 55° and not more than 60°.

Structure Example A-69

A member according to any one of Structure Examples A-56-A-68, wherein a part of a side surface of said projected portion is protruded.

Structure Example A-70

A member according to any one of Structure Examples A-56-A-69, wherein said projected portion is provided with a space below said pad electrodes.

Structure Example A-71

A member according to Structure Example A-70, wherein said space is opened toward said first portion.

Structure Example A-72

A member according to any one of Structure Examples A-1-A-69, wherein a space is provided below said pad electrodes.

Structure Example A-73

A member according to any one of Structure Examples A-70-A-72, wherein a supporting member provided in said mounting portion is capable of entering said space.

Structure Example A-74

A member according to any one of Structure Examples A-70-A-73, wherein an outer periphery of said space has a maximum side length of not less than 10 mm and not more than 15 mm, as seen in a direction facing said pad electrode.

Structure Example A-75

An ink cartridge according to any one of Structure Examples A-70-A-74, wherein said space has a height of not less than 1 mm and not more than 5 mm.

Structure Example A-76

An ink cartridge according to any one of Structure Examples A-70-A-74, wherein said space has a height of not less than 2 mm and not more than 3 mm.

Structure Example A-77

A member according to any one of Structure Examples A-70-A-76, wherein said space extends only a part of a region below said pad electrode.

Structure Example A-78

A member according to any one of Structure Examples A-1-A-77, wherein said third portion is provided with a projection for identification of said member.

Structure Example A-79

A member according to Structure Example A-78, wherein a first portion side of said identification projection is away from said first portion by not less than 40 mm and not more than 50 mm, as measured in a direction parallel with the direction from said first portion to said second portion.

Structure Example A-80

A member according to Structure Example A-78, wherein a first portion side of said identification projection is away from said first portion by not less than 41 mm and not more than 45 mm, as measured in a direction parallel with the direction from said first portion to said second portion.

Structure Example A-81

A member according to any one of Structure Examples A-78-A-80 wherein a second portion side of said identification projection is away from said first portion by not less than 50 mm and not more than 60 mm, as measured in a direction parallel with the direction from said first portion to said second portion.

Structure Example A-82

A member according to any one of Structure Examples A-78-A-80, wherein a second portion side of said identification projection is away from said first portion by not less than 55 mm and not more than 58 mm, as measured in a direction parallel with the direction from said first portion to said second portion.

Structure Example A-83

A member according to any one of Structure Examples A-78-A-82, wherein said identification projection has a height of not less than 3 mm and not more than 10 mm.

Structure Example A-84

A member according to any one of Structure Examples A-78-A-82, wherein said second portion has a portion having a relatively large diameter, and said first portion has a portion having the relatively small diameter, and wherein said ID projection is provided on the portion having the relatively large diameter.

Structure Example A-85

A member according to any one of Structure Examples A-1-A-84, wherein the movement in the different direction includes a rotation of said member about a rotational axis which is along the inserting direction.

Structure Example A-86

A member according to any one of Structure Examples A-1-A-84, wherein by rotation of said member about a center axis of said member, said pad electrodes are moved in the direction different from the inserting direction.

Structure Example A-87

A member according to any one of Structure Examples A-1-A-84, wherein by rotation of said member about a axis of said ink receiving tube, said pad electrode are moved in the direction different from the inserting direction.

Structure Example A-88

A member according to any one of Structure Example A-85-A-87, wherein the rotation is a screw rotation.

Structure Example A-89

A member according to any one of Structure Examples A-85-A-88, wherein during the rotation, said member moves in the inserting direction.

Structure Example A-90

A member according to any one of Structure Examples A-85-A-89, wherein a angle of the rotation of said member up to insertion of said ink receiving tube into the inserting portion is not less than 10° and not more than 40°.

Structure Example A-91

A member according to any one of Structure Examples A-85-A-89, wherein a angle of the rotation of said member up to insertion of said ink receiving tube into the inserting portion is not less than 20° and not more than 25°.

Structure Example A-92

A member according to any one of Structure Examples A-85-A-91, wherein a angle of the rotation of said member after the insertion of said member in the inserting direction until said pad electrodes start to be inserted between two positioning walls of the mounting portion is not less than 40° in not more than 75°, wherein the positioning walls are opposed to each other with the electrical connecting portions interposed therebetween.

Structure Example A-93

A member according to any one of Structure Examples A-85-A-91, wherein a angle of the rotation of said member after the insertion of said member in the inserting direction until said pad electrodes start to be inserted between two positioning walls of the mounting portion is not less than 55° in not more than wherein the positioning walls are opposed to each other with the electrical connecting portions interposed therebetween.

Structure Example A-94

A member according to any one of Structure Examples A-85-A-93, wherein an angle of rotation of said member after the insertion in the inserting direction of said member until said pad electrodes start to be brought into contact with electrical connecting portions is not less than 80° and not more than 90°.

Structure Example A-95

A member according to any one of Structure Examples A-85-A-93, wherein an angle of rotation of said member after the insertion in the inserting direction of said member until said pad electrodes start to be brought into contact with electrical connecting portions is not less than 80° and not more than 88°.

Structure Example A-96

A member according to any one of Structure Examples A-1-A-95, wherein said pad electrodes have areas which are arranged so as to be crossed by a line inclined with respect to a moving direction of said pad electrodes.

Structure Example A-97

A member according to Structure Example A-96, wherein said pad electrodes have areas which are arranged so as to be crossed by a line inclined by not less than 60° relative to moving direction of said pad electrodes.

Structure Example A-98

A member according to Structure Example A-96, wherein said pad electrodes have areas which are arranged so as to be crossed by a line inclined by not less than 70° relative to moving direction of said pad electrodes.

Structure Example A-99

A member according to Structure Example A-96, wherein said pad electrodes have areas which are arranged so as to be crossed by a line inclined by not less than 80° relative to moving direction of said pad electrodes.

Structure Example A-100

A member according to Structure Example A-96, wherein said pad electrodes have areas which are arranged so as to be crossed by a line perpendicular to the moving direction of said pad electrodes. Perpendicular to a moving direction of said pad electrodes.

Structure Example A-101

A member according to any one of Structure Examples A-1-A-100, wherein said pad electrodes have the areas which are arranged so as to be crossed by a line inclined relative to a direction inclined relative to a direction from the first portion toward the second portion.

Structure Example A-102

A member according to Structure Example A-101, wherein said pad electrodes have the areas arranged so as to be crossed by a line inclined by not less than 10° and not more than 60° relative to the direction from the first portion toward the second portion.

Structure Example A-103

A member according to Structure Example A-101, wherein said pad electrodes have the areas arranged so as to be crossed by a line inclined by not less than 40° and not more than 60° relative to the direction from the first portion toward the second portion.

Structure Example A-104

A member according to any one of Structure Examples A-1-A-103, wherein said pad electrodes have areas which are arranged so as to be crossed by a line inclined relative to an inserting direction of said member.

Structure Example A-105

A member according to Structure Example A-104, wherein said pad electrodes have areas which are arranged so as to be crossed by a line inclined by not less than 10° and not more than 60° relative to the inserting direction of said member.

Structure Example A-106

A member according to Structure Example A-104, wherein said pad electrodes have areas which are arranged so as to be crossed by a line inclined by not less than 40° and not more than 60° relative to the inserting direction of said member.

Structure Example A-107

A member according to any one of Structure Examples A-1-A-106, wherein said pad electrodes have areas which are arranged so as to be crossed by aligned inclined relative to a longitudinal direction of said member.

Structure Example A-108

A member according to Structure Example A-107, wherein said pad electrodes have areas which are arranged so as to be crossed by a line inclined by not less than 10° and not more than 60° relative to the longitudinal direction of said member.

Structure Example A-109

A member according to Structure Example A-107, wherein said pad electrodes have areas which are arranged so as to be crossed by a line inclined by not less than 40° and not more than 60° relative to the longitudinal direction of said member.

Structure Example B

Structure Example B-1

A member comprising: a plurality of pad electrodes;

a first portion including an outwardly facing surface and provided with an inserting portion into which the ink receiving tube is capable of being inserted;

a second portion opposite from said first portion;

a third portion connecting said first portion and said second portion with each other and provided with a plurality of pad electrodes, wherein said third portion is provided with a guide portion extending in a direction crossing with a direction from said first portion to said second portion.

Structure Example B-2

A member according to any one of Structure Example B-1, wherein said pad electrodes include respective electrical contact points electrically connectable with the electrical connecting portions, and said electrical contact points are disposed at positions away from said first portion by not less than 5 mm and not more than 25 mm as measured in a direction parallel with the direction from said first portion toward said second portion.

Structure Example B-3

A member according to any one of Structure Example B-1, wherein said pad electrodes include respective electrical contact points electrically connectable with the electrical connecting portions, and said electrical contact points are disposed at positions away from said first portion by not less than 10 mm and not more than 20 mm as measured in a direction parallel with the direction from said first portion toward said second portion.

Structure Example B-4

A member according to any one of Structure Examples B-1-B-3, wherein said pad electrodes include respective electrical contact points electrically connectable with the electrical connecting portions, and wherein one of said electrical contact points that is closest to said first portion is disposed at a position away from said first portion by not less than 5 mm and not more than 15 mm as measured in a direction parallel with the direction from said first portion toward said second portion.

Structure Example B-5

A member according to any one of Structure Examples B-1-B-3, wherein said pad electrodes include respective electrical contact points electrically connectable with the electrical connecting portions, and wherein one of said electrical contact points that is closest to said first portion is disposed at a position away from said first portion by not less than 10 mm and not more than 11 mm as measured in a direction parallel with the direction from said first portion toward said second portion.

Structure Example B-6

A member according to any one of Structure Examples B-1-B-5, wherein said pad electrodes include respective electrical contact points electrically connectable with the electrical connecting portions, and wherein one of said electrical contact points that is most remote from said first portion is disposed at a position away from said first portion by not less than 15 mm and not more than 25 mm as measured in a direction parallel with the direction from said first portion toward said second portion.

Structure Example B-7

A member according to any one of Structure Examples B-1-B-5, wherein said pad electrodes include respective electrical contact points electrically connectable with the electrical connecting portions, and wherein one of said electrical contact points that is most remote from said first portion is disposed at a position away from said first portion by not less than 17 mm and not more than 18 mm as measured in a direction parallel with the direction from said first portion toward said second portion.

Structure Example B-8

A member according to any one of Structure Examples B-1-B-7, wherein said pad electrodes include respective electrical contact points electrically connectable with the electrical connecting portions, and wherein a direction in which said electrical contact points are arranged crosses with a direction from said first portion toward said second portion.

Structure Example B-9

A member according to Structure Example B-8, wherein a direction in which said electrical contact points are arranged is inclined by not less than 20° and not more than 40° relative to a directional from said first portion toward said second portion.

Structure Example B-10

A member according to Structure Example B-8, wherein a direction in which said electrical contact points are arranged is inclined by not less than 30° and not more than 35° relative to a directional from said first portion toward said second portion.

Structure Example B-11

A member according to any one of Structure Examples B-1-B-10, wherein said pad electrodes include respective electrical contact points electrically connectable with the electrical connecting portions, and wherein a direction in which said electrical contact points are arranged crosses with a longitudinal direction of said member.

Structure Example B-12

A member according to Structure Example B-11, wherein a direction in which said electrical contact points are arranged is inclined relative to a longitudinal direction of said member by not less than 20° and not more than 40°.

Structure Example B-13

A member according to Structure Example B-11, wherein a direction in which said electrical contact points are arranged is inclined relative to a longitudinal direction of said member by not less than 30° and not more than 35°.

Structure Example B-14

A member according to any one of Structure Examples B-1-B-13, wherein a direction in which said electrical contact points are arranged crosses with the inserting direction.

Structure Example B-15

A member according to Structure Example B-14, wherein a direction in which said electrical contact points are arranged crosses with the inserting direction at a angle of not less than 20° and not more than 40°.

Structure Example B-16

A member according to Structure Example B-14, wherein a direction in which said electrical contact points are arranged crosses with the inserting direction at a angle of not less than 30° and not more than 35°.

Structure Example B-17

A member according to any one of Structure Examples B-1-B-16, wherein the electrical connecting portions are provided in a recording device.

Structure Example B-18

A member according to any one of Structure Examples B-1-B-17, wherein said pad electrodes include respective electrical contact points electrically connectable with the electrical connecting portions, and all of said electrical contact points are gravity centers of the respective pad electrodes, respectively.

Structure Example B-19

A member according to any one of Structure Examples B-1-B-18, wherein said pad electrodes include respective electrical contact points electrically connectable with the electrical connecting portions, and in a part of said pad electrodes, said electrical contact points are gravity centers of the pad electrodes, and in the other part of said pad electrodes, said electrical contact points are not gravity centers of said pad electrodes.

Structure Example B-20

A member according to any one of Structure Examples B-1-B-19, wherein said pad electrodes include respective electrical contact points electrically connectable with the electrical connecting portions, and wherein each of said pad electrodes has a length from the electrical contact point is not less than 0.5 mm and not more than 4.0 mm.

Structure Example B-21

A member according to any one of Structure Examples B-1-B-20, wherein said guide portion is configured to rotate said member.

Structure Example B-22

A member according to any one of Structure Examples B-1-B-21, wherein said pad electrodes include respective electrical contact points electrically connectable with the electrical connecting portion, and wherein said electrical contact points are arranged in a direction crossing with the direction in which said guide portion extends.

Structure Example B-23

A member according

Structure Example B-22, wherein the direction in which said electrical contact points are arranged is inclined relative to the direction in which said guide portion extends by not less than 60°.

Structure Example B-24

A member according
Structure Example B-22, wherein the direction in which said electrical contact points are arranged is inclined relative to the direction in which said guide portion extends by not less than 70°.

Structure Example B-25

A member according
Structure Example B-22, wherein the direction in which said electrical contact points are arranged is inclined relative to the direction in which said guide portion extends by not less than 75°.

Structure Example B-26

A member according to any one of Structure Examples B-22-B-25, wherein the direction in which said electrical contact points are arranged is inclined relative to the direction in which said guide portion extends by not more than 85°

Structure Example B-27

A member according to any one of Structure Examples B-1-B-26, wherein said guide portion includes a groove.

Structure Example B-28

A member according to Structure Examples B-27, wherein said groove has a screw-shape.

Structure Example B-29

A member according to Structure Example B-27 or B-28, wherein said guide portion has a depth of not less than 1.0 mm and not more than 5.0 mm.

Structure Example B-30

A member according to Structure Example B-27 or B-28, wherein said guide portion has a depth of not less than 2.0 mm and not more than 4.0 mm.

Structure Example B-31

A member according to any one of Structure Example B-27-B-30, further comprising a rib provided inside said guide portion.

Structure Example B-32

A member according to Structure Example B-31, wherein said rib has a height of not less than 1.5 mm and not more than 2.0 mm.

Structure Example B-33

A member according to Structure Example B-31 or B-32, wherein said rib has a height smaller than a depth of said guide portion.

Structure Example B-34

A member according to any one of Structure Examples B-31-B-33, wherein a gravity center of said rib is disposed at the position away from said first portion by not less than 40 mm and not more than 50 mm as measured in a direction parallel with the direction from said first portion toward said second portion.

Structure Example B-35

A member according to any one of Structure Examples B-1-B34, wherein said guide portion extends in a direction crossing with a direction from said first portion to said second portion.

Structure Example B-36

A member according to Structure Example B-35, wherein a direction in which said guide portion extends is inclined by not less than 50° and not more than 80° relative to a direction from said first portion to said second portion.

Structure Example B-37

A member according to Structure Example B-35, wherein a direction in which said guide portion extends is inclined by not less than 60° and not more than 70° relative to a direction from said first portion to said second portion.

Structure Example B-38

A member according to any one of Structure Examples B-1-B-37, wherein said second portion has a portion having a relatively large diameter, and said first portion has a portion having the relatively small diameter, and wherein said pad electrodes are provided on the portion having the relatively small diameter.

Structure Example B-39

A member according to any one of Structure Examples B-1-B-38, further comprising a second guide portion at a position opposed to said first mentioned guide portion.

Structure Example B-40

A member according to any one of Structure Examples B-1-B-39, wherein said pad electrodes have areas which are arranged so as to be crossed by a line inclined with respect to a direction in which said guide portion extends.

Structure Example B-41

A member according to Structure Example B-40, wherein said pad electrodes have areas which are arranged so as to be crossed by a line inclined by not less than 60° relative to a direction in which said guide portion extends.

Structure Example B-42

A member according to Structure Example B-40, wherein said pad electrodes have areas which are arranged so as to be crossed by a line inclined by not less than 70° relative to a direction in which said guide portion extends.

Structure Example B-43

A member according to Structure Example B-40, wherein said pad electrodes have areas which are arranged so as to be crossed by a line inclined by not less than 75° relative to a direction in which said guide portion extends.

Structure Example B-44

A member according to any one of Structure Examples B-40-B-43, wherein said pad electrodes have areas which are arranged so as to be crossed by a line inclined by not more than 85° with respect to a direction in which said guide portion extends.

Structure Example B-45

A member according to any one of Structure Examples B-1-B-44, wherein said second portion has a portion having a relatively large diameter, and said first portion has a portion having the relatively small diameter, and wherein said pad electrodes are provided on the portion having the relatively small diameter.

Structure Example B-46

A member according to Structure Example B-45, wherein said second portion has a portion having a relatively large diameter, and said first portion has a portion having the relatively small diameter, and wherein said pad electrodes are provided on and are bridged between the portion having the relatively small diameter and on the portion having the relatively large diameter.

Structure Example B-47

A member according to Structure Example B-45 or B-46, wherein the relatively large diameter is not less than 50 mm and not more than 80 mm.

Structure Example B-48

A member according to any one of Structure Examples B-45-B-47, wherein the relatively small diameter is not less than 20 mm and not more than 30 mm.

Structure Example B-49

A member according to any one of Structure Examples B-45-B-48, wherein a length of the relatively large diameter portion as measured in the direction parallel to the direction from the first portion toward the second portion is not less than 190 mm and not more than 220 mm.

Structure Example B-50

A member according to any one of Structure Examples B-45-B-48, wherein a length of the relatively small diameter portion as measured in the direction parallel to the direction from the first portion toward the second portion is not less than 20 mm and not more than 30 mm.

Structure Example B-51

A member according to any one of Structure Example B-1-B-50, wherein said third portion provided with a projected portion.

Structure Example B-52

A member according to Structure Example B-51, wherein said pad electrodes are provided on said projected portion.

Structure Example B-53

A member according to any one of Structure Examples B-51 or B-52, wherein said second portion has a portion having a relatively large diameter, and said first portion has a portion having the relatively small diameter, and wherein said projected portion is provided on the portion having the relatively small diameter.

Structure Example B-54

A member according to any one of Structure Examples B-51-B-53, wherein said projected portion has a top side and which said pad electrodes are provided, and said side has a maximum side length of not less than 9 mm and not more than 16 mm, as seen in a direction facing the top side.

Structure Example B-55

A member according to any one of Structure Examples B-51-B-54, wherein said projected portion has a height of not less than 3 mm and not more than 10 mm.

Structure Example B-56

A member according to any one of Structure Examples B-51-B-54, wherein said projected portion has a height of not less than 3 mm and not more than 8 mm.

Structure Example B-57

A member according to any one of Structure Examples B-51-B-56, wherein a first portion side of said projected portion is disposed at a position away from said first portion by not less than 5 mm and not more than 10 mm, as measured in a direction parallel with a direction from said first portion toward said second portion.

Structure Example B-58

A member according to any one of Structure Examples B-51-B-56, wherein a first portion side of said projected portion is disposed at a position away from said first portion by not less than 6 mm and not more than 7 mm, as measured in a direction parallel with a direction from said first portion toward said second portion.

Structure Example B-59

A member according to any one of Structure Examples B-51-B-58, wherein a second portion side of said projected portion is disposed at a position away from said first portion by not less than 20 mm and not more than 25 mm, as measured in the direction from said first portion toward said second portion.

Structure Example B-60

A member according to any one of Structure Examples B-51-B-58, wherein a second portion side of said projected portion is disposed at a position away from said first portion by not less than 22 mm and not more than 23 mm, as measured in the direction from said first portion toward said second portion.

Structure Example B-61

A member according to any one of Structure Examples B-51-B-60, wherein an angle formed between a side surface of said projected portion in the direction from said first portion and said second portion is not less than 50° and not more than 70°.

Structure Example B-62

A member according to any one of Structure Examples B-51-B-60, wherein an angle formed between a side surface of said projected portion in the direction from said first portion and said second portion is not less than 55° and not more than 60°.

Structure Example B-63

A member according to any one of Structure Examples B-51-B-62, wherein a part of a side surface of said projected portion is protruded.

Structure Example B-64

A member according to Structure Example B51-B-63, wherein said projected portion is provided with a space below said pad electrodes.

Structure Example B-65

A member according to Structure Example B-64, wherein said space is opened toward said first portion.

Structure Example B-66

A member according to any one of Structure Examples B-1-B-65, wherein a space is provided below said pad electrodes.

Structure Example B-67

A member according to any one of Structure Examples B-64-B-66, wherein a supporting member provided in said mounting portion is capable of entering said space.

Structure Example B-68

A member according to any one of Structure Examples B-64-B-67, wherein an outer periphery of said space has a maximum side length of not less than 10 mm and not more than 15 mm, as seen in a direction facing said pad electrode.

Structure Example B-69

An ink cartridge according to any one of Structure Examples B-66-B-68, wherein said space has a height of not less than 1 mm and not more than 5 mm.

Structure Example B-70

An ink cartridge according to any one of Structure Examples B-66-B-69, wherein said space has a height of not less than 2 mm and not more than 3 mm.

Structure Example B-71

A member according to any one of Structure Examples B-66-B-70, wherein said space extends only a part of a region below said pad electrode.

Structure Example B-72

A member according to any one of Structure Examples B-1-B-71, wherein said third portion is provided with a projection for identification of said member.

Structure Example B-73

A member according to Structure Example B-72, wherein a first portion side of said identification projection is away from said first portion by not less than 40 mm and not more than 50 mm, as measured in a direction parallel with the direction from said first portion to said second portion.

Structure Example B-74

A member according to Structure Example B-72, wherein a first portion side of said identification projection is away from said first portion by not less than 41 mm and not more than 45 mm, as measured in a direction parallel with the direction from said first portion to said second portion.

Structure Example B-75

A member according to any one of Structure Examples B-72-B-74 wherein a second portion side of said identification projection is away from said first portion by not less than 50 mm and not more than 60 mm, as measured in a direction parallel with the direction from said first portion to said second portion.

Structure Example B-76

A member according to any one of Structure Examples B-72-B-74 wherein a second portion side of said identification projection is away from said first portion by not less than 55 mm and not more than 58 mm, as measured in a direction parallel with the direction from said first portion to said second portion.

Structure Example B-77

A member according to any one of Structure Examples B-72-B-76, wherein said identification projection has a height of not less than 3 mm and not more than 10 mm.

Structure Example B-78

A member according to any one of Structure Examples B-72-B-77, wherein said second portion has a portion having a relatively large diameter, and said first portion has a portion having the relatively small diameter, and wherein said ID projection is provided on the portion having the relatively large diameter.

Structure Example B-79

A member according to any one of Structure Examples B-1-B-78, wherein said pad electrodes have the areas which are arranged so as to be crossed by a line inclined relative to a direction inclined relative to a direction from the first portion toward the second portion.

Structure Example B-80

A member according to Structure Example B-79, wherein said pad electrodes have the areas arranged so as to be crossed by a line inclined by not less than 10° and not more than 60° relative to the direction from the first portion toward the second portion.

Structure Example B-81

A member according to Structure Example B-79, wherein said pad electrodes have the areas arranged so as to be crossed by a line inclined by not less than 40° and not more than 60° relative to the direction from the first portion toward the second portion.

Structure Example B-82

A member according to any one of Structure Examples B-1-B-81, wherein said pad electrodes have areas which are arranged so as to be crossed by aligned inclined relative to a longitudinal direction of said member.

Structure Example B-83

A member according to Structure Example B-82, wherein said pad electrodes have areas which are arranged so as to be crossed by a line inclined by not less than 10° and not more than 60° relative to the longitudinal direction of said member.

Structure Example B-84

A member according to Structure Example B-82, wherein said pad electrodes have areas which are arranged so as to be crossed by a line inclined by not less than 40° and not more than 60° relative to the longitudinal direction of said member.

Structure Example C

A member mountable to a mounting portion provided with an ink receiving tube and a plurality of electrical connecting portions, said member comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein said pad electrodes include respective electrical contact points electrically connectable with said electrical connecting portions, and wherein a direction in which said electrical contact points are arranged crosses with a moving direction of said pad electrodes.

Structure Example D

A member mountable to a mounting portion provided with an ink receiving tube and a plurality of electrical connecting portions, said member comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein said pad electrodes include respective electrical contact points electrically connectable with said electrical connecting portions, and wherein a direction in which said electrical contact points are arranged crosses with a direction from said first portion to second portion.

Structure Example E

A member mountable to a mounting portion provided with an ink receiving tube and a plurality of electrical connecting portions, said member comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein said pad electrodes include respective electrical contact points electrically connectable with said electrical connecting portions, and wherein a direction in which said electrical contact points are arranged crosses with a longitudinal direction of said member.

Structure Example F

A member mountable to a mounting portion provided with an ink receiving tube and a plurality of electrical connecting portions, said member comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein said third portion is provided with a screw-like groove.

Structure Example G

A member mountable to a mounting portion provided with an ink receiving tube and a plurality of electrical connecting portions, said member comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein said second portion has a portion having a relatively large diameter, and said first portion has a portion having the relatively small diameter, and wherein said pad electrodes are provided on the portion having the relatively small diameter, and a wherein said third portion is provided with a projected portion, wherein pad electrodes are provided on said projected portion.

Structure Example H

A member mountable to a mounting portion provided with an ink receiving tube and a plurality of electrical connecting portions, said member comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein a space is provided below said pad electrode.

Structure Example I

Structure Example I-1

A member according to any one of Structure Examples A-1-A-109, B-1-B-84, C, D, E, F, G and H, wherein said member has a cylindrical shape.

Structure Example I-2

A member according to any one of Structure Examples A-1-A-109, B-1-B-84, C, D, E, F, G and H, wherein said member has a polygonal prism shape.

Structure Example I-3

A member according to any one of Structure Examples A-1-A-109, B-1-B-84, C, D, E, F, G and H, wherein said member has a conical shape.

Structure Example I-4

A member according to any one of Structure Examples A-1-A-109, B-1-B-84, C, D, E, F, G and H, wherein said member has a polygonal pyramid shape.

Structure Example I-5

A member according to any one of Structure Examples A-1-A-109, B-1-B-84, C, D, E, F, G, H and I-1-I-4, wherein said member has a polygonal pyramid shape.

Structure Example I-6

A member according to any one of Structure Examples A-1-A-109, B-1-B-84, C, D, E, F, G, H and I-1-I-5, further comprising a casing including the first portion and the second portion, wherein a portion on a first portion side is rotatable independently of said casing.

Structure Example I-7

A member according to any one of Structure Examples A-1-A-109, B-1, B-84, C, D, E, F, G, H, I-1 and I-6, further comprising a grip portion at a position closer to said second portion than to said first portion.

Structure Example I-8

A member according to any one of Structure Examples A-1-A-109, B-1, B-84, C, D, E, F, G, H, I-1 and I-7, wherein said member does not contain ink.

Structure Example I-9

A member according to any one of Structure Examples A-1-A-109, B-1-B-84, C, D, E, F, G, H and I-1-I-8, wherein an ink cartridge member including an ink containing portion containing the ink is mountable to said member.

Structure Example I-10

A member according to Structure Example I-9, wherein an ink cartridge member including an ink containing portion containing the ink is mountable to said member through a tube.

Structure Example J

Structure Example J-1

An ink cartridge mountable to a mounting portion provided with an ink receiving tube and a plurality of electrical connecting portions, said ink cartridge comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein said ink cartridge is mountable to the mounting portion by being inserted into said mounting portion in an inserting direction with said first portion at a leading side, and wherein said pad electrodes are electrically connectable with said electrical connecting portions by being moved in a direction different from the inserting direction.

Structure Example J-2

An ink cartridge according to Structure Example J-1, wherein said pad electrodes include respective electrical contact points electrically connectable with the electrical connecting portions, and a direction in which electrical contact points are arranged crosses with a moving direction of said pad electrodes.

Structure Example J-3

An ink cartridge according to Structure Example J-2, wherein a direction in which said electrical contact points are arranged is inclined by not less than 60° relative to a moving direction of said pad electrodes.

Structure Example J-4

An ink cartridge according to Structure Example J-2, wherein a direction in which said electrical contact points are arranged is inclined by not less than 70° relative to a moving direction of said pad electrodes.

Structure Example J-5

An ink cartridge according to Structure Example J-2, wherein a direction in which said electrical contact points are arranged is inclined by not less than 80° relative to a moving direction of said pad electrodes.

Structure Example J-6

An ink cartridge according to Structure Example J-2, wherein a direction in which said electrical contact points are arranged crosses with a direction perpendicular to a moving direction of said pad electrodes.

Structure Example J-7

An ink cartridge according to any one of Structure Examples J-1-J-6, wherein said pad electrodes include respective electrical contact points electrically connectable with the electrical connecting portions, and said electrical contact points are disposed at positions away from said first portion by not less than 5 mm and not more than 25 mm as measured in a direction parallel with the direction from said first portion toward said second portion.

Structure Example J-8

An ink cartridge according to any one of Structure Examples J-1-J-6, wherein said pad electrodes include respective electrical contact points electrically connectable with the electrical connecting portions, and said electrical contact points are disposed at positions away from said first portion by not less than 10 mm and not more than 20 mm as measured in a direction parallel with the direction from said first portion toward said second portion.

Structure Example J-9

An ink cartridge according to any one of Structure Examples J-1-J-8, wherein said pad electrodes include respective electrical contact points electrically connectable with the electrical connecting portions, and wherein one of electrical contact points that is closest to said first portion is disposed at a position away from said first portion by not less than 5 mm and not more than 15 mm as measured in a direction parallel with the direction from said first portion to said second portion.

Structure Example J-10

An ink cartridge according to any one of Structure Examples J-1-J-8, wherein said pad electrodes include respective electrical contact points electrically connectable with the electrical connecting portions, and wherein one of electrical contact points that is closest to said first portion is disposed at a position away from said first portion by not less than 10 mm and not more than 11 mm as measured in a direction parallel with the direction from said first portion to said second portion.

Structure Example J-11

An ink cartridge according to any one of Structure Examples J-1-J-10, wherein said pad electrodes include respective electrical contact points electrically connectable with the electrical connecting portions, and wherein one of said electrical contact points that is most remote from said first portion is disposed at a position away from said first portion by not less than 15 mm and not more than 25 mm as measured in a direction parallel with the direction from said first portion to said second portion.

Structure Example J-12

An ink cartridge according to any one of Structure Examples J-1-J-10, wherein said pad electrodes include respective electrical contact points electrically connectable with the electrical connecting portions, and wherein one of said electrical contact points that is most remote from said first portion is disposed at a position away from said first portion by not less than 17 mm and not more than 18 mm as measured in a direction parallel with the direction from said first portion to said second portion.

Structure Example J-13

An ink cartridge according to any one of Structure Examples J-1-J-12, wherein said pad electrodes include respective electrical contact points electrically connectable with the electrical connecting portions, and wherein a direction in which said electrical contact points are arranged crosses with a direction from said first portion toward said second portion.

Structure Example J-14

An ink cartridge according to Structure Example J-13, wherein a direction in which said electrical contact points are arranged is inclined by not less than 20° and not more than 40° relative to a directional from said first portion toward said second portion.

Structure Example J-15

An ink cartridge according to Structure Example J-13, wherein a direction in which said electrical contact points are arranged is inclined by not less than 30° and not more than 35° relative to a directional from said first portion toward said second portion.

Structure Example J-16

An ink cartridge according to any one of Structure Examples J-1-J-15, wherein said pad electrodes include respective electrical contact points electrically connectable with the electrical connecting portions, and wherein a direction in which said electrical contact points are arranged crosses with a longitudinal direction of said ink cartridge.

Structure Example J-17

An ink cartridge according to Structure Example J-16, wherein a direction in which said electrical contact points are arranged is inclined relative to a longitudinal direction of said ink cartridge by not less than 20° and not more than 40°.

Structure Example J-18

An ink cartridge according to Structure Example J-16, wherein a direction in which said electrical contact points are arranged is inclined relative to a longitudinal direction of said ink cartridge by not less than 30° and not more than 35°.

Structure Example J-19

An ink cartridge according to any one of Structure Examples J-1-J-18, wherein a direction in which said electrical contact points are arranged crosses with the inserting direction.

Structure Example J-20

An ink cartridge according to Structure Example J-19, wherein a direction in which said electrical contact points are arranged is inclined relative to the crosses inserting direction by not less than 20° and not more than 40°.

Structure Example J-21

An ink cartridge according to Structure Example J-19, wherein a direction in which said electrical contact points are arranged is inclined relative to the crosses inserting direction by not less than 30° and not more than 35°.

Structure Example J-22

An ink cartridge according to any one of Structure Examples J-1-J-21, wherein the electrical connecting portions are provided in a recording device.

Structure Example J-23

An ink cartridge according to any one of Structure Examples J-1-J-22, wherein said pad electrodes include respective electrical contact points electrically connectable with the electrical connecting portions, and all of said electrical contact points are gravity centers of the respective pad electrodes, respectively.

Structure Example J-24

An ink cartridge according to any one of Structure Examples J-1-J-22, wherein said pad electrodes include respective electrical contact points electrically connectable with the electrical connecting portions, and in a part of said pad electrodes, said electrical contact points are gravity centers of the pad electrodes, and in the other part of said pad electrodes, said electrical contact points are not gravity centers of said pad electrodes.

Structure Example J-25

An ink cartridge according to any one of Structure Examples J-1-J-24, wherein said pad electrodes include respective electrical contact points electrically connectable with the electrical connecting portions, and wherein each of said pad electrodes has a length from the electrical contact point is not less than 0.5 mm and not more than 4.0 mm.

Structure Example J-26

An ink cartridge according to any one of Structure Examples J-1-J-25, wherein said third portion is provided with a guide portion configured to rotate said member.

Structure Example J-27

An ink cartridge according to Structure Example J-26, wherein said pad electrodes include respective electrical contact points electrically connectable with the electrical connecting portion, and wherein said electrical contact points are arranged in a direction crossing with the direction in which said guide portion extends.

Structure Example J-28

An ink cartridge according to Structure Example J-27, wherein the direction in which said electrical contact points are arranged is inclined relative to the direction in which said guide portion extends by not less than 60°.

Structure Example J-29

An ink cartridge according to Structure Example J-27, wherein the direction in which said electrical contact points are arranged is inclined relative to the direction in which said guide portion extends by not less than 70°.

Structure Example J-30

An ink cartridge according to Structure Example J-27, wherein the direction in which said electrical contact points are arranged is inclined relative to the direction in which said guide portion extends by not less than 75°.

Structure Example J-31

An ink cartridge according to any one of Structure Examples J-26-J-30, wherein the direction in which said electrical contact points are arranged is inclined relative to the direction in which said guide portion extends by not more than 85°.

Structure Example J-32

An ink cartridge according to any one of Structure Examples J-26-J-31, wherein said guide portion includes a groove.

Structure Example J-33

An ink cartridge according to Structure Example J-32, wherein said groove has a screw-shape.

Structure Example J-34

An ink cartridge according to Structure Example J-32 or J-33, wherein said guide portion has a depth of not less than 1.0 mm and not more than 5.0 mm.

Structure Example J-35

An ink cartridge according to Structure Example J-32 or J-33, wherein said guide portion has a depth of not less than 2.0 mm and not more than 4.0 mm.

Structure Example J-36

An ink cartridge according to any one of Structure Example J-32-J-35, further comprising a rib provided inside said guide portion.

Structure Example J-37

An ink cartridge according to Structure Example J-36, wherein said rib has a height of not less than 1.5 mm and not more than 2.0 mm.

Structure Example J-38

An ink cartridge according to Structure Example J-36 or J-37, wherein said rib has a height smaller than a depth of said guide portion.

Structure Example J-39

An ink cartridge according to any one of Structure Examples J-32-J-38, wherein the mounting portion is provided with a locking pin which is capable of entering said guide portion to guide said member so as to rotate said member.

Structure Example J-40

An ink cartridge according to any one of Structure Examples J-26-J-39, wherein said guide portion extends in a direction crossing with a direction from said first portion to said second portion.

Structure Example J-41

An ink cartridge according to Structure Example J-40, wherein a direction in which said guide portion extends is inclined by not less than 50° and not more than 80° relative to a direction from said first portion to said second portion.

Structure Example J-42

An ink cartridge according to Structure Example J-40, wherein a direction in which said guide portion extends is inclined by not less than 60° and not more than 70° relative to a direction from said first portion to said second portion.

Structure Example J-43

An ink cartridge according to any one of Structure Example J-26 or J-42, wherein said second portion has a portion having a relatively large diameter, and said first portion has a portion having the relatively small diameter, and wherein said guide portion is provided on the portion having the relatively large diameter.

Structure Example J-44

An ink cartridge according to Structure Example J-26 or J-43, further comprising a second guide portion at a position opposed to said first mentioned guide portion.

Structure Example J-45

An ink cartridge according to any one of Structure Example J-26 or J-44, wherein said pad electrodes have areas which are arranged so as to be crossed by a line inclined with respect to a direction in which said guide portion extends.

Structure Example J-46

An ink cartridge according to Structure Example J-45, wherein said pad electrodes have areas which are arranged so as to be crossed by a line inclined by not less than 60° relative to a direction in which said guide portion extends.

Structure Example J-47

An ink cartridge according to Structure Example J-45, wherein said pad electrodes have areas which are arranged so as to be crossed by a line inclined by not less than 70° relative to a direction in which said guide portion extends.

Structure Example J-48

An ink cartridge according to Structure Example J-45, wherein said pad electrodes have areas which are arranged so as to be crossed by a line inclined by not less than 75° relative to a direction in which said guide portion extends.

Structure Example J-49

An ink cartridge according to any one of Structure Examples J-45-J-48, wherein said pad electrodes have areas which are arranged so as to be crossed by a line inclined by not more than 85° with respect to a direction in which said guide portion extends.

Structure Example J-50

An ink cartridge according to any one of Structure Examples J-1-J-49, wherein said second portion has a portion having a relatively large diameter, and said first portion has a portion having the relatively small diameter, and wherein said pad electrodes are provided on the portion having the relatively small diameter.

Structure Example J-51

An ink cartridge according to Structure Example J-50, wherein said second portion has a portion having a relatively large diameter, and said first portion has a portion having the relatively small diameter, and wherein said pad electrodes are provided on and are bridged between the portion having the relatively small diameter and on the portion having the relatively large diameter.

Structure Example J-52

An ink cartridge according to Structure Example J-50 or J-51, wherein the relatively large diameter is not less than 50 mm and not more than 80 mm.

Structure Example J-53

An ink cartridge according to any one of Structure Examples J-50-J-52, wherein the relatively small diameter is not less than 20 mm and not more than 30 mm.

Structure Example J-54

An ink cartridge according to any one of Structure Examples J-50-J-53, wherein a length of the relatively large diameter portion as measured in the direction parallel to the direction from the first portion toward the second portion is not less than 190 mm and not more than 220 mm.

Structure Example J-55

An ink cartridge according to any one of Structure Examples J-50-J-54, wherein a length of the relatively small diameter portion as measured in the direction parallel to the direction from the first portion toward the second portion is not less than 20 mm and not more than 30 mm.

Structure Example J-56

An ink cartridge according to any one of Structure Example J-1-J-55, wherein said third portion is provided with a projected portion.

Structure Example J-57

An ink cartridge according to Structure Example J-56, wherein said pad electrodes are provided on said projected portion.

Structure Example J-58

An ink cartridge according to any one of Structure Example J-56 or -J-57, wherein said second portion has a portion having a relatively large diameter, and said first portion has a portion having the relatively small diameter, and wherein said projected portion is provided on the portion having the relatively small diameter.

Structure Example J-59

An ink cartridge according to any one of Structure Examples J-56-J-58, wherein said projected portion has a top side and which said pad electrodes are provided, and said side has a maximum side length of not less than 9 mm and not more than 16 mm, as seen in a direction facing the top side.

Structure Example J-60

An ink cartridge according to any one of Structure Examples J-56-J-59, wherein said projected portion has a height of not less than 3 mm and not more than 10 mm.

Structure Example J-61

An ink cartridge according to any one of Structure Examples J-56-J-59, wherein said projected portion has a height of not less than 3 mm and not more than 8 mm.

Structure Example J-62

An ink cartridge according to any one of Structure Examples J-56-J-61, wherein a first portion side of said projected portion is disposed at a position away from said first portion by not less than 5 mm and not more than 10 mm, as measured in a direction parallel with a direction from said first portion toward said second portion.

Structure Example J-63

An ink cartridge according to any one of Structure Examples J-56-J-61, wherein a first portion side of said projected portion is disposed at a position away from said first portion by not less than 6 mm and not more than 7 mm, as measured in a direction parallel with a direction from said first portion toward said second portion.

Structure Example J-64

An ink cartridge according to any one of Structure Examples J-56-J-63, wherein a second portion side of said projected portion is disposed at a position away from said first portion by not less than 20 mm and not more than 25 mm, as measured in the direction from said first portion toward said second portion.

Structure Example J-65

An ink cartridge according to any one of Structure Examples J-56-J-63, wherein a second portion side of said projected portion is disposed at a position away from said first portion by not less than 22 mm and not more than 23 mm, as measured in the direction from said first portion toward said second portion.

Structure Example J-66

An ink cartridge according to Structure Examples J-56-J-65, wherein the mounting portion has a positioning wall, and wherein by rotating said ink cartridge while said projected portion is in contact with said positioning wall, said pad electrodes are moved in the direction different from the inserting direction.

Structure Example J-67

An ink cartridge according to any one of Structure Examples J-56-J-66, wherein an angle formed between a side surface of said projected portion in the direction from said first portion and said second portion is not less than 50° and not more than 70°.

Structure Example J-68

An ink cartridge according to any one of Structure Examples J-56-J-66, wherein an angle formed between a side surface of said projected portion in the direction from said first portion and said second portion is not less than 55° and not more than 60°.

Structure Example J-69

An ink cartridge according to any one of Structure Examples J-56-J-68, wherein a part of a side surface of said projected portion is protruded.

Structure Example J-70

An ink cartridge according to any one of Structure Examples J-56-J-69, wherein said projected portion is provided with a space below said pad electrodes.

Structure Example J-71

An ink cartridge according to Structure Example J-70, wherein said space is opened toward said first portion.

Structure Example J-72

An ink cartridge according to any one of Structure Examples J-1-J-69, wherein a space is provided below said pad electrodes.

Structure Example J-73

A member according to any one of Structure Examples J-70-J-72, wherein a supporting member provided in said mounting portion is capable of entering said space.

Structure Example J-74

An ink cartridge according to any one of Structure Examples J-70-J-73, wherein an outer periphery of said space has a maximum side length of not less than 10 mm and not more than 15 mm, as seen in a direction facing said pad electrode.

Structure Example J-75

An ink cartridge according to any one of Structure Examples J-70-J-74, wherein said space has a height of not less than 1 mm and not more than 5 mm.

Structure Example J-76

An ink cartridge according to any one of Structure Examples J-70-J-74, wherein said space has a height of not less than 2 mm and not more than 3 mm.

Structure Example J-77

An ink cartridge according to any one of Structure Examples J-70-J-76, wherein said space extends only a part of a region below said pad electrode.

Structure Example J-78

An ink cartridge according to any one of Structure Examples J-1-J-77, wherein said third portion is provided with a projection for identification of said member.

Structure Example J-79

An ink cartridge according to Structure Example J-78, wherein a first portion side of said identification projection is away from said first portion by not less than 40 mm and not more than 50 mm, as measured in a direction parallel with the direction from said first portion to said second portion.

Structure Example J-80

An ink cartridge according to Structure Example J-78, wherein a first portion side of said identification projection is away from said first portion by not less than 41 mm and not more than 45 mm, as measured in a direction parallel with the direction from said first portion to said second portion.

Structure Example J-81

An ink cartridge according to any one of Structure Examples J-78-J-80 wherein a second portion side of said identification projection is away from said first portion by not less than 50 mm and not more than 60 mm, as measured in a direction parallel with the direction from said first portion to said second portion.

Structure Example J-82

An ink cartridge according to any one of Structure Examples J-78-J-80 wherein a second portion side of said identification projection is away from said first portion by not less than 55 mm and not more than 58 mm, as measured in a direction parallel with the direction from said first portion to said second portion.

Structure Example J-83

An ink cartridge according to any one of Structure Examples J-78-J-82, wherein said identification projection has a height of not less than 3 mm and not more than 10 mm.

Structure Example J-84

An ink cartridge according to any one of Structure Examples J-78-J-82, wherein said second portion has a portion having a relatively large diameter, and said first portion has a portion having the relatively small diameter, and wherein said ID projection is provided on the portion having the relatively large diameter.

Structure Example J-85

An ink cartridge according to any one of Structure Examples J-1-J-84, wherein the movement in the different direction includes a rotation of said member about a rotational axis which is along the inserting direction.

Structure Example J-86

An ink cartridge according to any one of Structure Examples J-1-J-84, wherein by rotation of said ink cartridge about a center axis of said ink cartridge, said pad electrodes are moved in the direction different from the inserting direction.

Structure Example J-87

An ink cartridge according to any one of Structure Examples J-1-J-84, wherein by rotation of said ink cartridge about a axis of said ink receiving tube, said pad electrode are moved in the direction different from the inserting direction.

Structure Example J-88

An ink cartridge according to any one of Structure Example J-85-J-87, wherein the rotation is a screw rotation.

Structure Example J-89

An ink cartridge according to any one of Structure Examples J-85-J-88, wherein during the rotation, said ink cartridge moves in the inserting direction.

Structure Example J-90

An ink cartridge according to any one of Structure Examples J-85-J-89, wherein an angle of the rotation of said ink cartridge up to insertion of said ink receiving tube into the inserting portion is not less than 10° and not more than 40°.

Structure Example J-91

An ink cartridge according to any one of Structure Examples J-85-J-89, wherein an angle of the rotation of said ink cartridge up to insertion of said ink receiving tube into the inserting portion is not less than 20° and not more than 25°.

Structure Example J-92

An ink cartridge according to any one of Structure Examples J-85-J-91, wherein a angle of the rotation of said ink cartridge after the insertion of said ink cartridge in the inserting direction until said pad electrodes start to be inserted between two positioning walls of the mounting portion is not less than 40° in not more than 75°, wherein the positioning walls are opposed to each other with the electrical connecting portions interposed therebetween.

Structure Example J-93

An ink cartridge according to any one of Structure Examples J-85-J-91, wherein a angle of the rotation of said ink cartridge after the insertion of said ink cartridge in the inserting direction until said pad electrodes start to be inserted between two positioning walls of the mounting portion is not less than 55° in not more than 65°, wherein the positioning walls are opposed to each other with the electrical connecting portions interposed therebetween.

Structure Example J-94

An ink cartridge according to any one of Structure Example J-85-J-93, wherein an angle of rotation of said ink cartridge after the insertion in the inserting direction of said ink cartridge until said pad electrodes start to be brought into contact with electrical connecting portions is not less than 80° and not more than 90°.

Structure Example J-95

An ink cartridge according to any one of Structure Example J-85-J-93, wherein an angle of rotation of said ink cartridge after the insertion in the inserting direction of said ink cartridge until said pad electrodes start to be brought into contact with electrical connecting portions is not less than 80° and not more than 88°.

Structure Example J-96

An ink cartridge according to any one of Structure Examples J-1-J-95, wherein said pad electrodes have areas which are arranged so as to be crossed by a line inclined with respect to a moving direction of said pad electrodes.

Structure Example J-97

An ink cartridge according to Structure Example J-96, wherein said pad electrodes have areas which are arranged so as to be crossed by a line inclined by not less than 60° relative to moving direction of said pad electrodes.

Structure Example J-98

An ink cartridge according to Structure Example J-96, wherein said pad electrodes have areas which are arranged so as to be crossed by a line inclined by not less than 70° relative to moving direction of said pad electrodes.

Structure Example J-99

An ink cartridge according to Structure Example J-96, wherein said pad electrodes have areas which are arranged so as to be crossed by a line inclined by not less than 80° relative to moving direction of said pad electrodes.

Structure Example J-100

An ink cartridge according to Structure Example J-96, wherein said pad electrodes have areas which are arranged so as to be crossed by a line perpendicular to the moving direction of said pad electrodes. Perpendicular to a moving direction of said pad electrodes.

Structure Example J-101

An ink cartridge according to any one of Structure Examples Structure Example—J-100, wherein said pad electrodes have the areas which are arranged so as to be crossed by a line inclined relative to a direction inclined relative to a direction from the first portion toward the second portion.

Structure Example J-102

An ink cartridge according to Structure Example J-101, wherein said pad electrodes have the areas arranged so as to be crossed by a line inclined by not less than 10° and not more than 60° relative to the direction from the first portion toward the second portion.

Structure Example J-103

An ink cartridge according to Structure Example J-101, wherein said pad electrodes have the areas arranged so as to be crossed by a line inclined by not less than 40° and not more than 60° relative to the direction from the first portion toward the second portion.

Structure Example J-104

An ink cartridge accoutering to any one of Structure Examples J-1-J-103, wherein said pad electrodes have areas which are arranged so as to be crossed by a line inclined relative to the inserting direction of said ink the cartridge.

Structure Example J-105

An ink cartridge according to Structure Example J-104, wherein said pad electrodes have the areas which are arranged so as to be crossed by a line inclined by not less than 10° and not more than 60° relative to the inserting direction of said ink cartridge.

Structure Example J-106

An ink cartridge according to Structure Example J-104, wherein said pad electrodes have the areas which are arranged so as to be crossed by a line inclined by not less than 40° and not more than 60° relative to the inserting direction of said ink cartridge.

Structure Example J-107

An ink cartridge according to any one of Structure Examples J-1-J-106, wherein said pad electrodes have areas which are arranged so as to be crossed by a line inclined relative to the longitudinal direction of said ink cartridge.

Structure Example J-108

An ink cartridge according to Structure Example J-107, wherein said pad electrodes have areas which are arranged so as to be crossed by a line inclined not less than 10° and not more than 60° relative to the longitudinal direction of said ink cartridge.

Structure Example J-109

An ink cartridge according to Structure Example J-107, wherein said pad electrodes have areas which are arranged so as to be crossed by a line inclined not less than 40° and not more than 60° relative to the longitudinal direction of said ink cartridge.

Structure Example K

Structure Example K-1

An ink cartridge comprising: a plurality of pad electrodes,
- a first portion including an outwardly facing surface and provided with an inserting portion into which the ink receiving tube is capable of being inserted;
- a second portion opposite from said first portion; and
- a third portion connecting said first portion and said second portion with each other and provided with a plurality of pad electrodes,
- wherein said third portion is provided with a guide portion extending in a direction crossing with a direction from said first portion to said second portion.

Structure Example K-2

An ink cartridge according to any one of Structure Example K-1, wherein said pad electrodes include respective electrical contact points electrically connectable with the electrical connecting portions, and said electrical contact points are disposed at positions away from said first portion by not less than 5 mm and not more than 25 mm as measured in a direction parallel with the direction from said first portion toward said second portion.

Structure Example K-3

An ink cartridge according to any one of Structure Example K-1, wherein said pad electrodes include respective electrical contact points electrically connectable with the electrical connecting portions, and said electrical contact points are disposed at positions away from said first portion by not less than 10 mm and not more than 20 mm as measured in a direction parallel with the direction from said first portion toward said second portion.

Structure Example K-4

An ink cartridge according to any one of Structure Examples K-1-K-3, wherein said pad electrodes include respective electrical contact points electrically connectable with the electrical connecting portions, and wherein one of said electrical contact points that is closest to said first portion is disposed at a position away from said first portion by not less than 5 mm and not more than 15 mm as measured in a direction parallel with the direction from said first portion toward said second portion.

Structure Example K-5

An ink cartridge according to any one of Structure Examples K-1-K-3, wherein said pad electrodes include respective electrical contact points electrically connectable with the electrical connecting portions, and wherein one of said electrical contact points that is closest to said first portion is disposed at a position away from said first portion by not less than 10 mm and not more than 11 mm as measured in a direction parallel with the direction from said first portion toward said second portion.

Structure Example K-6

An ink cartridge according to any one of Structure Examples K-1-K-5, wherein said pad electrodes include respective electrical contact points electrically connectable with the electrical connecting portions, and wherein one of said electrical contact points that is most remote from said first portion is disposed at a position away from said first portion by not less than 15 mm and not more than 25 mm as measured in a direction parallel with the direction from said first portion toward said second portion.

Structure Example K-7

An ink cartridge according to any one of Structure Examples K-1-K-5, wherein said pad electrodes include respective electrical contact points electrically connectable with the electrical connecting portions, and wherein one of said electrical contact points that is most remote from said first portion is disposed at a position away from said first portion by not less than 17 mm and not more than 18 mm as measured in a direction parallel with the direction from said first portion toward said second portion.

Structure Example K-8

An ink cartridge according to any one of Structure Examples K-1-K-7, wherein said pad electrodes include respective electrical contact points electrically connectable with the electrical connecting portions, and wherein a direction in which said electrical contact points are arranged crosses with a direction from said first portion toward said second portion.

Structure Example K-9

An ink cartridge according to Structure Example K-8, wherein a direction in which said electrical contact points are arranged is inclined by not less than 20° and not more than 40° relative to a directional from said first portion toward said second portion.

Structure Example K-10

An ink cartridge according to Structure Example K-8, wherein a direction in which said electrical contact points are arranged is inclined by not less than 30° and not more than 35° relative to a directional from said first portion toward said second portion.

Structure Example K-11

An ink cartridge according to any one of Structure Examples K-1-K-10, wherein said pad electrodes include respective electrical contact points electrically connectable with the electrical connecting portions, and wherein a direction in which said electrical contact points are arranged crosses with a longitudinal direction of said ink cartridge.

Structure Example K-12

An ink cartridge according to Structure Example K-11, wherein a direction in which said electrical contact points are arranged is inclined relative to a longitudinal direction of said ink cartridge by not less than 20° and not more than 40°.

Structure Example K-13

An ink cartridge according to Structure Example K-11, wherein a direction in which said electrical contact points are arranged is inclined relative to a longitudinal direction of said ink cartridge by not less than 30° and not more than 35°.

Structure Example K-14

An ink cartridge according to any one of Structure Examples K-1-K-13, wherein a direction in which said electrical contact points are arranged crosses with the inserting direction.

Structure Example K-15

An ink cartridge according to Structure Example K-14, wherein a direction in which said electrical contact points are arranged crosses with the inserting direction at a angle of not less than 20° and not more than 40°.

Structure Example K-16

An ink cartridge according to Structure Example K-14, wherein a direction in which said electrical contact points are arranged crosses with the inserting direction at a angle of not less than 30° and not more than 35°.

Structure Example K-17

An ink cartridge according to any one of Structure Examples K-1-K-16, wherein the electrical connecting portions are provided in a recording device.

Structure Example K-18

An ink cartridge according to any one of Structure Examples K-1-K-17, wherein said pad electrodes include respective electrical contact points electrically connectable with the electrical connecting portions, and all of said electrical contact points are gravity centers of the respective pad electrodes, respectively.

Structure Example K-19

An ink cartridge according to any one of Structure Examples K-1-K-18, wherein said pad electrodes include respective electrical contact points electrically connectable with the electrical connecting portions, and in a part of said pad electrodes, said electrical contact points are gravity centers of the pad electrodes, and in the other part of said pad electrodes, said electrical contact points are not gravity centers of said pad electrodes.

Structure Example K-20

An ink cartridge according to any one of Structure Examples K-1-K-19, wherein said pad electrodes include respective electrical contact points electrically connectable with the electrical connecting portions, and wherein each of said pad electrodes has a length from the electrical contact point is not less than 0.5 mm and not more than 4.0 mm.

Structure Example K-21

An ink cartridge according to any one of Structure Examples K-1-K-20, wherein said guide portion is configured to rotate said ink cartridge.

Structure Example K-22

An ink cartridge according to any one of Structure Examples K-1-K-21, wherein said pad electrodes include respective electrical contact points electrically connectable with the electrical connecting portion, and wherein said electrical contact points are arranged in a direction crossing with the direction in which said guide portion extends.

Structure Example K-23

An ink cartridge according to Structure Example K-22, wherein the direction in which said electrical contact points are arranged is inclined relative to the direction in which said guide portion extends by not less than 60°.

Structure Example K-24

An ink cartridge according to Structure Example K-22, wherein the direction in which said electrical contact points are arranged is inclined relative to the direction in which said guide portion extends by not less than 70°.

Structure Example K-25

An ink cartridge according to Structure Example K-22, wherein the direction in which said electrical contact points are arranged is inclined relative to the direction in which said guide portion extends by not less than 75°.

Structure Example K-26

An ink cartridge according to any one of Structure Examples K-22-K-25, wherein the direction in which said electrical contact points are arranged is inclined relative to the direction in which said guide portion extends by not more than 85°

Structure Example K-27

An ink cartridge according to any one of Structure Examples K-1-K-26, wherein said guide portion includes a groove.

Structure Example K-28

An ink cartridge according to Structure Example K-27, wherein said groove has a screw-shape.

Structure Example K-29

An ink cartridge according to Structure Example K-27 or K-28, wherein said guide portion has a depth of not less than 1.0 mm and not more than 5.0 mm.

Structure Example K-30

An ink cartridge according to Structure Example K-27 or K-28, wherein said guide portion has a depth of not less than 2.0 mm and not more than 4.0 mm.

Structure Example K-31

An ink cartridge according to any one of Structure Example K-27-K-further comprising a rib provided inside said guide portion.

Structure Example K-32

An ink cartridge according to Structure Example K-31, wherein said rib has a height of not less than 1.5 mm and not more than 2.0 mm.

Structure Example K-33

An ink cartridge according to Structure Example K-31 or K-32, wherein said rib has a height smaller than a depth of said guide portion.

Structure Example K-34

An ink cartridge according to any one of Structure Examples K-31-K-33, wherein a gravity center of said rib is disposed at the position away from said first portion by not less than 40 mm and not more than 50 mm as measured in a direction parallel with the direction from said first portion toward said second portion.

Structure Example K-35

An ink cartridge according to any one of Structure Examples K-1-K-34, wherein said guide portion extends in a direction crossing with a direction from said first portion to said second portion.

Structure Example K-36

An ink cartridge according to Structure Example K-35, wherein a direction in which said guide portion extends is inclined by not less than 50° and not more than 80° relative to a direction from said first portion to said second portion.

Structure Example K-37

An ink cartridge according to Structure Example K-35, wherein a direction in which said guide portion extends is inclined by not less than 60° and not more than 70° relative to a direction from said first portion to said second portion.

Structure Example K-38

An ink cartridge according to any one of Structure Example K-1 or K-37, wherein said second portion has a portion having a relatively large diameter, and said first portion has a portion having the relatively small diameter, and wherein said guide portion is provided on the portion having the relatively large diameter.

Structure Example K-39

An ink cartridge according to Structure Example K-1 or K-38, further comprising a second guide portion at a position opposed to said first mentioned guide portion.

Structure Example K-40

An ink cartridge according to any one of Structure Example K-1 or K-39, wherein said pad electrodes have areas which are arranged so as to be crossed by a line inclined with respect to a direction in which said guide portion extends.

Structure Example K-41

An ink cartridge according to Structure Example K-40, wherein said pad electrodes have areas which are arranged so as to be crossed by a line inclined by not less than 60° relative to a direction in which said guide portion extends.

Structure Example K-42

An ink cartridge according to Structure Example K-40, wherein said pad electrodes have areas which are arranged so as to be crossed by a line inclined by not less than 70° relative to a direction in which said guide portion extends.

Structure Example K-43

An ink cartridge according to Structure Example K-40, wherein said pad electrodes have areas which are arranged so as to be crossed by a line inclined by not less than 75° relative to a direction in which said guide portion extends.

Structure Example K-44

An ink cartridge according to any one of Structure Examples K-40-K-43, wherein said pad electrodes have areas which are arranged so as to be crossed by a line inclined by not more than 85° with respect to a direction in which said guide portion extends.

Structure Example K-45

An ink cartridge according to any one of Structure Examples K-1-K-44, wherein said second portion has a portion having a relatively large diameter, and said first portion has a portion having the relatively small diameter, and wherein said pad electrodes are provided on the portion having the relatively small diameter.

Structure Example K-46

An ink cartridge according to Structure Example K-45, wherein said second portion has a portion having a relatively large diameter, and said first portion has a portion having the relatively small diameter, and wherein said pad electrodes are provided on and are bridged between the portion having the relatively small diameter and on the portion having the relatively large diameter.

Structure Example K-47

An ink cartridge according to Structure Example K-45 or K-46, wherein the relatively large diameter is not less than 50 mm and not more than 80 mm.

Structure Example K-48

An ink cartridge according to any one of Structure Examples K-45-K-47, wherein the relatively small diameter is not less than 20 mm and not more than 30 mm.

Structure Example K-49

An ink cartridge according to any one of Structure Examples K-45-K-48, wherein a length of the relatively large diameter portion as measured in the direction parallel to the direction from the first portion toward the second portion is not less than 190 mm and not more than 220 mm.

Structure Example K-50

An ink cartridge according to any one of Structure Examples K-45-K-48, wherein a length of the relatively small diameter portion as measured in the direction parallel to the direction from the first portion toward the second portion is not less than 20 mm and not more than 30 mm.

Structure Example K-51

An ink cartridge according to any one of Structure Example K-1-K-50, wherein said third portion is provided with a projected portion.

Structure Example K-52

An ink cartridge according to Structure Example K-51, wherein said pad electrodes are provided on said projected portion.

Structure Example K-53

An ink cartridge according to any one of Structure Example K-51 or -K-52, wherein said second portion has a portion having a relatively large diameter, and said first portion has a portion having the relatively small diameter, and wherein said projected portion is provided on the portion having the relatively small diameter.

Structure Example K-54

An ink cartridge according to any one of Structure Examples K-51-K-53, wherein said projected portion has a top side and which said pad electrodes are provided, and said side has a maximum side length of not less than 9 mm and not more than 16 mm, as seen in a direction facing the top side.

Structure Example K-55

An ink cartridge according to any one of Structure Examples K-51-K-54, wherein said projected portion has a height of not less than 3 mm and not more than 10 mm.

Structure Example K-56

An ink cartridge according to any one of Structure Examples K-51-K-54, wherein said projected portion has a height of not less than 3 mm and not more than 8 mm.

Structure Example K-57

An ink cartridge according to any one of Structure Examples K-51-K-56, wherein a first portion side of said projected portion is disposed at a position away from said first portion by not less than 5 mm and not more than 10 mm, as measured in a direction parallel with a direction from said first portion toward said second portion.

Structure Example K-58

An ink cartridge according to any one of Structure Examples K-51-K-56, wherein a first portion side of said projected portion is disposed at a position away from said first portion by not less than 6 mm and not more than 7 mm, as measured in a direction parallel with a direction from said first portion toward said second portion.

Structure Example K-59

An ink cartridge according to any one of Structure Examples K-51-K-58, wherein a second portion side of said projected portion is disposed at a position away from said first portion by not less than 20 mm and not more than 25 mm, as measured in the direction from said first portion toward said second portion.

Structure Example K-60

An ink cartridge according to any one of Structure Examples K-51-K-58, wherein a second portion side of said projected portion is disposed at a position away from said first portion by not less than 22 mm and not more than 23 mm, as measured in the direction from said first portion toward said second portion.

Structure Example K-61

An ink cartridge according to any one of Structure Examples K-51-K-60, wherein an angle formed between a side surface of said projected portion in the direction from said first portion and said second portion is not less than 50° and not more than 70°.

Structure Example K-62

An ink cartridge according to any one of Structure Examples K-51-K-60, wherein an angle formed between a side surface of said projected portion in the direction from said first portion and said second portion is not less than 55° and not more than 60°.

Structure Example K-63

An ink cartridge according to any one of Structure Examples K-51-K-62, wherein a part of a side surface of said projected portion is protruded.

Structure Example K-64

An ink cartridge according to any one of Structure Examples K-51-K-63, wherein said projected portion is provided with a space below said pad electrodes.

Structure Example K-65

An ink cartridge according to Structure Example K-64, wherein said space is opened toward said first portion.

Structure Example K-66

An ink cartridge according to any one of Structure Examples K-51-K-65, wherein a space is provided below said pad electrodes.

Structure Example K-67

A member according to any one of Structure Examples K-64-K-66, wherein a supporting member provided in said mounting portion is capable of entering said space.

Structure Example K-68

An ink cartridge according to any one of Structure Examples K-64-K-67, wherein an outer periphery of said space has a maximum side length of not less than 10 mm and not more than 15 mm, as seen in a direction facing said pad electrode.

Structure Example K-69

An ink cartridge according to any one of Structure Examples K-66-K-68, wherein said space has a height of not less than 1 mm and not more than 5 mm.

Structure Example K-70

An ink cartridge according to any one of Structure Examples K-66-K-69, wherein said space has a height of not less than 1 mm and not more than 5 mm.

Structure Example K-71

An ink cartridge according to any one of Structure Examples K-66-K-70, wherein said space extends only a part of a region below said pad electrode.

Structure Example K-72

An ink cartridge according to any one of Structure Examples K-1-K-71, wherein said third portion is provided with a projection for identification of said member.

Structure Example K-73

An ink cartridge according to Structure Example K-72, wherein a first portion side of said identification projection is away from said first portion by not less than 40 mm and not more than 50 mm, as measured in a direction parallel with the direction from said first portion to said second portion.

Structure Example K-74

An ink cartridge according to Structure Example K-72, wherein a first portion side of said identification projection is away from said first portion by not less than 41 mm and not more than 45 mm, as measured in a direction parallel with the direction from said first portion to said second portion.

Structure Example K-75

An ink cartridge according to any one of Structure Examples K-72-K-74 wherein a second portion side of said identification projection is away from said first portion by not less than 50 mm and not more than 60 mm, as measured in a direction parallel with the direction from said first portion to said second portion.

Structure Example K-76

An ink cartridge according to any one of Structure Examples K-72-K-74 wherein a second portion side of said identification projection is away from said first portion by not less than 55 mm and not more than 58 mm, as measured in a direction parallel with the direction from said first portion to said second portion.

Structure Example K-77

An ink cartridge according to any one of Structure Examples K-72-K-76, wherein said identification projection has a height of not less than 3 mm and not more than 10 mm.

Structure Example K-78

An ink cartridge according to any one of Structure Examples K-72-K-77, wherein said second portion has a portion having a relatively large diameter, and said first portion has a portion having the relatively small diameter, and wherein said ID projection is provided on the portion having the relatively large diameter.

Structure Example K-79

An ink cartridge according to any one of Structure Examples K-1-K-78, wherein said pad electrodes have the areas which are arranged so as to be crossed by a line inclined relative to a direction inclined relative to a direction from the first portion toward the second portion.

Structure Example K-80

An ink cartridge according to Structure Example K-79, wherein said pad electrodes have the areas arranged so as to be crossed by a line inclined by not less than 10° and not more than 60° relative to the direction from the first portion toward the second portion.

Structure Example K-81

An ink cartridge according to Structure Example K-79, wherein said pad electrodes have the areas arranged so as to be crossed by a line inclined by not less than 40° and not more than 60° relative to the direction from the first portion toward the second portion.

Structure Example K-82

An ink cartridge according to any one of Structure Examples K-1-K-81, wherein said pad electrodes have areas which are arranged so as to be crossed by a line inclined relative to the longitudinal direction of said ink cartridge.

Structure Example K-83

An ink cartridge according to Structure Example K-82, wherein said pad electrodes have areas which are arranged so as to be crossed by a line inclined not less than 10° and not more than 60° relative to the longitudinal direction of said ink cartridge.

Structure Example K-84

An ink cartridge according to Structure Example K-82, wherein said pad electrodes have areas which are arranged so as to be crossed by a line inclined not less than 40° and not more than 60° relative to the longitudinal direction of said ink cartridge.

Structure Example L

An ink cartridge mountable to a mounting portion provided with an ink receiving tube and a plurality of electrical connecting portions, said ink cartridge comprising:

a first portion including an outwardly facing surface and provided with an inserting portion into which the ink receiving tube is capable of being inserted;

a second portion opposite from said first portion;

a third portion connecting said first portion and said second portion with each other and provided with a plurality of pad electrodes electrically connectable with said electrical connecting portions, wherein said pad electrodes include respective electrical contact points electrically connectable with said electrical connecting portions, and wherein a direction in which electrical contact points are arranged crosses with a moving direction of said pad electrodes.

Structure Example M

An ink cartridge mountable to a mounting portion provided with an ink receiving tube and a plurality of electrical connecting portions, said ink cartridge comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein said pad electrodes include respective electrical contact points electrically connectable with said electrical connecting portions, and wherein a direction in which said electrical contact points are arranged crosses with a direction from said first portion to second portion.

Structure Example N

An ink cartridge mountable to a mounting portion provided with an ink receiving tube and a plurality of electrical connecting portions, said ink cartridge comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein said pad electrodes include respective electrical contact points electrically connectable with said electrical connecting portions, and wherein a direction in which said electrical contact points are arranged crosses with a longitudinal direction of said ink cartridge.

Structure Example O

An ink cartridge mountable to a mounting portion provided with an ink receiving tube and a plurality of electrical connecting portions, said ink cartridge comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein said third portion is provided with a screw-like groove.

Structure Example P

An ink cartridge mountable to a mounting portion provided with an ink receiving tube and a plurality of electrical connecting portions, said ink cartridge comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein said second portion has a portion having a relatively large diameter, and said first portion has a portion having the relatively small diameter, and wherein said pad electrodes are provided on the portion having the relatively small diameter, and a wherein said third portion is provided with a projected portion, wherein pad electrodes are provided on said projected portion.

Structure Example Q

An ink cartridge mountable to a mounting portion provided with an ink receiving tube and a plurality of electrical connecting portions, said ink cartridge comprising:

a first portion including an outwardly facing surface and provided with an inserting portion into which the ink receiving tube is capable of being inserted;

a second portion opposite from said first portion; and a third portion connecting said first portion and said second portion with each other and provided with a plurality of pad electrodes electrically connectable with said electrical connecting portions, wherein a space is provided below said pad electrode.

Structure Example R

Structure Example R-1

An ink cartridge containing ink, comprising:

a first portion provided with an ink discharge portion configured to discharge the ink, a second portion opposite from said first portion;

a third portion connecting said first portion and said second portion with each other, wherein said ink cartridges is rotatable about an axis extending along a direction from said first portion toward said second portion, and wherein said ink discharge portion provided across the rotational axis; and a plurality of pad electrodes provided on said third portion at a position closer to said first portion than to said second portion.

Structure Example R-2

An ink cartridge according to Structure Example R-1, wherein said third portion is provided with a projected portion, on which said pad electrodes are provided.

Structure Example R-3

An ink cartridge according to Structure Example R-1 or R-2, wherein a space is provided below said pad electrodes.

Structure Example R-4

An ink cartridge according to any one of Structure Examples R-1-R-3, wherein said pad electrodes are disposed at positions away from said first portion by not less than 5 mm and not more than 25 mm as measured in a direction parallel with the direction from said first portion toward said second portion.

Structure Example R-5

An ink cartridge according to any one of Structure Examples R-1-R-3, wherein said pad electrodes are disposed at positions away from said first portion by not less than 10 mm and not more than 20 mm as measured in a direction parallel with the direction from said first portion toward said second portion.

Structure Example R-6

An ink cartridge according to any one of Structure Examples R-1-R-5, wherein one of said pad electrodes that is closest to said first portion is disposed at a position away from said first portion by not less than 5 mm and not more than 15 mm as measured in a direction parallel with the direction from said first portion to said second portion.

Structure Example R-7

An ink cartridge according to any one of Structure Examples R-1-R-5, wherein one of said pad electrodes that is closest to said first portion is disposed at a position away from said first portion by not less than 10 mm and not more than 11 mm as measured in a direction parallel with the direction from said first portion to said second portion.

Structure Example R-8

An ink cartridge according to any one of Structure Examples R-1-R-7, wherein one of said pad electrodes that is most remote from said first portion is disposed at a position away from said first portion by not less than 15 mm and not more than 25 mm as measured in a direction parallel with the direction from said first portion toward said second portion.

Structure Example R-9

An ink cartridge according to any one of Structure Examples R-1-R-7, wherein one of said pad electrodes that is most remote from said first portion is disposed at a position away from said first portion by not less than 17 mm and not more than 18 mm as measured in a direction parallel with the direction from said first portion toward said second portion.

Structure Example R-10

An ink cartridge according to any one of Structure Examples R-1-R-9, wherein said third portion is provided with a guide portion configured to rotate said member.

Structure Example R-11

An ink cartridge according to Structure Example R-10, wherein said guide portion includes a groove.

Structure Example R-12

An ink cartridge according to Structure Example R-11, wherein said groove has a screw-shape.

Structure Example R-13

An ink cartridge according to Structure Example R-10 or R-12, wherein said guide portion has a depth of not less than 1.0 mm and not more than 5.0 mm.

Structure Example R-14

An ink cartridge according to Structure Example R-10 or R-13, wherein said guide portion has a depth of not less than 2.0 mm and not more than 4.0 mm.

Structure Example R-15

An ink cartridge according to any one of Structure Example R-10-R-14, further comprising a rib provided inside said guide portion.

Structure Example R-16

An ink cartridge according to Structure Example R-15, wherein said rib has a height of not less than 1.5 mm and not more than 2.0 mm.

Structure Example R-17

An ink cartridge according to Structure Example R-15 or R-16, wherein said rib has a height smaller than a depth of said guide portion.

Structure Example R-18

An ink cartridge according to any one of Structure Examples R-10-R-17, wherein said guide portion extends in a direction crossing with a direction from said first portion to said second portion.

Structure Example R-19

An ink cartridge according to Structure Example R-18, wherein a direction in which said guide portion extends is inclined by not less than 50° and not more than 80° relative to a direction from said first portion to said second portion.

Structure Example R-20

An ink cartridge according to Structure Example R-18, wherein a direction in which said guide portion extends is inclined by not less than 60° and not more than 70° relative to a direction from said first portion to said second portion.

Structure Example R-21

An ink cartridge according to any one of Structure Example R-10 or R-20, wherein said second portion has a portion having a relatively large diameter, and said first portion has a portion having the relatively small diameter, and wherein said guide portion is provided on the portion having the relatively large diameter.

Structure Example R-22

An ink cartridge according to Structure Example R-10 or R-21, further comprising a second guide portion at a position opposed to said first mentioned guide portion.

Structure Example R-23

An ink cartridge according to any one of Structure Example R-10 or R-22, wherein said pad electrodes have areas which are arranged so as to be crossed by a line inclined with respect to a direction in which said guide portion extends.

Structure Example R-24

An ink cartridge according to Structure Example R-23, wherein said pad electrodes have areas which are arranged so as to be crossed by a line inclined by not less than 60° relative to a direction in which said guide portion extends.

Structure Example R-25

An ink cartridge according to Structure Example R-23, wherein said pad electrodes have areas which are arranged so as to be crossed by a line inclined by not less than 70° relative to a direction in which said guide portion extends.

Structure Example R-26

An ink cartridge according to Structure Example R-23, wherein said pad electrodes have areas which are arranged so as to be crossed by a line inclined by not less than 75° relative to a direction in which said guide portion extends.

Structure Example R-27

An ink cartridge according to any one of Structure Examples R-23-R-26, wherein said pad electrodes have areas which are arranged so as to be crossed by a line inclined by not more than 85° with respect to a direction in which said guide portion extends.

Structure Example R-28

An ink cartridge according to any one of Structure Examples R-1-R-27, wherein said second portion has a portion having a relatively large diameter, and said first portion has a portion having the relatively small diameter, and wherein said pad electrodes are provided on the portion having the relatively small diameter.

Structure Example R-29

An ink cartridge according to Structure Example A-28, wherein said second portion has a portion having a relatively large diameter, and said first portion has a portion having the relatively small diameter, and wherein said pad electrodes are provided on and are bridged between the portion having the relatively small diameter and on the portion having the relatively large diameter.

Structure Example R-30

An ink cartridge according to Structure Example R-28 or R-29, wherein the relatively large diameter is not less than 50 mm and not more than 80 mm.

Structure Example R-31

An ink cartridge according to any one of Structure Examples R-28-R-30, wherein the relatively small diameter is not less than 20 mm and not more than 30 mm.

Structure Example R-32

An ink cartridge according to any one of Structure Examples R-28-R-31, wherein a length of the relatively large diameter portion as measured in the direction parallel to the direction from the first portion toward the second portion is not less than 190 mm and not more than 220 mm.

Structure Example R-33

An ink cartridge according to any one of Structure Examples R-28-R-32, wherein a length of the relatively small diameter portion as measured in the direction parallel to the direction from the first portion toward the second portion is not less than 20 mm and not more than 30 mm.

Structure Example R-34

An ink cartridge according to any one of Structure Examples R-1-R-33, wherein said third portion is provided with a projected portion, and wherein said projected portion has a top side and which said pad electrodes are provided, and said side has a maximum side length of not less than 9 mm and not more than 16 mm, as seen in a direction facing the top side.

Structure Example R-35

An ink cartridge according to Structure Examples R-1-R-34, wherein said third portion is provided with a projected portion, and wherein said projected portion has a height of not less than 3 mm and not more than 10 mm.

Structure Example R-36

An ink cartridge according to Structure Examples R-1-R-35, wherein said third portion is provided with a projected portion, and wherein said projected portion has a height of not less than 3 mm and not more than 8 mm.

Structure Example R-37

An ink cartridge according to any one of Structure Examples R-1-R-36, wherein said third portion is provided with a projected portion, and wherein a first portion side of said projected portion is disposed at a position away from said first portion by not less than 5 mm and not more than 10 mm, as measured in a direction parallel with a direction from said first portion toward said second portion.

Structure Example R-38

An ink cartridge according to any one of Structure Examples R-1-R-37, wherein said third portion is provided with a projected portion, and wherein a first portion side of said projected portion is disposed at a position away from said first portion by not less than 6 mm and not more than 7 mm, as measured in a direction parallel with a direction from said first portion toward said second portion.

Structure Example R-39

An ink cartridge according to any one of Structure Examples R-1-R-38, wherein said third portion is provided with a projected portion, and wherein a second portion side of said projected portion is disposed at a position away from said first portion by not less than 20 mm and not more than 25 mm, as measured in the direction from said first portion toward said second portion.

Structure Example R-40

An ink cartridge according to any one of Structure Examples R-1-R-38, wherein said third portion is provided with a projected portion, and wherein a second portion side of said projected portion is disposed at a position away from said first portion by not less than 22 mm and not more than 23 mm, as measured in the direction from said first portion toward said second portion.

Structure Example R-41

An ink cartridge according to any one of Structure Examples R-1-R-40, wherein said third portion is provided with a projected portion, and wherein an angle formed between a side surface of said projected portion in the direction from said first portion and said second portion is not less than 50° and not more than 70°.

Structure Example R-42

An ink cartridge according to any one of Structure Examples R-1-R-41, wherein said third portion is provided with a projected portion, and wherein an angle formed between a side surface of said projected portion in the direction from said first portion and said second portion is not less than 55° and not more than 60°.

Structure Example R-43

An ink cartridge according to any one of Structure Examples R-1-R-42, wherein said third portion is provided with a projected portion, and a part of a side surface of said projected portion is protruded.

Structure Example R-44

An ink cartridge according to any one of Structure Examples R-1-R-43, wherein said third portion is provided with a projected portion, and a space is provided below said pad electrodes, and wherein said space is opened toward a first portion side of said projected portion.

Structure Example R-45

An ink cartridge according to any one of Structure Example R-1-R-44, wherein a space is provided below said pad electrodes, and wherein an outer periphery of said space has a maximum side length of not less than 10 mm and not more than 15 mm, as seen in a direction facing said pad electrode.

Structure Example R-46

An ink cartridge according to any one of Structure Examples R-1-R-45, wherein a space provided below said pad electrodes, and said space as a height not less than 1 mm and not more than 5 mm.

Structure Example R-47

An ink cartridge according to any one of Structure Examples R-1-R-46, wherein a space provided below said pad electrodes, and said space as a height not less than 2 mm and not more than 3 mm.

Structure Example R-48

An ink cartridge according to any one of Structure Examples R-1-R-47, wherein said third portion is provided with a projection for identification of said member.

Structure Example R-49

An ink cartridge according to Structure Example R-48, wherein a first portion side of said identification projection is away from said first portion by not less than 40 mm and not more than 50 mm, as measured in a direction parallel with the direction from said first portion to said second portion.

Structure Example R-50

An ink cartridge according to Structure Example R-48, wherein a first portion side of said identification projection is away from said first portion by not less than 41 mm and not more than 45 mm, as measured in a direction parallel with the direction from said first portion to said second portion.

Structure Example R-51

An ink cartridge according to any one of Structure Examples R-48-R-50 wherein a second portion side of said identification projection is away from said first portion by not less than 50 mm and not more than 60 mm, as measured in a direction parallel with the direction from said first portion to said second portion.

Structure Example R-52

An ink cartridge according to any one of Structure Examples R-48-R-50 wherein a second portion side of said identification projection is away from said first portion by not less than 55 mm and not more than 58 mm, as measured in a direction parallel with the direction from said first portion to said second portion.

Structure Example R-53

An ink cartridge according to any one of Structure Examples R-48-R-52, wherein said identification projection has a height of not less than 3 mm and not more than 10 mm.

Structure Example R-54

An ink cartridge according to any one of Structure Examples R-48-R-53, wherein said second portion has a portion having a relatively large diameter, and said first portion has a portion having the relatively small diameter, and wherein said ID projection is provided on the portion having the relatively large diameter.

Structure Example R-55

An ink cartridge according to any one of Structure Examples R-1-R-54, wherein said pad electrodes have the areas which are arranged so as to be crossed by a line inclined relative to a direction inclined relative to a direction from the first portion toward the second portion.

Structure Example R-56

An ink cartridge according to Structure Example R-55, wherein said pad electrodes have the areas arranged so as to be crossed by a line inclined by not less than 10° and not more than 60° relative to the direction from the first portion toward the second portion.

Structure Example R-57

An ink cartridge according to Structure Example R-55, wherein said pad electrodes have the areas arranged so as to be crossed by a line inclined by not less than 40° and not more than 60° relative to the direction from the first portion toward the second portion.

Structure Example R-58

An ink cartridge according to any one of Structure Examples R-1-R-57, wherein said pad electrodes have areas which are arranged so as to be crossed by a line inclined relative to the longitudinal direction of said ink cartridge.

Structure Example R-59

An ink cartridge according to Structure Example R-58, wherein said pad electrodes have areas which are arranged so as to be crossed by a line inclined not less than 10° and not more than 60° relative to the longitudinal direction of said ink cartridge.

Structure Example R-60

An ink cartridge according to Structure Example R-58, wherein said pad electrodes have areas which are arranged so as to be crossed by a line inclined not less than 40° and not more than 60° relative to the longitudinal direction of said ink cartridge.

Structure Example R-61

An ink cartridge according to any one of Structure Examples R-1-R-60, wherein said first portion has a diameter of not less than 8 mm and not more than 14 mm.

Structure Example R-62

An ink cartridge according to any one of Structure Examples R-1-R-61, wherein one of said pad electrodes that is closest to said first portion is disposed at a position away from said first portion by not less than 5 mm and not more than 15 mm as measured in a direction parallel with the direction from said first portion toward said second portion.

Structure Example R-63

An ink cartridge according to any one of Structure Examples R-1-R-61, wherein one of said pad electrodes that is closest to said first portion is disposed at a position away from said first portion by not less than 10 mm and not more than 11 mm as measured in a direction parallel with the direction from said first portion toward said second portion.

Structure Example R-64

An ink cartridge according to any one of Structure Examples R-1-R-63, wherein one of said pad electrodes that is most remote from said first portion is disposed at a position away from said first portion by not less than 15 mm and not more than 25 mm as measured in a direction parallel with the direction from said first portion toward said second portion.

Structure Example R-65

An ink cartridge according to any one of Structure Examples R-1-R-63, wherein one of said pad electrodes that is most remote from said first portion is disposed at a position away from said first portion by not less than 17 mm and not more than 18 mm as measured in a direction parallel with the direction from said first portion toward said second portion.

Structure Example R-66

An ink cartridge according to any one of Structure Examples R-1-R-65, wherein each of said pad electrodes has a width of not less than 5 mm and not more than 10 mm.

Structure Example R-67

An ink cartridge according to any one of Structure Examples R-1-R-65, wherein each of said pad electrodes has a width of not less than 6 mm and not more than 9 mm.

Structure Example R-68

An ink cartridge according to any one of Structure Examples R-1-R-65, wherein each of said pad electrodes has a width of not less than 7 mm and not more than 8 mm.

Structure Example R-69

An ink cartridge according to any one of Structure Examples R-1-R-68, wherein a length, measured in a direction facing said third surface, between said pad electrodes and a axis of a minimum length line connecting between said ink discharge portion and said second portion is not less than 15 mm and not more than 20 mm.

Structure Example R-70

An ink cartridge according to any one of Structure Examples R-1-R-68, wherein a length, measured in a direction facing said third surface, between said pad electrodes and a axis of a minimum length line connecting between said ink discharge portion and said second portion is not less than 16 mm and not more than 18 mm.

Structure Example R-71

An ink cartridge according to any one of Structure Examples R-1-R-70, wherein a line distance between said ink discharge portion and said pad electrodes is not less than 15 mm and not more than 25 mm.

Structure Example R-72

An ink cartridge according to Structure Example R-71, wherein a difference in the line distance between one of said pad electrodes that is closest to said ink discharge portion and one of said pad electrodes most remote from said ink discharge portion is not less than 2 mm and not more than 4 mm.

Structure Example S

Structure Example S-1

An ink cartridge according to any one of Structure Examples J-1-J-109, K-1-K-84, L, M, N, O, P, Q, R-1-R-72, wherein said ink cartridge has a generally cylindrical shape.

Structure Example S-2

An ink cartridge according to any one of Structure Examples J-1-J-109, K-1-K-84, L, M, N, O, P, Q and R-1-R-72, wherein said member has a polygonal prism shape.

Structure Example S-3

An ink cartridge according to any one of Structure Examples J-1-J-109, K-1-K-84, L, M, N, O, P, Q and R-1-R-72, wherein said member has a conical shape.

Structure Example S-4

An ink cartridge according to any one of Structure Examples J-1-J-109, K-1-K-84, L, M, N, O, P, Q and R-1-R-72, wherein said member has a polygonal pyramid shape.

Structure Example S-5

An ink cartridge according to any one of Structure Examples J-1-J-109, K-1-K-84, L, M, N, O, P, Q, R-1-R-72 and R-72, S-1-S-4, wherein said member has a polygonal pyramid shape.

Structure Example S-6

An ink cartridge according to any one of Structure Examples J-1-J-109, K-1-K-84, L, M, N, O, P, Q, R-1, Q, R-1-R-72, and S-1-S-5, further comprising a casing including the first portion and the second portion, wherein a portion on a first portion side is rotatable independently of said casing.

Structure Example S-7

An ink cartridge according to any one of Structure Examples J-1-J-109, K-1-K-84, L, M, N, O, P, Q, R-1, Q, R-1-R-72, and S-1-S-6, further comprising a grip portion at a position closer to said second portion than to said first portion.

Structure Example S-8

An ink cartridge according to any one of Structure Examples J-1-J-109, K-1-K-84, L, M, N, O, P, Q, R-1-R-72, S-1-S-7, wherein said ink cartridge contains ink.

Structure Example S-9

An ink cartridge according to Structure Example S-5, wherein the ink is contained inside said inner layer.

Structure Example T

An ink cartridge containing ink, comprising:

a casing containing ink and extending in a longitudinal direction, wherein said casing including a first end portion and a second end portion opposed to said first end portion in the longitudinal direction, and said casing is rotatable about a rotational axis passing through said first end portion and said second end portion;

an ink discharge portion provided in said first end portion on the rotational axis; and a chips having a plurality of pad electrodes at a position adjacent to said first end portion on a peripheral surface portion extending in the longitudinal direction between said first end portion and said second end portion;

wherein said pad electrodes are arranged in a direction inclined relative to the rotational axis.

Structure Example U

An ink cartridge containing ink, comprising:

a first portion provided with an ink discharge portion configured to discharge the ink, a second portion opposite from said first portion, and a third portion connecting said first portion and said second portion with each other, wherein said ink cartridge is rotatable about a rotational axis extending from said first portion toward said second portion, wherein said ink discharge portion is provided on the rotational axis; and a plurality of pad electrode provided on said third portion at a position closer to said first portion than to said second portion.

Structure Example V

An ink cartridge comprising:

a first section including a first portion (20*a*) including an outwardly facing the surface;

a second section including a second portion (20*b*) opposite from said first portion, said first section having a dimension measured in a direction perpendicular to a direction from said first portion toward said second portion smaller than that of said second section;

a table fixed on said first portion and having a top surface;

an IC tip provided on the top surface, the IC tip being provided with at least four electrode pads (27) facing away from the top surface;

wherein as seen in a direction perpendicular to the top surface, a line (U) which forms an angle (γ) within a range of 30-35° relative to the direction from said first portion toward said second portion and which passes through a point on one of said electrode pads that is most remote from said second section overlaps all of the other electrode pads.

Structure Example W

A recording apparatus comprising said member according to any one of Structure Examples A-1-A-109, B-1-B-84, C, D, E, F, G, H and I-1-I-10.

Structure Example X

An ink jet printer comprising said member according to any one of Structure Examples A-1-A-109, B-1-B-84, C, D, E, F, G, H and I-1-I-10.

Structure Example Y

A recording apparatus comprising said member according to any one of Structure Examples J-1-J-109, K-1-K-84, L, M, N, O, P, Q, R-1-R-72 and S-1-S-8.

Structure Example Z

A ink jet printer comprising an ink cartridge according to any one of Structure Example J-1-J-109, K-1-K-84, L, M, N, O, P, Q, R-1-R-72 and S-1-S-8.

INDUSTRIAL APPLICABILITY

According to the present invention, there is provided a member provided with pad electrodes and usable with a recording apparatus, an ink cartridge and a recording apparatus using the member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A member comprising:

a first portion including an outwardly facing surface and provided with an inserting portion;

a second portion opposite from the first portion with respect to a longitudinal direction of the member;

a third portion connecting the first portion and the second portion with each other and having a cylindrical shape, wherein the third portion includes:

a first cylindrical portion provided with a plurality of pad electrodes, and a second cylindrical portion having a cylinder diameter larger than a cylinder diameter of the first cylindrical portion.

2. The member according to claim 1, wherein the first cylindrical portion has a projected portion and the plurality of pad electrodes are provided on the projected portion.

3. The member according to claim 1, wherein a space is provided below the plurality of pad electrodes.

4. The member according to claim 1, wherein the plurality of pad electrodes are disposed on a member with a space from a surface of the first cylindrical portion.

5. The member according to claim 4, wherein the space has a height of not less than 1 mm and not more than 5 mm.

* * * * *